US012196038B2

(12) United States Patent
Fitzgerald

(10) Patent No.: US 12,196,038 B2
(45) Date of Patent: Jan. 14, 2025

(54) SHUTTER ASSEMBLIES AND SYSTEMS FOR WINDOWS AND DOORS

(71) Applicant: Alwood Industries, Richardson, TX (US)

(72) Inventor: Ryan D. Fitzgerald, Doonan (AU)

(73) Assignee: Alwood Industries, Richardson, TX (US)

( * ) Notice: Subject to any disclaimer, the term of this patent is extended or adjusted under 35 U.S.C. 154(b) by 414 days.

(21) Appl. No.: 17/636,583

(22) PCT Filed: Sep. 3, 2020

(86) PCT No.: PCT/US2020/049214

§ 371 (c)(1),
(2) Date: Feb. 18, 2022

(87) PCT Pub. No.: WO2021/046228

PCT Pub. Date: Mar. 11, 2021

(65) Prior Publication Data

US 2022/0298847 A1 Sep. 22, 2022

Related U.S. Application Data

(60) Provisional application No. 62/895,148, filed on Sep. 3, 2019.

(51) Int. Cl.
*E06B 9/04* (2006.01)
*E05D 7/081* (2006.01)

(52) U.S. Cl.
CPC ................ *E06B 9/04* (2013.01); *E05D 7/081* (2013.01)

(58) Field of Classification Search
CPC . E06B 9/04; E06B 7/096; E06B 7/092; E06B 7/08; E06B 9/24; E06B 9/17; E06B 7/10; E05D 7/081

(Continued)

(56) References Cited

U.S. PATENT DOCUMENTS

2014/0033610 A1* 2/2014 Watkins .................. E06B 7/086 49/82.1
2015/0052815 A1* 2/2015 Arteta Loredo ........ E06B 7/086 49/81.1

(Continued)

FOREIGN PATENT DOCUMENTS

CN 201250593 Y 6/2009
CN 203008753 U 6/2013

(Continued)

OTHER PUBLICATIONS

International Search Report & Written Opinion for International Application No. PCT/US2020/049214 dated Nov. 12, 2020.

*Primary Examiner* — Beth A Stephan

(74) *Attorney, Agent, or Firm* — Young Basile Hanlon & MacFarlane, P.C.

(57) ABSTRACT

A shutter system for a window or door is disclosed that includes at least one panel. The at least one panel includes: an inner frame; an outer frame configured for connection to the inner frame; a drive train that is supported by the inner frame; and a plurality of louvers that are connected to the drive train such that operation of the drive train moves the plurality of louvers between open and closed positions. The inner frame includes first segments each defining a longitudinal axis and a plurality of corner stakes that extend between and connecting the first segments. The outer frame includes second segments each defining a longitudinal axis and a plurality of brackets extending between and connecting the second segments.

20 Claims, 47 Drawing Sheets

(58) Field of Classification Search
USPC .......................................................... 160/113
See application file for complete search history.

(56) References Cited

U.S. PATENT DOCUMENTS

| | | | | |
|---|---|---|---|---|
| 2017/0081907 | A1* | 3/2017 | Chen | E05F 11/04 |
| 2017/0335621 | A1* | 11/2017 | Yen | E06B 7/096 |
| 2018/0179808 | A1* | 6/2018 | Fraser | E06B 9/04 |
| 2018/0363364 | A1* | 12/2018 | Huang | E06B 9/28 |
| 2019/0195007 | A1* | 6/2019 | Yen | E06B 7/096 |
| 2019/0234136 | A1* | 8/2019 | Lu | E06B 7/092 |
| 2019/0284870 | A1* | 9/2019 | Hsu | E06B 7/084 |
| 2020/0199929 | A1* | 6/2020 | Tostee | E05F 17/00 |
| 2020/0284091 | A1* | 9/2020 | Turner | E06B 7/096 |
| 2020/0308902 | A1* | 10/2020 | Fraser | E05F 15/619 |
| 2021/0025224 | A1* | 1/2021 | Mangiapane | E06B 7/09 |
| 2022/0098925 | A1* | 3/2022 | Barioli | E06B 9/06 |

FOREIGN PATENT DOCUMENTS

| | | | | |
|---|---|---|---|---|
| CN | 109098639 | A | 12/2018 | |
| DE | 102005037775 | A1 | 2/2007 | |
| EP | 3115542 | A1 | 1/2017 | |
| FR | 3009334 | A1 * | 2/2015 | E06B 7/096 |
| GB | 413872 | A | 7/1934 | |
| GB | 2140853 | A | 12/1984 | |
| WO | 2016187329 | A1 | 11/2016 | |

* cited by examiner

SHUTTER ASSEMBLIES AND SYSTEMS FOR WINDOWS AND DOORS

CROSS-REFERENCE TO RELATED APPLICATIONS

This application is a 371 of International Application No. PCT/US2020/049214, filed on Sep. 3, 2020, which claims priority to U.S. Provisional Application No. 62/895,148, filed on Sep. 3, 2019, the entire disclosures of which are hereby incorporated by reference.

TECHNICAL FIELD

The present disclosure relates to shutter assemblies and systems for windows, doors, and the like.

BACKGROUND

Shutter assemblies for windows and doors typically include one or more louvered panels that are (generally) opened and closed by manually manipulating the louvers. Known systems, however, can be complicated to assemble and/or install and are subject to malfunction and/or damage resulting from incorrect or negligent manipulation of the louvers.

The present disclosure addresses these deficiencies by providing shutter assemblies that reduce the complexities typically associated with assembly and installation and offer advancements in operation that guard against the malfunction and/or damage that is common to such systems.

SUMMARY

In one aspect of the present disclosure, a shutter system is disclosed for a window or door that includes: a mounting frame; a pivot assembly; and at least one panel. The mounting frame is configured for connection to a mounting surface on or about the window or door. The pivot assembly is configured for connection to the mounting frame and includes: a hinge receiver that is configured for connection to the mounting frame; a hinge base that is configured for connection to the hinge receiver; and a hinge pin that is configured for insertion through the hinge base and the hinge receiver such that the hinge base is pivotably connected to (engaged with) the hinge receiver. The at least one panel is configured for connection to the hinge base such that the at least one panel is pivotably connectable to the mounting frame via the pivot assembly. The at least one panel includes: an inner frame; an outer frame that is configured for connection to the inner frame; a drive train that is supported by the inner frame; and a plurality of louvers that are connected to (engaged with) the drive train such that operation of the drive train moves the plurality of louvers between open and closed positions. The inner frame includes a plurality of first segments and a plurality of corner stakes that extend between and connect adjacent first segments. The outer frame includes a plurality of second segments, which correspond to the plurality of first segments, and a plurality of brackets that extend between and connect adjacent second segments. The plurality of second segments are configured for connection to the plurality of first segments in an interference fit to thereby allow for toolless assembly and disassembly of the at least one panel.

In certain embodiments, the outer frame may further include a plurality of corner stakes that extend between and connect adjacent second segments. In certain embodiments, the first segments and the second segments may each define an internal cavity that is configured to receive a corresponding corner stake. In certain embodiments, each corner stake may include a (generally) L-shaped configuration. In certain embodiments, the drive train may include a plurality of gear boxes that correspond to the plurality of louvers. In certain embodiments, the drive train may include a plurality of pulley assemblies that correspond to the plurality of louvers. It is envisioned that the shutter system described above may include any combination of features and elements described in this paragraph.

In another aspect of the present disclosure, a shutter system is disclosed for a window or door that includes at least one panel. The at least one panel includes: an inner frame; an outer frame that is configured for connection to the inner frame; a drive train that is supported by the inner frame; and a plurality of louvers that are connected to (engaged with) the drive train such that operation of the drive train moves the plurality of louvers between open and closed positions. The inner frame includes first segments each defining a longitudinal axis and a plurality of corner stakes that extend between and connect the first segments. The outer frame includes second segments each defining a longitudinal axis and a plurality of brackets that extend between and connect the second segments.

In certain embodiments, the first segments and the second segments may be configured such that the second segments are connectable to the first segments via movement along a first axis that is transverse in relation to the longitudinal axes thereof and such that the second segments are disconnectable from the first segments via movement along a second axis that is (generally) parallel in relation to the longitudinal axes thereof. In certain embodiments, the drive train may include a plurality of gear boxes. In certain embodiments, each gear box may be connected to (engaged with) one of the plurality of louvers. In certain embodiments, the drive train may further include a drive member that extends through the plurality of gear boxes. In certain embodiments, each gear box may include a first gear that is configured to receive the drive member. In certain embodiments, the first gear and the drive member may include corresponding non-circular cross-sectional configurations such that the first gear receives the drive member in mating engagement, whereby rotation of the drive member causes corresponding rotation of the first gear. In certain embodiments, each gear box may further include a second gear that is configured for operative engagement with the first gear such that rotation of the first gear causes corresponding rotation of the second gear. In certain embodiments, each gear box may further include a third gear that is positioned between, and configured for engagement with, the first gear and the second gear such that rotation of the first gear causes corresponding rotation of the second gear and the third gear. In certain embodiments, the third gear may be configured for engagement with the louver connected to (engaged with) the gear box such that rotation of the third gear causes corresponding rotation of the louver to move the louver between the open and closed positions. In certain embodiments, the first gear and the second gear may be oriented along a first axis that extends in (generally) parallel relation to the drive member. In certain embodiments, the third gear may be oriented along a second axis that extends in (generally) orthogonal relation to the first axis. In certain embodiments, the drive train may include a plurality of pulley assemblies. In certain embodiments, each pulley assembly may be connected to (engaged with) one of the plurality of louvers. In certain embodiments, the drive train may further include: an upper pulley that is connected to (engaged with) the inner frame; a lower pulley that is connected to (engaged with) the inner frame; and a drive member that is configured for engagement with the upper pulley, the lower pulley, and the plurality of pulley assemblies such that movement of the drive member causes corresponding rotation of the upper pulley, the lower pulley, and the plurality of pulley assemblies to thereby move the louvers between the open and closed positions. In certain embodiments, the drive member, the upper pulley, the lower pulley, and the plurality of pulley assemblies may each be configured such that the drive member is frictionally engageable with the upper pulley, the lower pulley, and the plurality of pulley assemblies. In certain embodiments, each pulley assembly may include a main pulley and first and second support pulleys, each of which is configured for engagement with the drive member. In certain embodiments, the first and second support pulleys may be positioned (generally) adjacent to the main pulley so as to define a tortuous path for the drive member to increase friction between the drive member and the main pulley. It is envisioned that the shutter system described above may include any combination of features and elements described in this paragraph.

In another aspect of the present disclosure, a method is disclosed for installing a shutter system for a window or door. The method includes: securing a mounting frame to a mounting surface on or about the window or door via a plurality of fasteners; connecting hinge receivers to hinge slides supported within tracks defined by the mounting frame; and mounting a panel to the hinge receiver by inserting a hinge pin through a hinge base connected to (engaged with) the panel such that the panel is movable in relation to the mounting frame between an open position and a closed position.

In certain embodiments, the method may further include slidably inserting the hinge slides into the tracks defined by the mounting frame. In certain embodiments, securing the mounting frame to the mounting surface may include inserting the plurality of fasteners into the mounting surface through the hinge slides. It is envisioned that the method described above may include any combination of features, elements, and/or tasks described in this paragraph.

BRIEF DESCRIPTION OF THE DRAWINGS

According to common practice, the various features of the drawings may not be to scale, and may be arbitrarily expanded or reduced for clarity.

DETAILED DESCRIPTION

The present disclosure describes shutter systems including that are configured for connection to a mounting surface (e.g., a window, a door, etc.). Although the shutter systems are (generally) described herein in connection with window installations, it should be appreciated that the presently disclosed shutter systems may also be configured for use with doors (e.g., French doors). The shutter systems described herein include a mounting frame that supports one or more louvered panels, each of which includes an outer frame; an inner frame; and a drive train. The shutter systems are configured for installation in a variety of configurations, including, for example, single-panel configurations and multi-panel configurations (e.g., bi-fold configurations, double bi-fold configurations, etc.). Additionally, although shown and described as being (generally) polygonal (e.g., rectangular) in configuration, the panel(s) may be configured in any desired manner in various embodiments of the disclosure, including, for example, non-polygonal configurations (e.g., arched or otherwise arcuate configurations).

Figure 1:
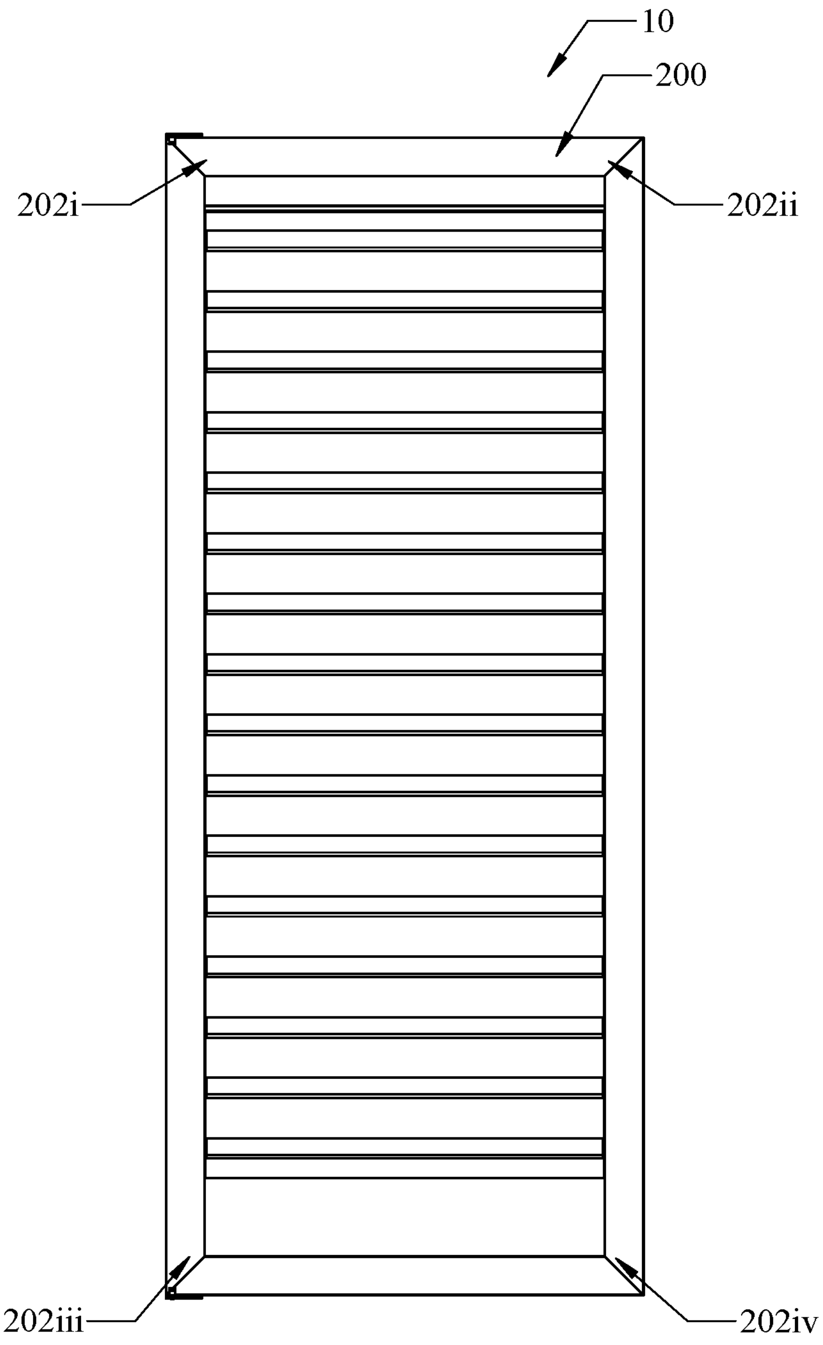
FIG. 1 is a front, plan view of a (shutter) system including a single panel according to the principles of the present disclosure.
Figure 1A:
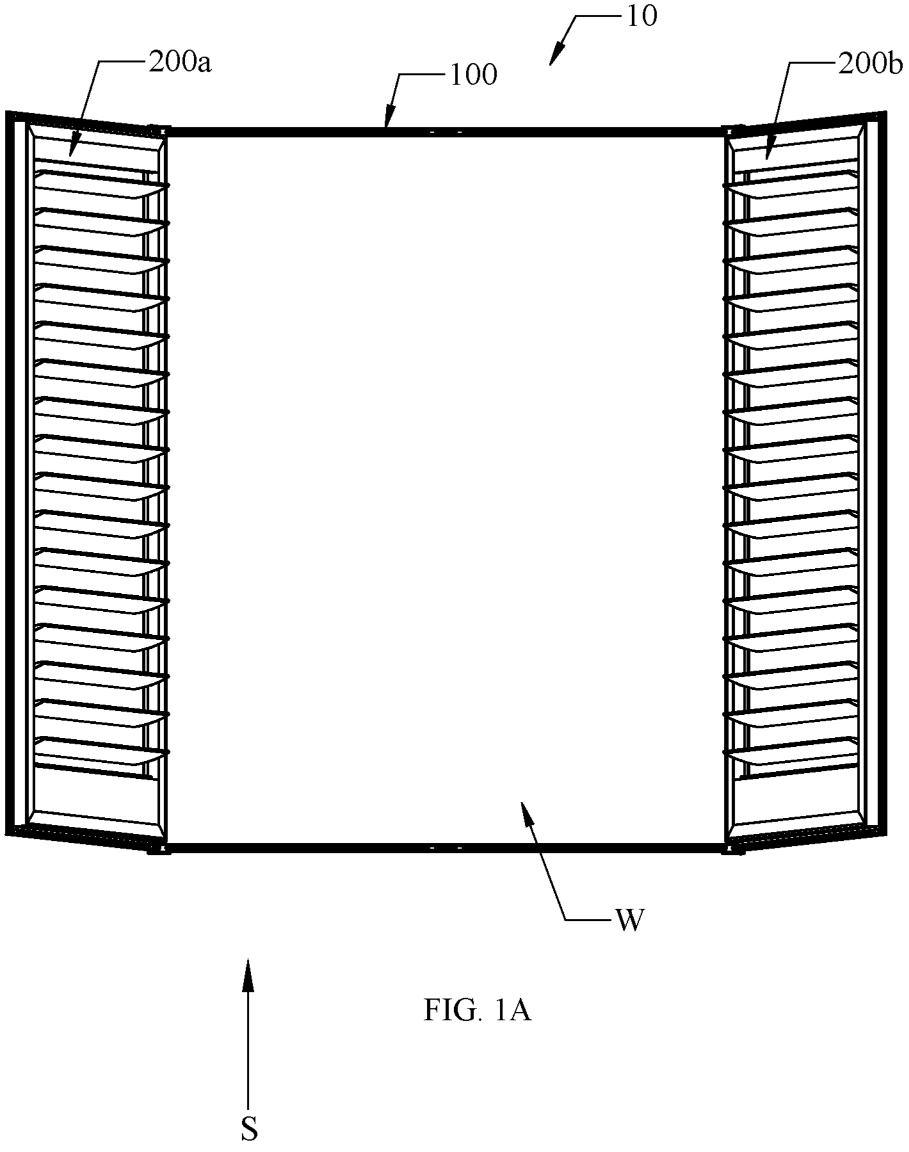
FIG. 1A is front, perspective view of the (shutter) system including a double-panel configuration and shown in an open configuration.
Figure 1B:
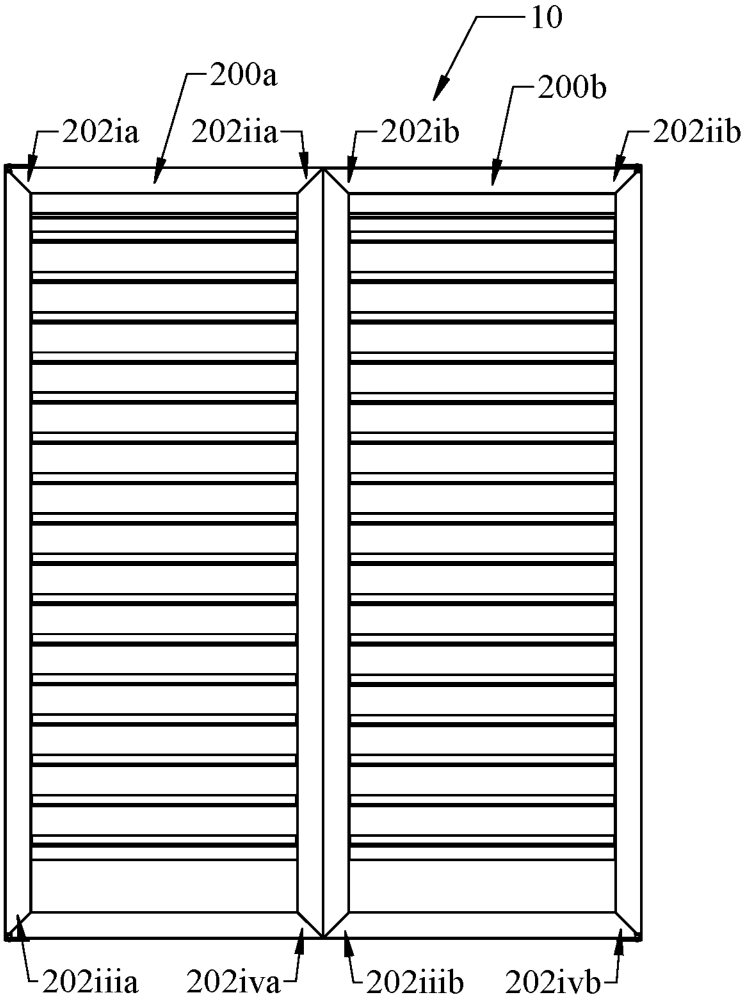
FIG. 1B is a front, plan view of a (shutter) system including a single-bifold configuration and shown in a closed configuration.
Figure 1C:
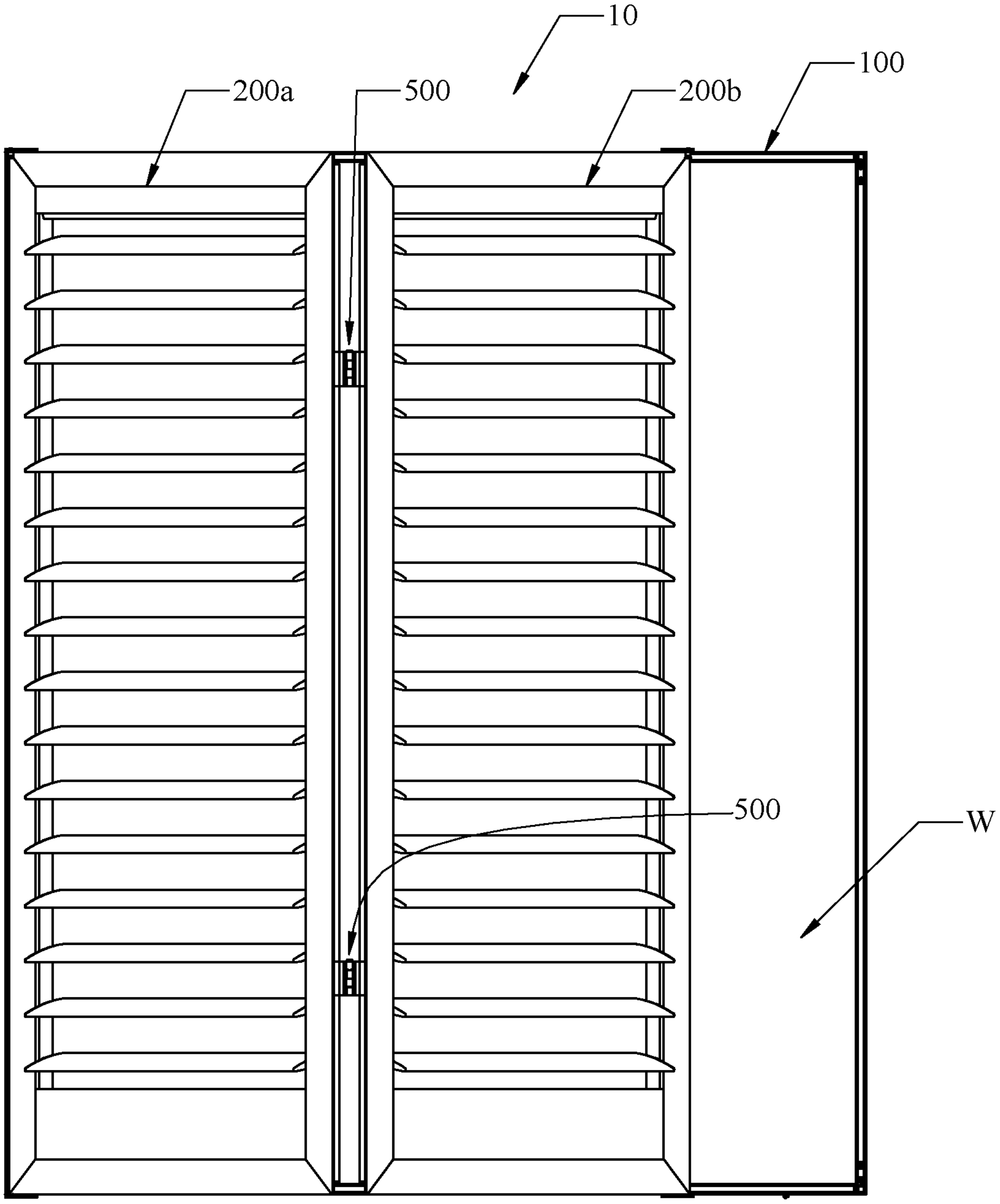
FIG. 1C is a front, plan view of the (shutter) system seen in FIG. 1B and shown in a (partially) open configuration.
Figure 1D:
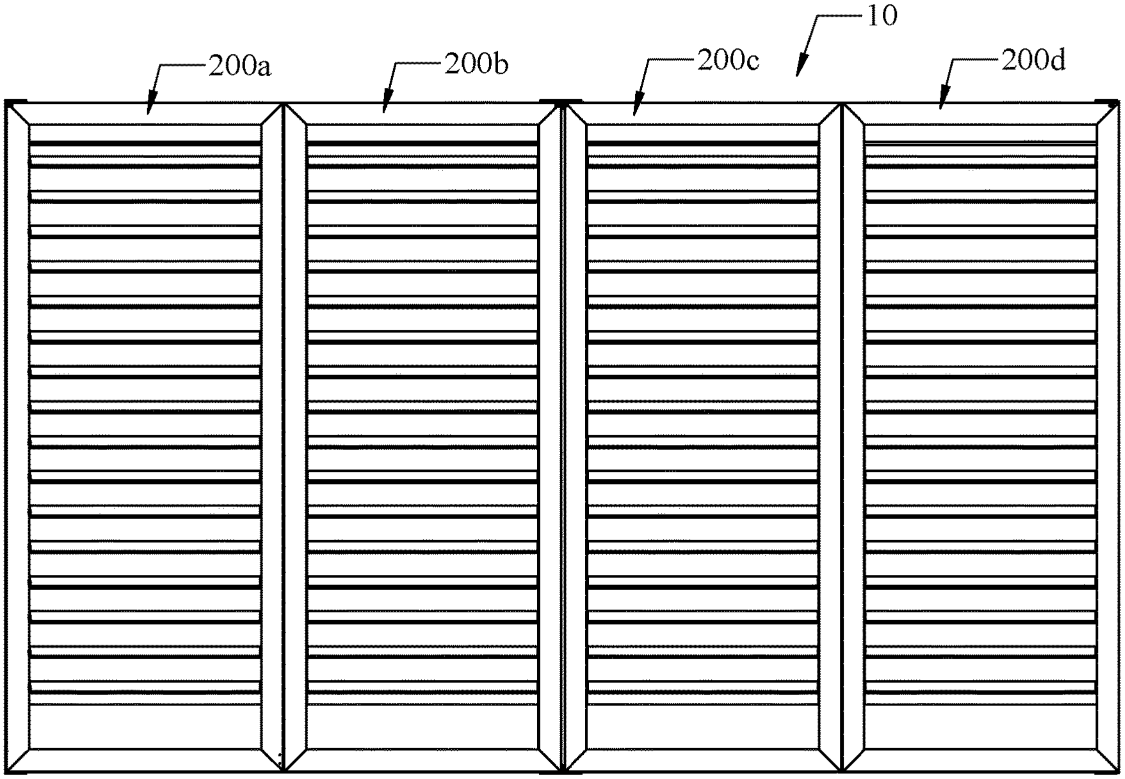
FIG. 1D is a front, plan view of a (shutter) system including a double-bifold configuration and shown in a closed configuration.
Figure 1E:
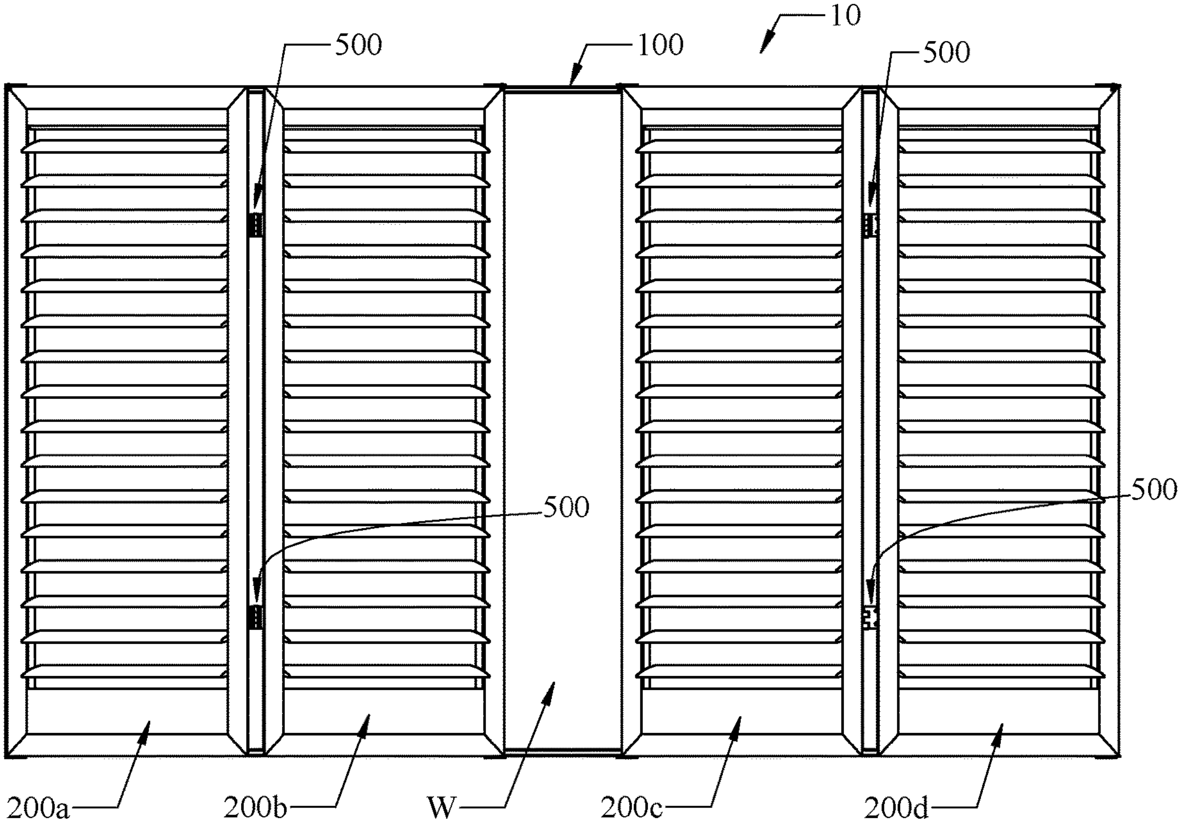
FIG. 1E is a front, plan view of the (shutter) system seen in FIG. 1D and shown in a (partially) open configuration.
Figure 1F:
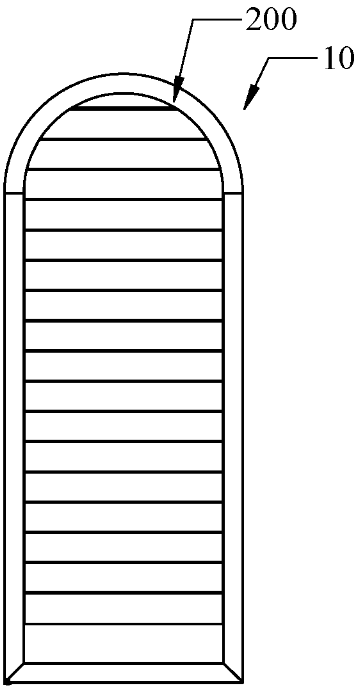
FIG. 1F is a front, plan view of a (shutter) system including a single, arched panel.
Figure 1G:
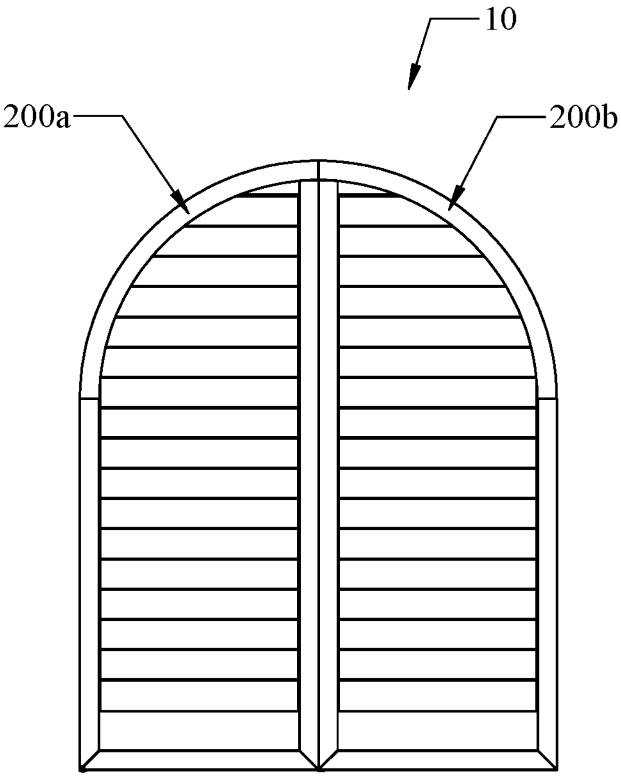
FIG. 1G is front, plan view of a (shutter) system including a pair of arched panels shown in the double-panel configuration.
Figure 1H:
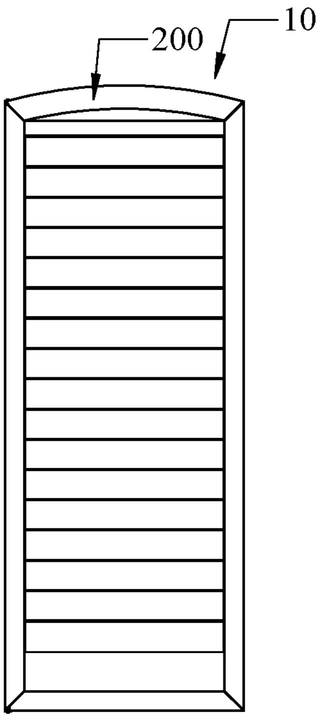
FIG. 1H is a front, plan view of a (shutter) system including a single, eyebrow-shaped panel.
Figure 1I:
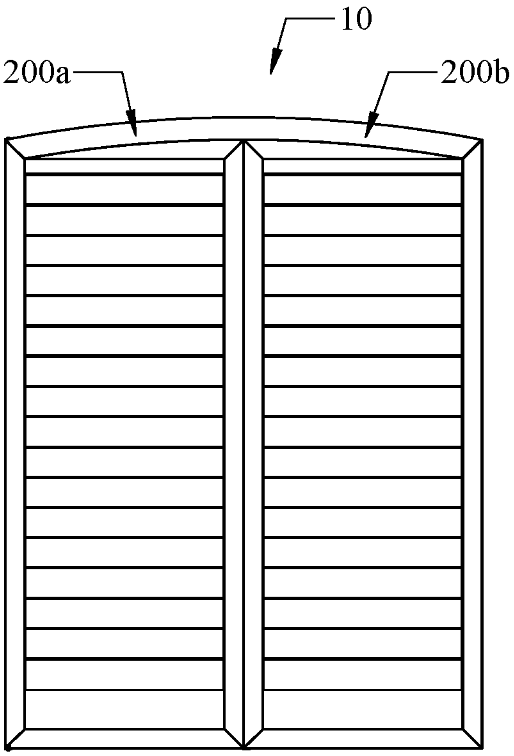
FIG. 1I is front, plan view of a (shutter) system including a pair of eyebrow-shaped panels shown in the double-panel configuration.
Figure 2:
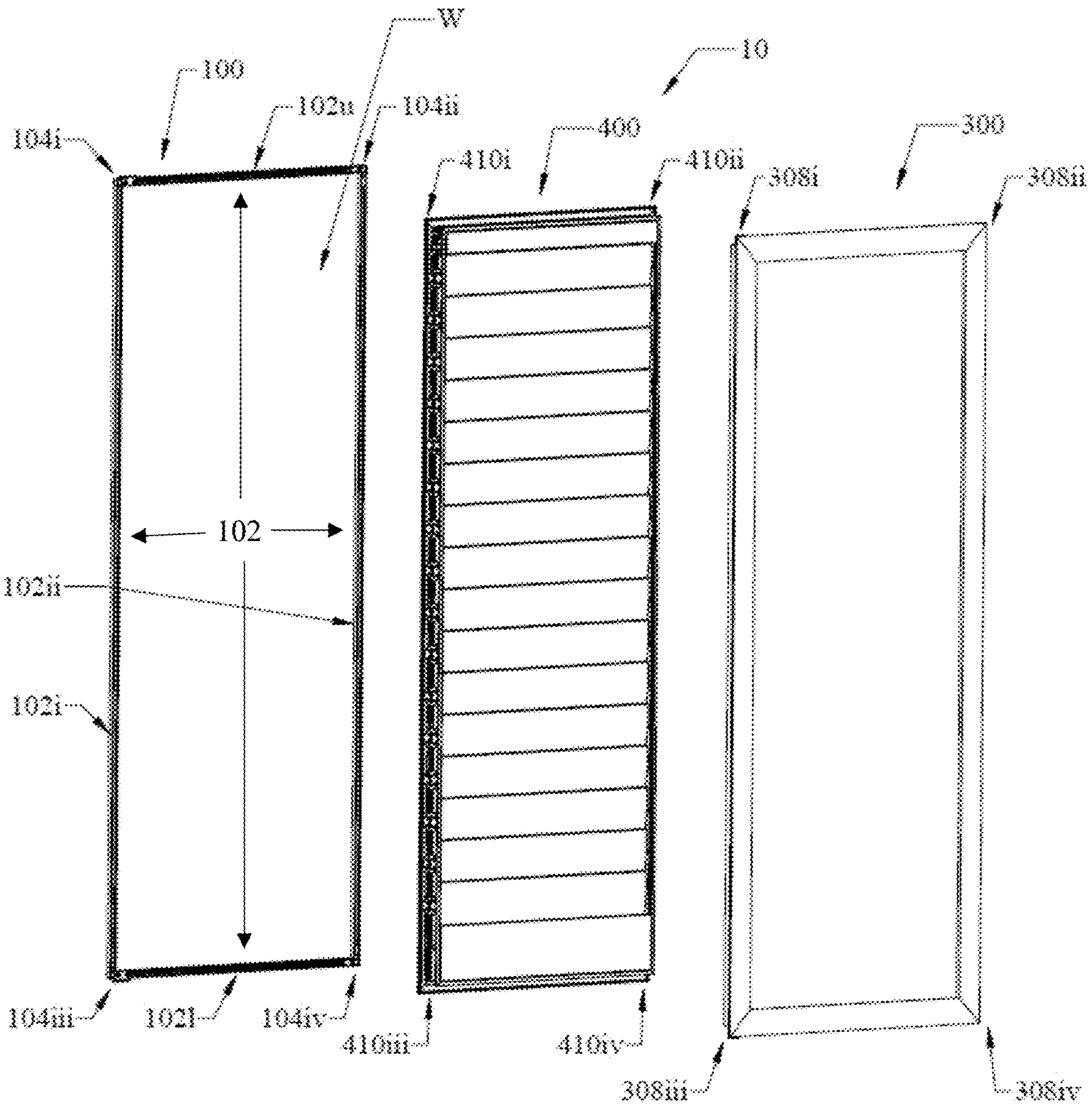
FIG. 2 is a front, perspective view of the panel seen in FIG. 1, which includes a mounting frame; an outer frame; and an inner frame, shown with parts separated.

FIGS. 1-2 illustrate a (shutter) system 10 according to the present disclosure that is configured for connection to a mounting surface S (FIG. 1A) (e.g., a window W, a door, etc.). The system 10 includes a mounting frame 100 that supports one or more panels 200, each of which defines corner sections 202*i*-202*iv* and includes an outer frame 300 (FIG. 2) that is configured for connection to the mounting frame 100 and an inner frame 400 that is configured for connection to the outer frame 300 such that the inner frame 400 of each panel 200 is connected to (engaged with) the mounting frame 100 via the outer frame 300. The system 10 is configured for installation in a variety of configurations, including, for example, a single-panel configuration (FIG. 1), which includes a single panel 200 that is pivotably supported adjacent to a window W for movement between open and closed configurations (positions); a double-panel configuration (FIG. 1A), which includes two individual panels 200*a*, 200*b* that are positioned on opposites sides of the window W (e.g., in a saloon-door style orientation); a single bi-fold configuration (FIGS. 1B, 1C), in which two panels 200*a*, 200*b* are pivotably connected together (engaged); a double bi-fold configuration (FIGS. 1D, 1E), in which four panels 200*a*, 200*b*, 200*c*, 200*d* are arranged into two bi-fold assemblies (FIGS. 1B, 1C) that are positioned on opposites sides of the window W. Although illustrated as being (generally)polygonal (e.g., rectangular) in configuration in FIGS. 1-1E, the panel(s) 200 may be configured in any desired manner in various embodiments of the disclosure, including, for example, non-polygonal configurations. For example, FIG. 1F illustrates a single-panel configuration in which the panel 200 is arch-shaped; FIG. 1G illustrates a double-panel configuration in which each of the panels 200*a*, 200*b* includes a half-arched configuration; FIG. 1H illustrates a single-panel configuration in which the panel 200 is eyebrow-shaped; and FIG. 1I illustrates a double-panel configuration in which each of the panels 200*a*, 200*b* includes a half-eyebrow configuration.

Figure 3A:
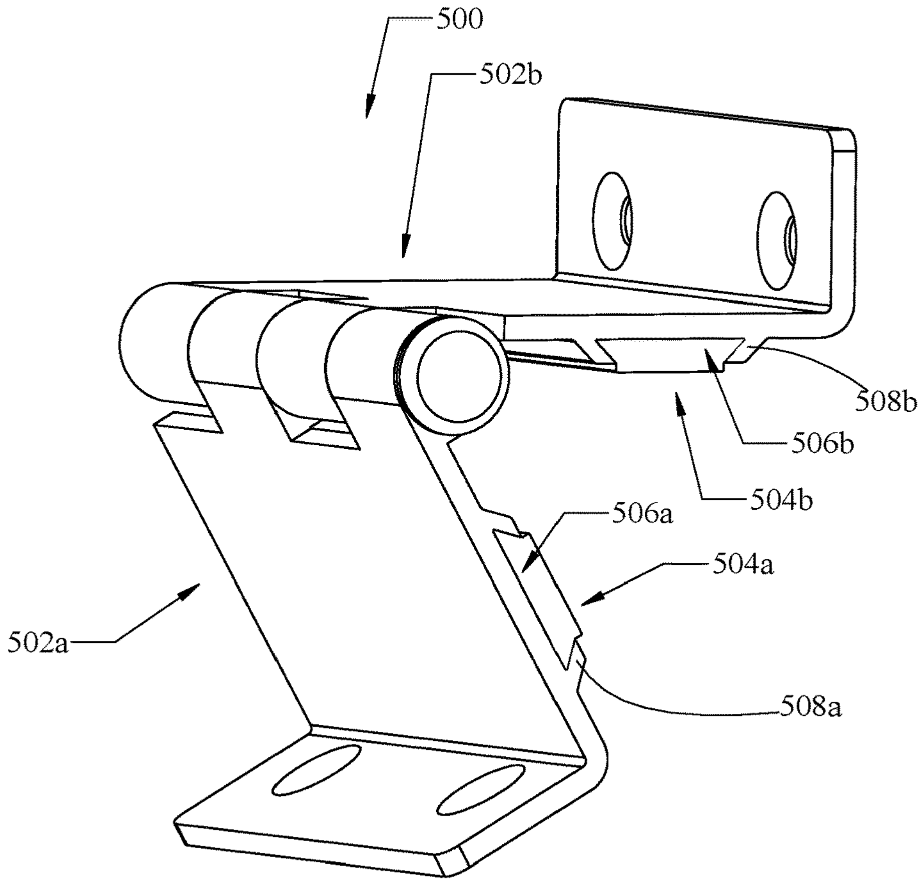
FIG. 3A is a top, perspective view of a hinge assembly used to connect adjacent panels and shown in an open configuration.
Figure 3B:
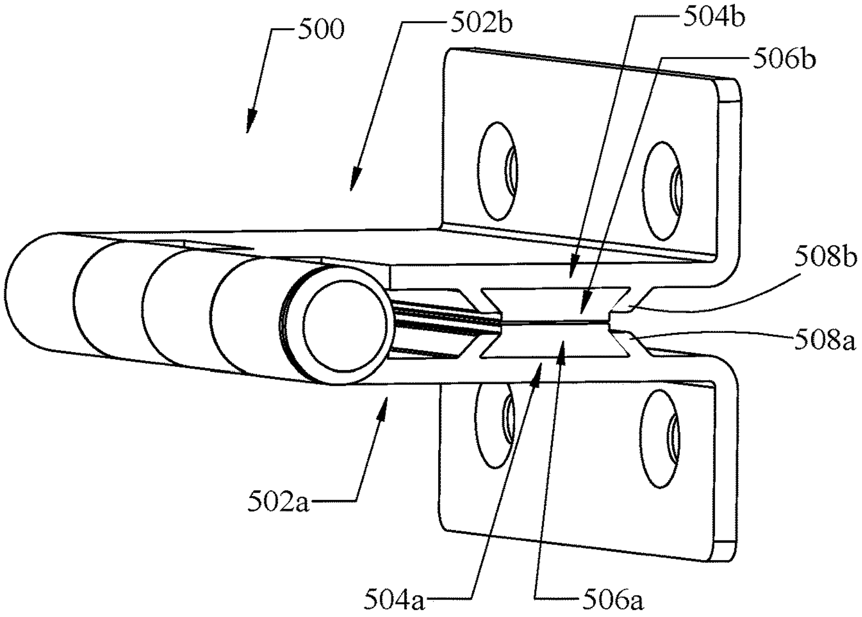
FIG. 3B is a top, perspective view of the hinge assembly shown in a closed configuration.

In the bi-fold configuration (FIGS. 1B, 1C), the system 10 includes two (e.g., first and second) adjacent panels 200*a*, 200*b* that are pivotably connected to (engaged with) each other so as to allow the panels 200*a*, 200*b* to fold inwardly (towards each other), and thereby reveal the window W. In the bi-fold configuration, the panels 200*a*, 200*b* are connected by one or more hinge assemblies 500 (FIGS. 3A, 3B), which are configured to pivotably connect the outer frame 300 of each panel 200 to the mounting frame 100. Each hinge assembly 500 includes a first hinge portion 502*a* (FIGS. 3A, 3B) that is connected (engaged with) to the first panel 200*a* (e.g., via fasteners), and a second hinge portion 502*b* that is connected to (engaged with) the second panel 200*b* (e.g., via fasteners). When the panels 200*a*, 200*b* are opened (folded), the hinge portions 502*a*, 502*b* are positioned in adjacent (e.g., contacting relation), as seen in FIG. 3B.

In certain embodiments, it is envisioned that the hinge portions 502*a*, 502*b* may include corresponding securement members 504*a*, 504*b*, respectively, to maintain the opened (folded) orientation of the panels 200*a*, 200*b*, in which the panels 200*a*, 200*b* extend in (generally) parallel relation to each other and in (generally)transverse (e.g., orthogonal) relation to the window W. In the specific embodiment seen in FIGS. 3A, 3B, the securement members 504*a*, 504*b* are illustrated as including magnets 506*a*, 506*b*, respectively. It should be appreciated, however, that the securement members 504*a*, 504*b* may include any members, structures, and/or mechanisms suitable for the intended purpose of maintaining the open (folded) orientation of the panels 200*a*, 200*b*, such as, for example, detents, posts, clips, etc.

The magnets 506*a*, 506*b* are received within channels 508*a*, 508*b* defined by the hinge portions 502*a*, 502*b*, respectively. It is envisioned that the magnets 506*a*, 506*b* may be maintained within the respective channels 508*a*, 508*b* in any suitable manner and/or using any suitable structure(s) or mechanism(s). For example, the channels 508*a*, 508*b* and the magnets 506*a*, 506*b* may include corresponding configurations that facilitate receipt of the magnets 506*a*, 506*b* in the channels 508*a*, 508*b* in an interference fit (e.g., a press-fit). Additionally, or alternatively, it is envisioned that the magnets 506*a*, 506*b* may be secured within the channels 508*a*, 508*b* using an adhesive, fasteners, etc.

With reference to FIGS. 4A-7A and 4B-7B, the mounting frame 100 will be discussed. FIGS. 4A-7A illustrate assembly of the mounting frame 100 in the single-panel configuration (FIG. 1), and FIGS. 4B-7B illustrate assembly of the mounting frame 100 in the bi-fold configuration (FIGS. 1B, 1C).

Figure 4:
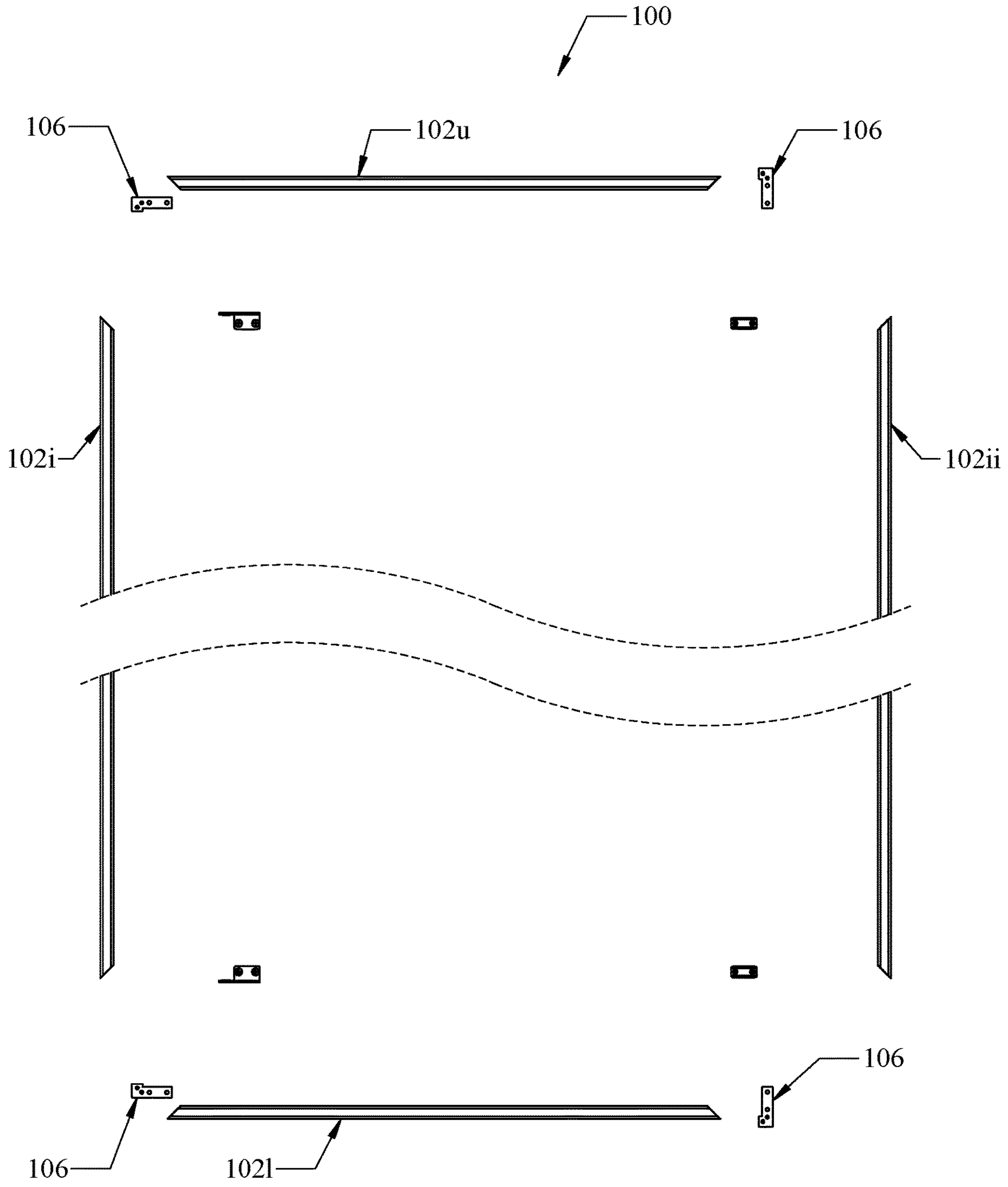
FIG. 4 is a front, perspective view of the mounting frame shown with parts separated.

The mounting frame 100 is configured for connection (securement) to the mounting surface S (FIG. 1A) (e.g., on or about the window W or a door) and includes four segments 102 (e.g., sections, profiles, etc.), which are shown separated from each other in FIG. 4. More specifically, in the illustrated embodiment, the mounting frame 100 includes respective (horizontal) upper and lower segments 102*u*, 102*l*, and opposite side (vertical) segments 102*i*, 102*ii* that extend between the segments 102*u*, 102*l* so as to define four corner sections 104*i*-104*iv* (FIG. 2). The segments 102 are connected to (engaged with) each other by four (asymmetrical) identical mounting frame brackets 106, which not only connect the segments 102 so as to define the corner sections 104, but enhance stability and rigidity of the mounting frame 100. The mounting frame brackets 106 each include a first (short) leg 106*i* with one or more small holes (openings, apertures, etc.) 108*i* that are each configured to receive a set screw (or other such fastener) 110*i*, and a second (long) leg 106*ii* with one or more larger holes (openings, apertures, etc.) 108*ii* that are each configured to receive an installation screw (or other such fastener) 110*ii*. The set screw(s) 110*i* are received in the threading defined by the holes 108*i* in the mounting frame brackets 106, and are configured to fix the mounting frame brackets 106 to the mounting frame 100. The installation screw(s) 110*ii* pass through the larger hole (s) 108*ii*, and are configured to connect (secure) the mounting frame 100 to the window W (or to the wall supporting the window W). In addition to receiving the installation screw(s) 110*ii*, the larger hole(s) 108*ii* provide locating features that facilitate proper installation of pivot assemblies P (discussed in further detail below) to guard against improper installation of the pivot assemblies P.

Figure 4A:
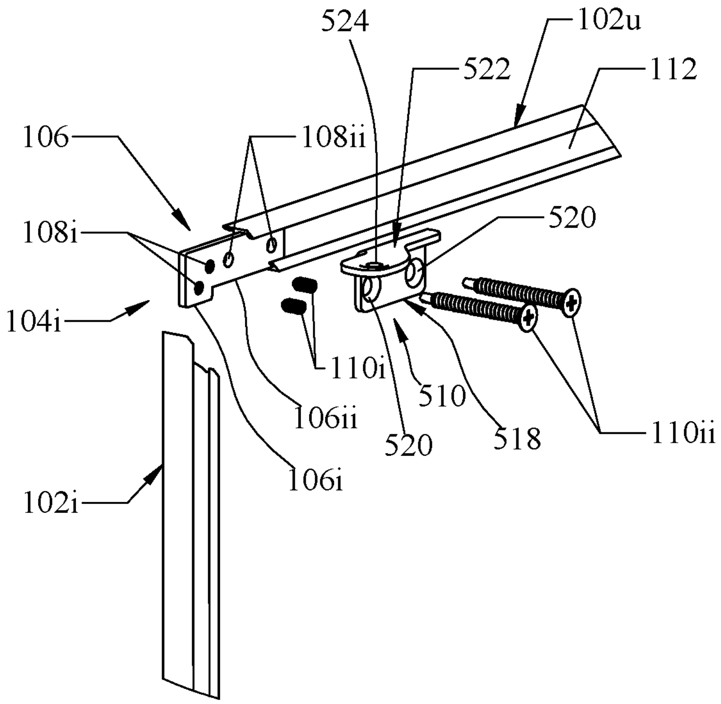
FIG. 4A is a front, perspective view of a corner portion (e.g., an upper, left corner portion) of the mounting frame during assembly in connection with a single-panel (shutter) system.
Figure 5A:
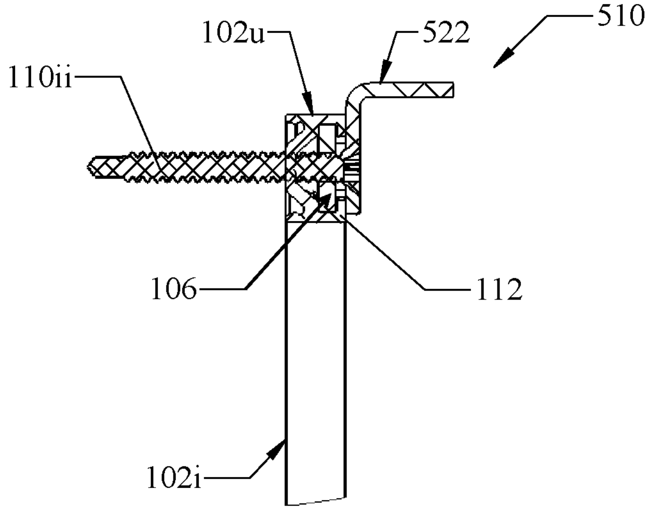
FIG. 5A is a vertical, cross-sectional view of the corner portion of the mounting frame seen in FIG. 4A upon assembly.
Figure 4B:
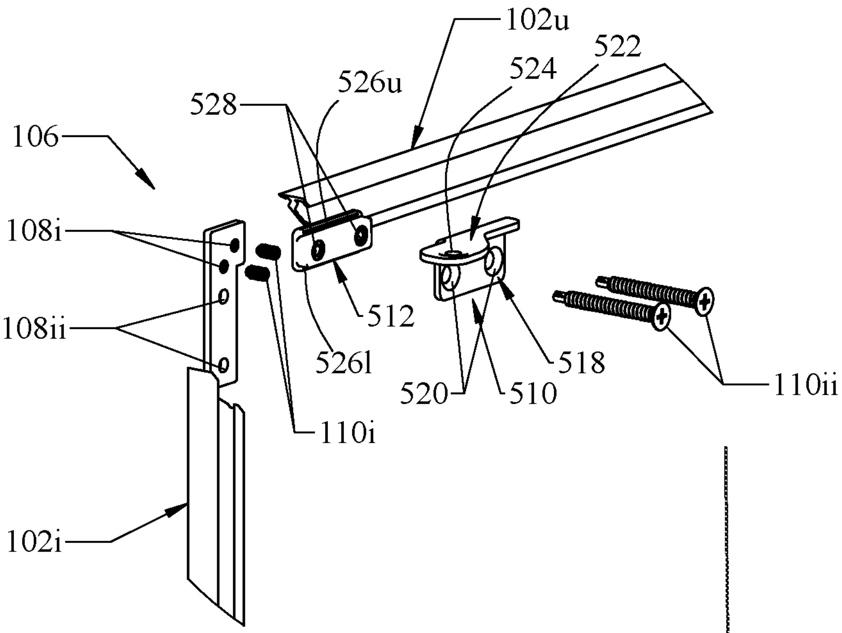
FIG. 4B is a front, perspective view of a corner portion (e.g., an upper, left corner portion) of the mounting frame during assembly in connection with a bifold (shutter) system.
Figure 5B:
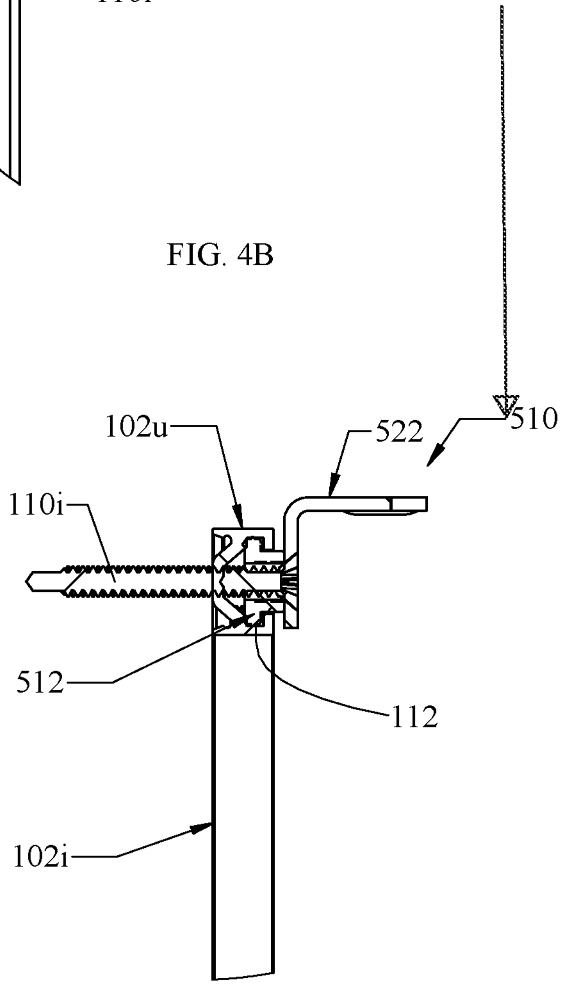
FIG. 5B is a vertical, cross-sectional view of the corner portion of the mounting frame seen in FIG. 4B upon assembly.
Figure 6A:
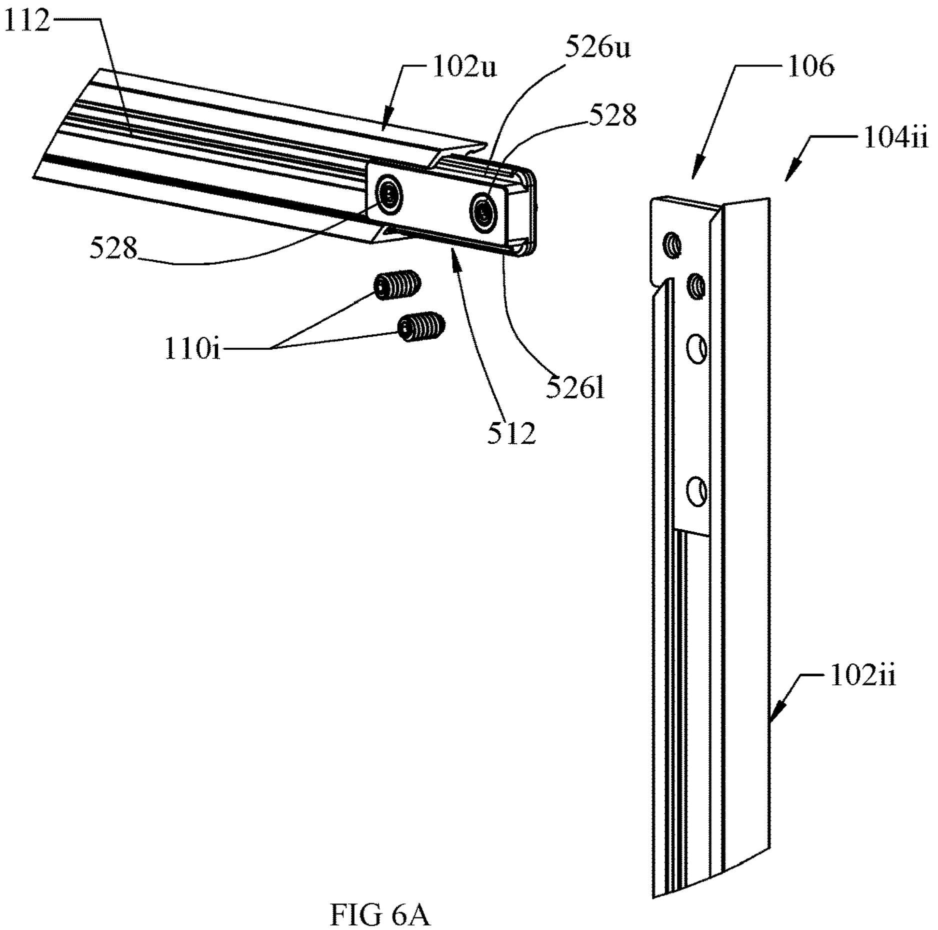
FIG. 6A is a front, perspective view of a corner portion (e.g., an upper, right corner portion) of the mounting frame during assembly in connection with the single-panel (shutter) system.
Figure 7A:
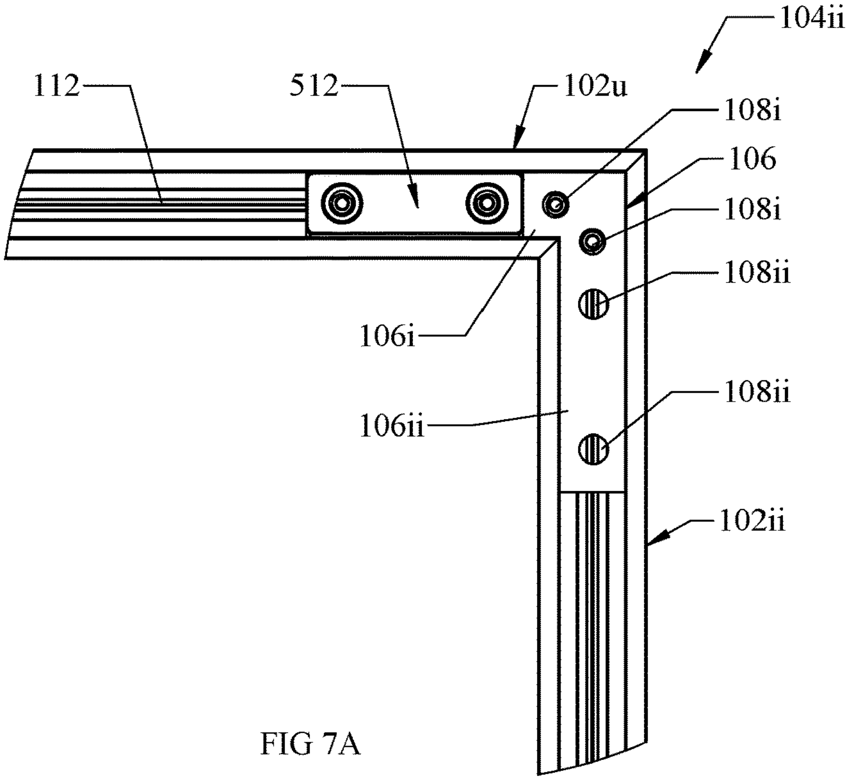
FIG. 7A is a front, plan view of the corner portion of the mounting frame seen in FIG. 6A upon assembly.
Figure 6B:
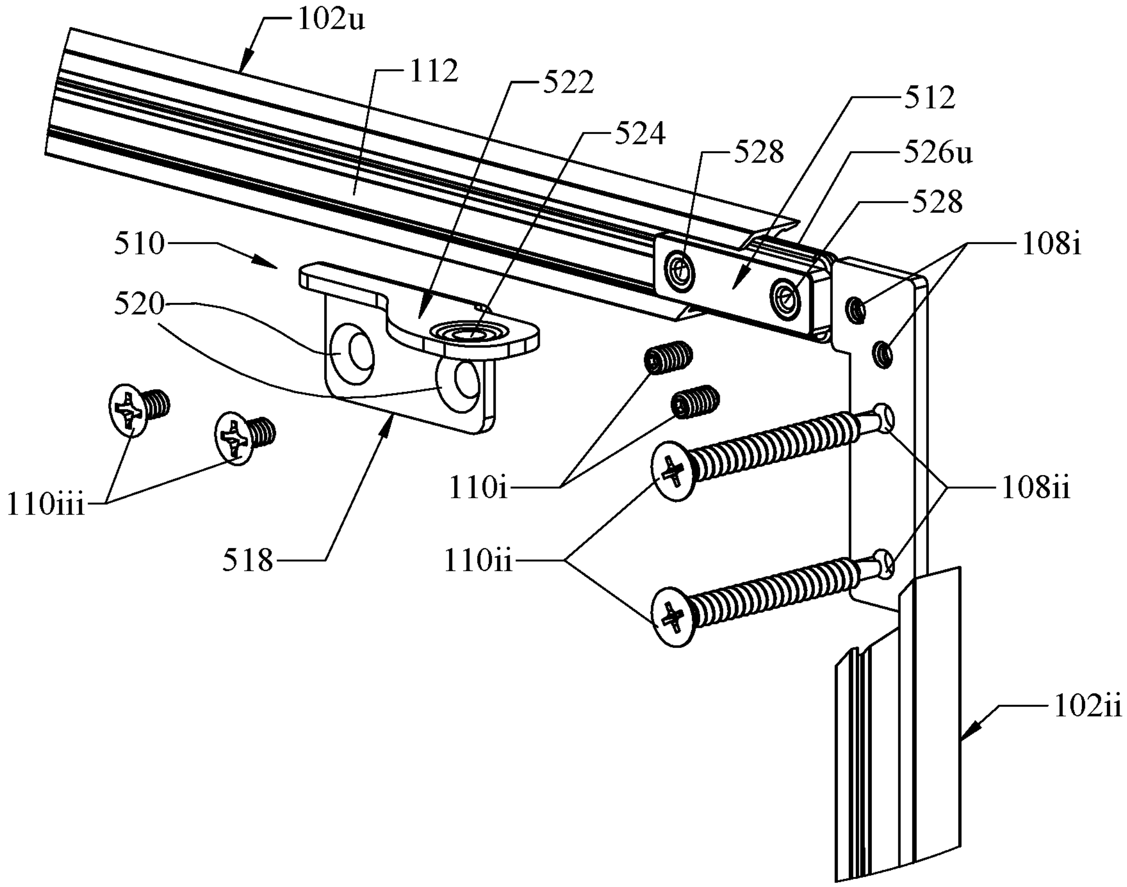
FIG. 6B is a front, perspective view of a corner portion (e.g., an upper, right corner portion) of the mounting frame during assembly in connection with the bifold (shutter) system.
Figure 7B:
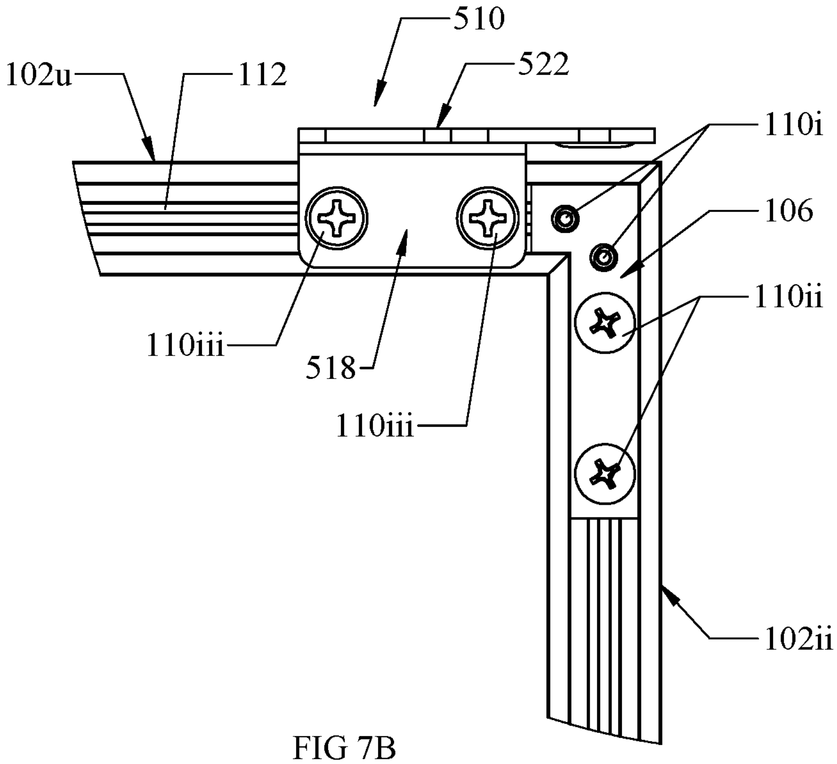
FIG. 7B is a front, plan view of the corner portion of the mounting frame seen in FIG. 6B upon assembly.

As seen in FIGS. 4A and 7A, the orientation of the mounting frame bracket 106 is varied depending on the particular location of the mounting frame brackets 106. For example, in the corner section 104*i* (FIG. 4A), the leg 106*ii* of the mounting frame bracket 106 is oriented horizontally within the segment 102*u*, whereas in the corner section 104*ii* (FIG. 7A), the leg 106*ii* of the mounting frame bracket 106 is oriented vertically within the segment 102*ii*.

Figure 8A:
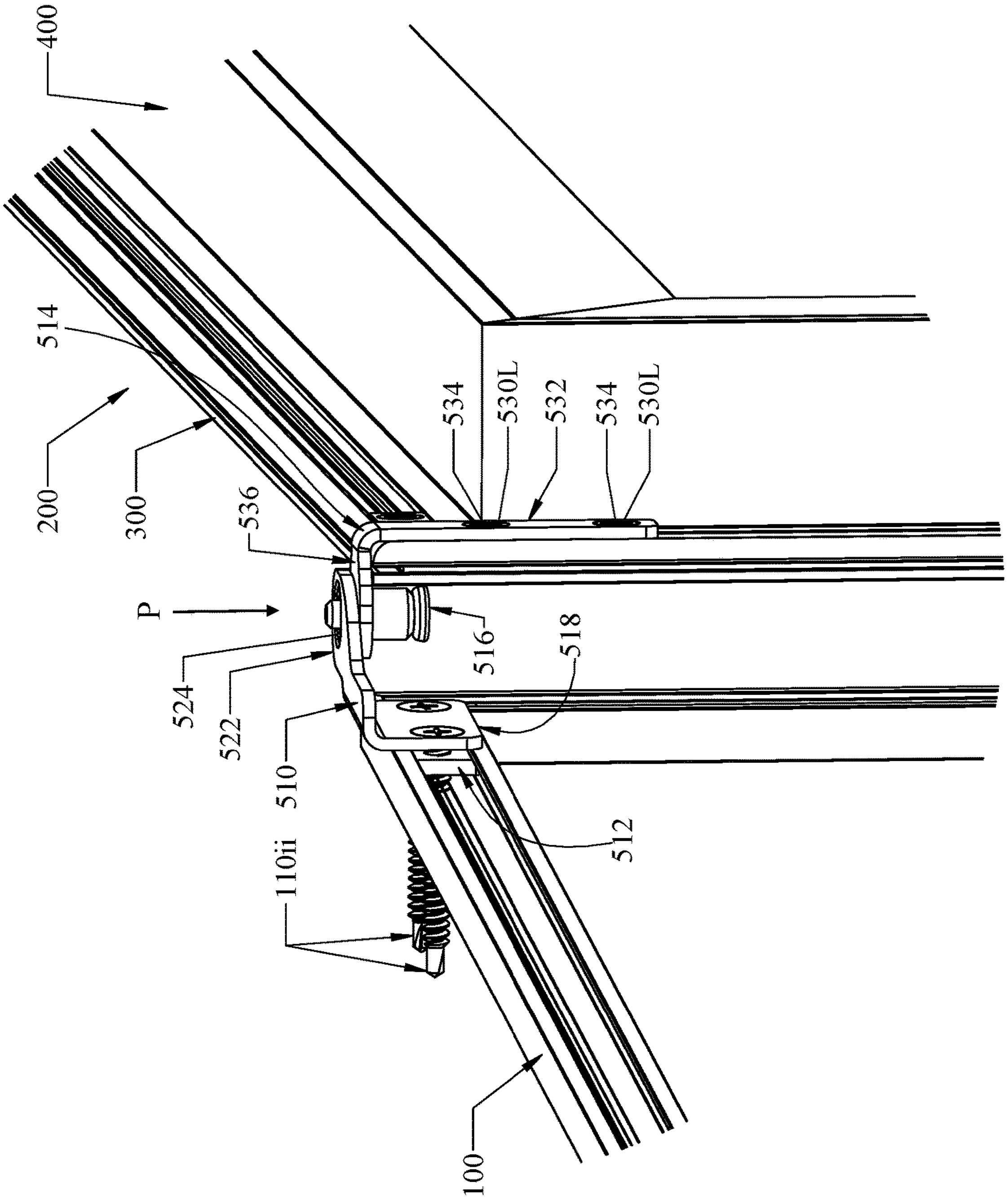
FIG. 8A is a front, (inner) perspective view of a panel connected to (engaged with) the mounting frame via a pivot assembly in the single-panel shutter system.
Figure 8B:
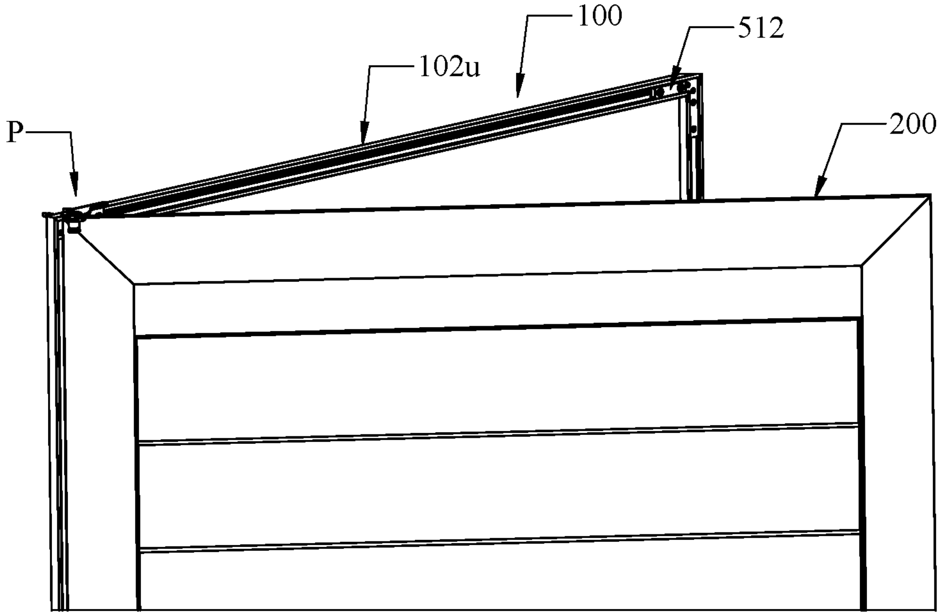
FIG. 8B is a front, (outer) perspective view of the panel connected to (engaged with) the mounting frame via the pivot assembly in the single-panel shutter system.
Figure 8C:
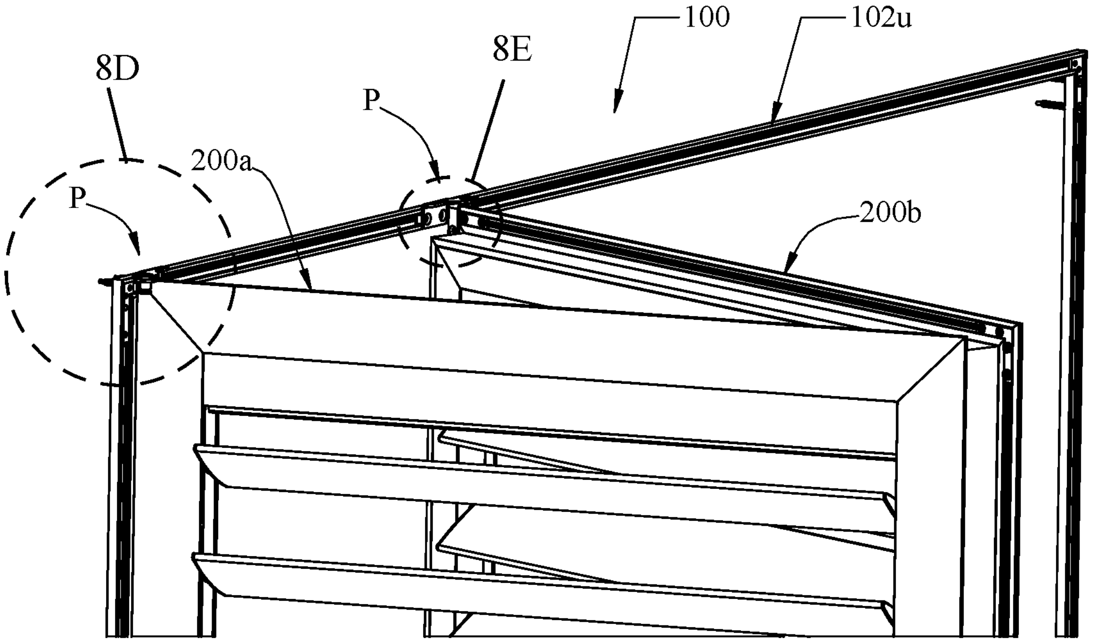
FIG. 8C is a front, (outer) perspective view illustrating the connection of panels to the mounting frame via pivot assemblies in the bifold shutter system.
Figure 8D:
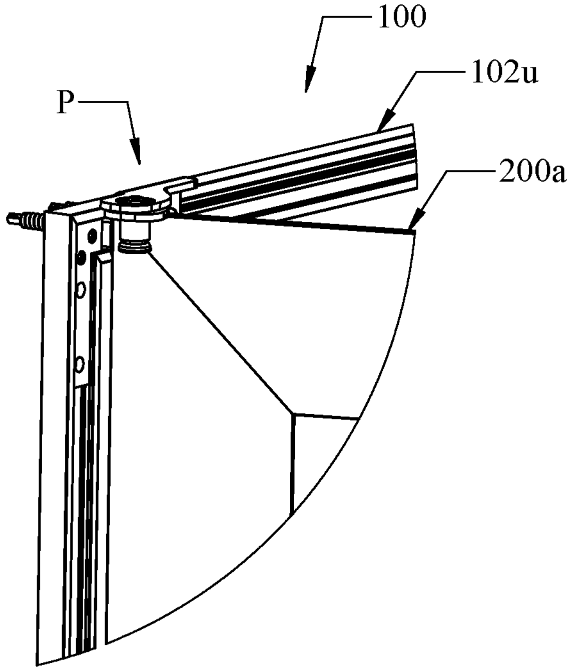
FIGS. 8D and 8E are enlargements of the areas of detail identified in FIG. 8C.
Figure 8E:
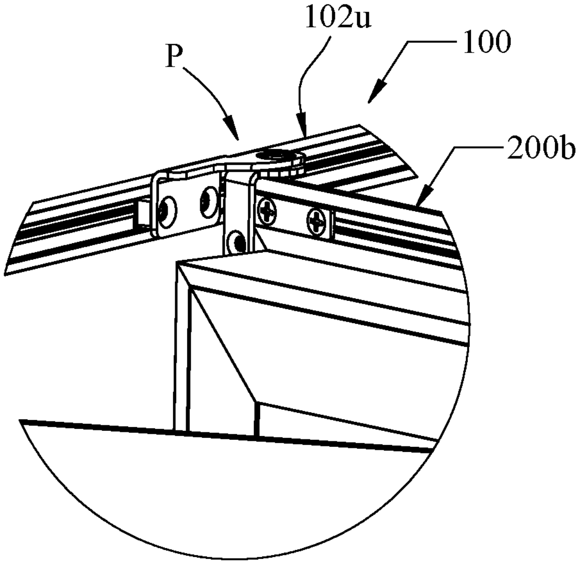
Figure 9:
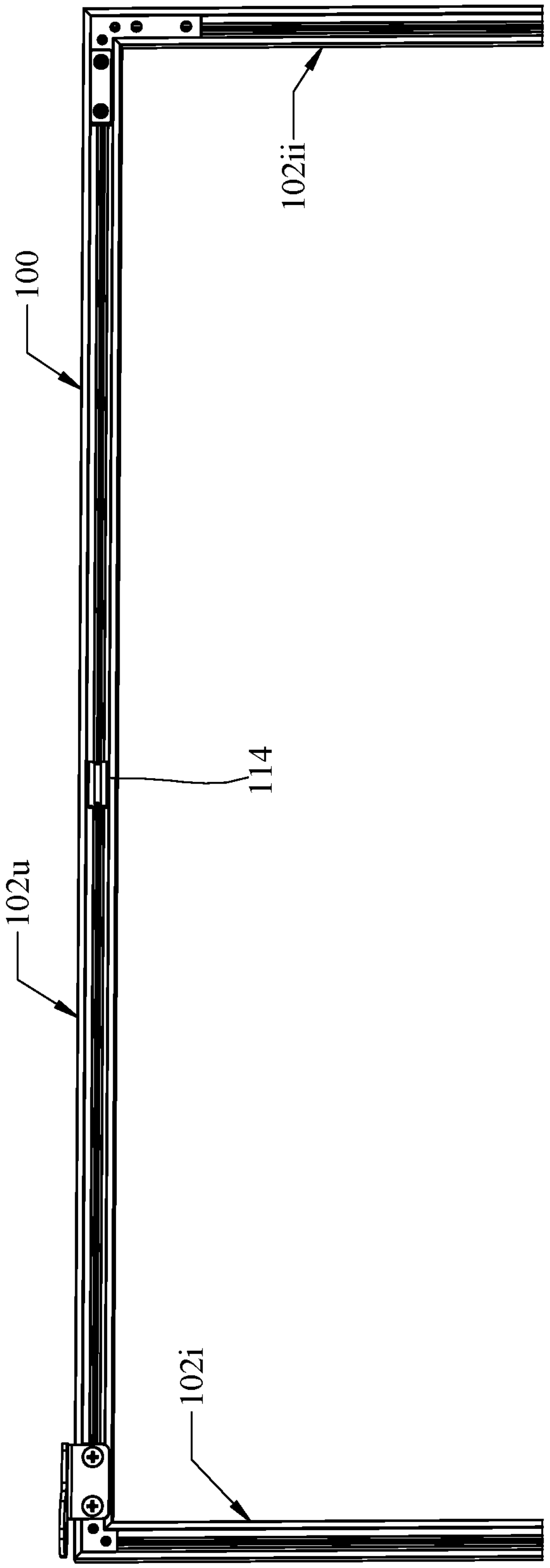
FIG. 9 is a front, perspective view of the mounting frame shown with a leveler.

With reference to FIGS. 8A-13 as well, each panel 200 is connected to (engaged with) the mounting frame 100 by upper and lower pivot assemblies P. Each pivot assembly P includes: a hinge receiver 510 that is configured for connection to (engagement with) the mounting frame 100; a hinge slide 512 that is configured for connection to (engagement with) the mounting frame 100; a hinge base 514 that is configured for connection to (engagement with) the hinge receiver; and a hinge pin 516 that is configured for insertion through the hinge base 514 and the hinge receiver 510 such that the hinge base 514 is pivotably connected to the hinge receiver 510. The pivot assemblies P allow the panel(s) 200 to pivot inwardly (towards) and outwardly (away) from the window W in the single-panel configuration (FIG. 1). In the bi-fold configuration (FIGS. 1B, 1C, 8C, 8E), the pivot assemblies P allow for lateral translation (e.g., sliding) of the panels 200*a*, 200*b*, as well as pivoting of the panels 200*a*, 200*b* in relation to each other and the mounting frame 100. FIG. 8A provide a top, perspective view of one of the pivot assemblies P; FIG. 8B illustrates use and positioning of the pivot assemblies P in the single-panel configuration (FIG. 1); and FIGS. 8C-8E illustrates use and positioning of the pivot assemblies P during use in the bi-fold configuration (FIGS. 1B, 1C). More specifically, in the bi-fold configuration, the system includes four pivot assemblies P (upper and lower pivot assemblies P associated with each of the panels 200*a*, 200*b*), which facilitate pivoting of the panel 200*a* in relation to the mounting frame 100 and the window W, as well as pivoting of the panel 200*b* in relation to the panel 200*a*; the mounting frame 100; and the window W. Additionally, the pivot assemblies P associated with the panel 200*b* also allow for lateral translation (e.g., sliding) of the panel 200*b* relative to the first panel 200*a* and the mounting frame 100. Whereas the hinge slide 512 in each of the (upper and lower) pivot assemblies P associated with the panel 200*a* is fixed in relation to the mounting frame 100, the hinge slide 512 in each of the (upper and lower) pivot assemblies P associated with the panel 200*b* is movable (slidable), as described in further detail below.

Each hinge receiver 510 includes a vertical segment (backing) 518 with one or more through holes 520, and a horizontal flange 522 with a through hole 524 that extends outwardly (away from) the mounting frame 100 and the window W. In the single panel configuration (FIG. 1), the system 10 includes two hinge receivers 510 (i.e., one included in each of the upper and lower pivot assemblies P), both of which are fixed in relation (connected) to the mounting frame 100. In the bi-fold configuration (FIGS. 1B, 1C), however, the system 10 includes four hinge receivers 510 (i.e., one in each of the upper and lower pivot assemblies P included on each of the panels 200*a*, 200*b*). Whereas the hinge receivers 510 associated with the panel 200*a* are each fixed in relation to the mounting frame 100, the hinge receivers 510 associated with the panel 200*b* are each allowed to translate laterally (e.g., slide) in relation to the mounting frame 100.

With continued reference to FIGS. 4A-13, each hinge slide 512 includes (upper and lower) flanges 526*u*, 526*l* that are configured for receipt by (support within) a track 112 defined by the mounting frame 100. In the single panel configuration (FIG. 1), the system 10 includes two hinge slides 512 (i.e., one associated with each of the upper and lower pivot assemblies P) that are fixedly connected to (engaged with) the mounting frame 100 by one or more set screws that extend into one or more through holes 528 (FIG. 6A) in the hinge slide 512. In the single panel configuration, it is envisioned that the hinge slide 512 may include a magnetic portion (e.g., face) that connects to a corresponding magnetic portion on the inner frame 400 to maintain connection of the panel 200 to the mounting frame 100 in a closed configuration. In such embodiments, the hinge slides 512 may be fixedly connected to (engaged with) the mounting frame 100 at (or adjacent to) the segment 102*ii* (opposite the hinge receiver 510). In the bi-fold configuration, the system 10 includes four hinge slides 512 (i.e., one associated with each of the upper and lower pivot assemblies P on each the panels 200*a*, 200*b*). With respect to the panel 200*a*, the hinge slides 512 are positioned in (e.g., slidably inserted into) the track 112 defined by the mounting frame 100 such that the hinge slides 512 are located between the mounting frame 100 and the hinge receivers 510. The hinge slides 512 associated with the panel 200*a* are fixed in place by the installation screws 110*ii*, which pass through the hinge receiver 510, through the hinge slide 512, through the mounting frame 100, and into the window W (or the wall supporting the window W). The installation screws 110*ii* thus fix the hinge receivers 510 and the hinge slides 512 to the mounting frame 100. With respect to the panel 200*b*, the hinge slides 512 are connected to (engaged with) the hinge receivers 510 using set screws 110*iii* so that the hinge slides 512 and the hinge receivers 510 are each able to translate laterally (slide) within the track 112 defined by the mounting frame 100.

With continued reference now to FIGS. 4A-13, the hinge bases 514 will be discussed. In the single panel configuration (FIG. 1), the hinge bases 514 are connected to (engaged with) the panel(s) 200 via the outer frame 300 at the upper and lower corner sections of the panel 200 (e.g., the corner sections 202*i*, 202*ii*, or the corner sections 202*ii*, 202*iv*) adjacent to the segment 102*i* (or the segment 10*ii*) of the mounting frame 100 such that the panels(s) 200 are pivotably connected to (engaged with) the mounting frame 100 via the pivot assemblies P, which facilitates pivoting of the panel 200 in relation to the mounting frame 100 and the window W. The hinge bases 514 are superimposed on vertical legs 304*v* of outer frame brackets 302 (FIGS. 11-13) (discussed below) used in assembly of the outer frame 300. Longer screws 530L (discussed below) pass through the hinge bases 514, through the vertical legs 304*v* of the outer frame brackets 302, and into threaded screw port(s) (flute(s)) 306 in the outer frame 300.

In the bi-fold configuration (FIGS. 1B, 1C), the hinge bases 514 associated with the first panel 200*a* are connected (engaged) in the same manner discussed with respect to the single-panel configuration (FIG. 1). With respect to the panel 200*b*, the hinge bases 514 are connected to (engaged with) the outer frame 300 at the corners 202*ii*, 202*iv* of the panel 200*b* adjacent to the segment 102*i* of the mounting frame 100 to facilitate pivoting of the panel 200*b* in relation to the panel 200*a* and the mounting frame 100 (and the window W). The hinge bases 514 are superimposed on the vertical legs 304*v* of the outer frame brackets 302, and the longer screws 530L pass through the hinge bases 514, through the vertical legs 304*v* of the outer frame brackets 302, and into the screw port(s) 306 in the outer frame 300.

Each hinge base 514 includes a vertical flange 532 with through holes 534 (FIG. 13) that receive the longer screws 530L, and a horizontal flange 536 with a through hole 538 that aligns with the through hole 524 in the horizontal flange 522 of the hinge receiver 510.

The hinge pin 516 (FIG. 8A) extends though the hinge base 514 and through the hinge receiver 510 to pivotably connect the respective outer and inner frames 300, 400 to the mounting frame 100. The hinge pin 516 may include an internal biasing member to facilitate assembly and disassembly.

In certain embodiments, the mounting frame 100 may include a leveler 114 (FIG. 9) to facilitate proper installation. It is envisioned that the leveler 114 may either integral to the mounting frame 100 (e.g., incorporated into one or more of the segments 102), or that the leveler 114 may be configured for connection to the mounting frame 100.

Figure 10:
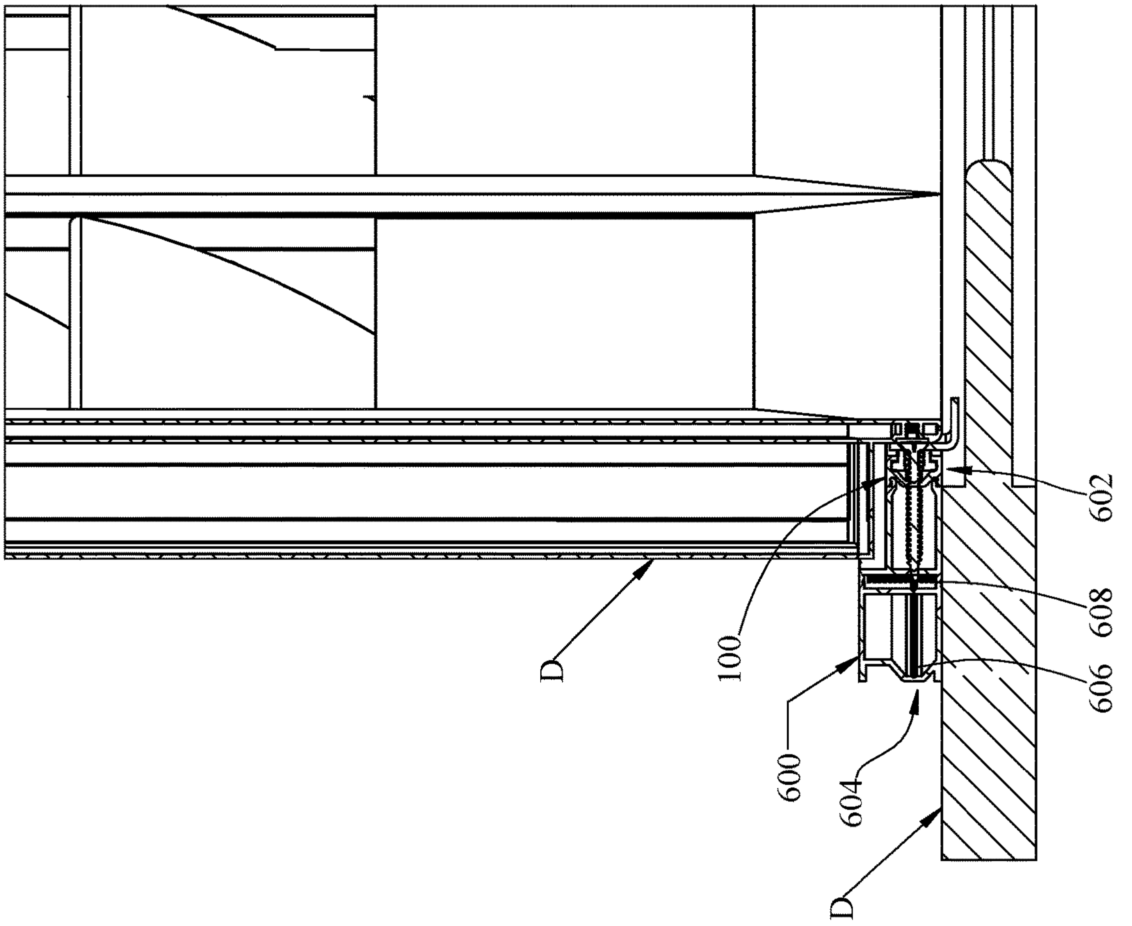
FIG. 10 is a front, perspective, cross-sectional view of the mounting frame shown with a door mount.

As mentioned above, it is envisioned that the system 10 may be adapted for use with a door D (e.g., a French door) as opposed to the window W. In such embodiments, the system 10 may further include a door mount 600 (FIG. 10) that is configured for positioning between the door and the mounting frame 100. The door mount 600 includes an external clip 602, which may be integrally (e.g., monolithically) formed with the door mount 600, to facilitate connection of the mounting frame 100 to the door mount 600. For example, it is envisioned that the external clip on the door mount 600 may be configured for engagement with the mounting frame 100 so as to establish an interference fit (e.g., a snap-fit). The door mount 600 may be secured to the door via a series of fasteners (e.g., screws) that are configured for insertion through the door mount 600 into the door. In certain embodiments, it is envisioned that the door mount 600 may include an inner face 604 that is positionable in adjacent (e.g., contacting) relation to the door when mounted to a face of the door. As seen in FIG. 10, the inner face 604 may define a channel 606 that is configured to receive the fasteners. In such embodiments, the channel 606 may be recessed so as to define a locating feature for the fasteners (e.g., the channel 606 may be configured to receive heads of the fasteners) to facilitate proper installation of the door mount 600.

It is envisioned that the door mount 600 may be configured for secure to a (front or rear) face of the door, or to the top and/or bottom (end surface) of the door. In such installations, the fasteners may be inserted into the door mount 600 and the door vertically. To allow for such installations, the door mount 600 may include an internal (vertical) passageway 608 that is configured to receive the fasteners. The internal passageway 608 may also provide a locating feature for the fasteners to facilitate proper installation of the door mount 600.

Figure 11:
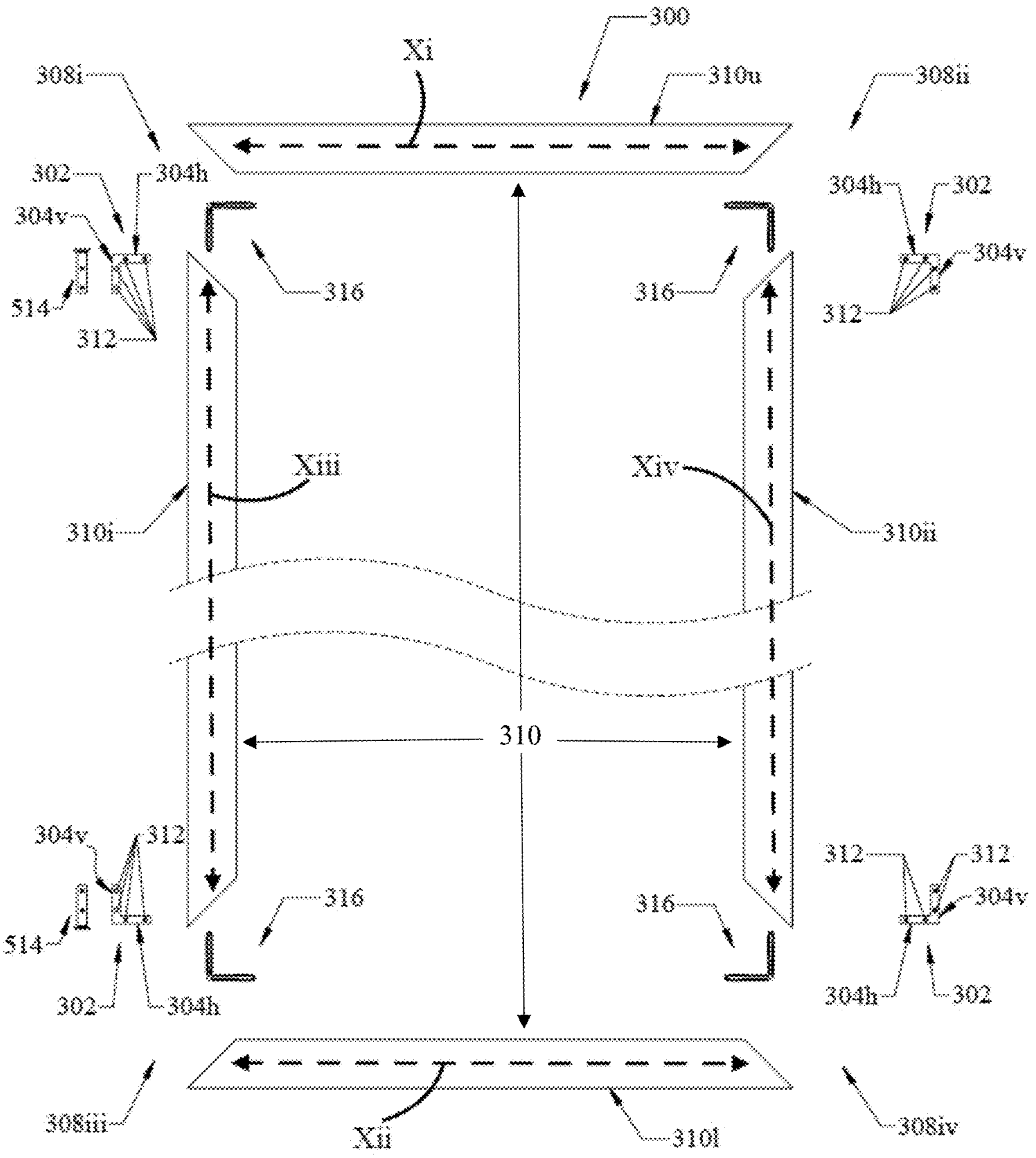
FIG. 11 is a front, plan view of the outer frame shown with parts separated.
Figure 12:
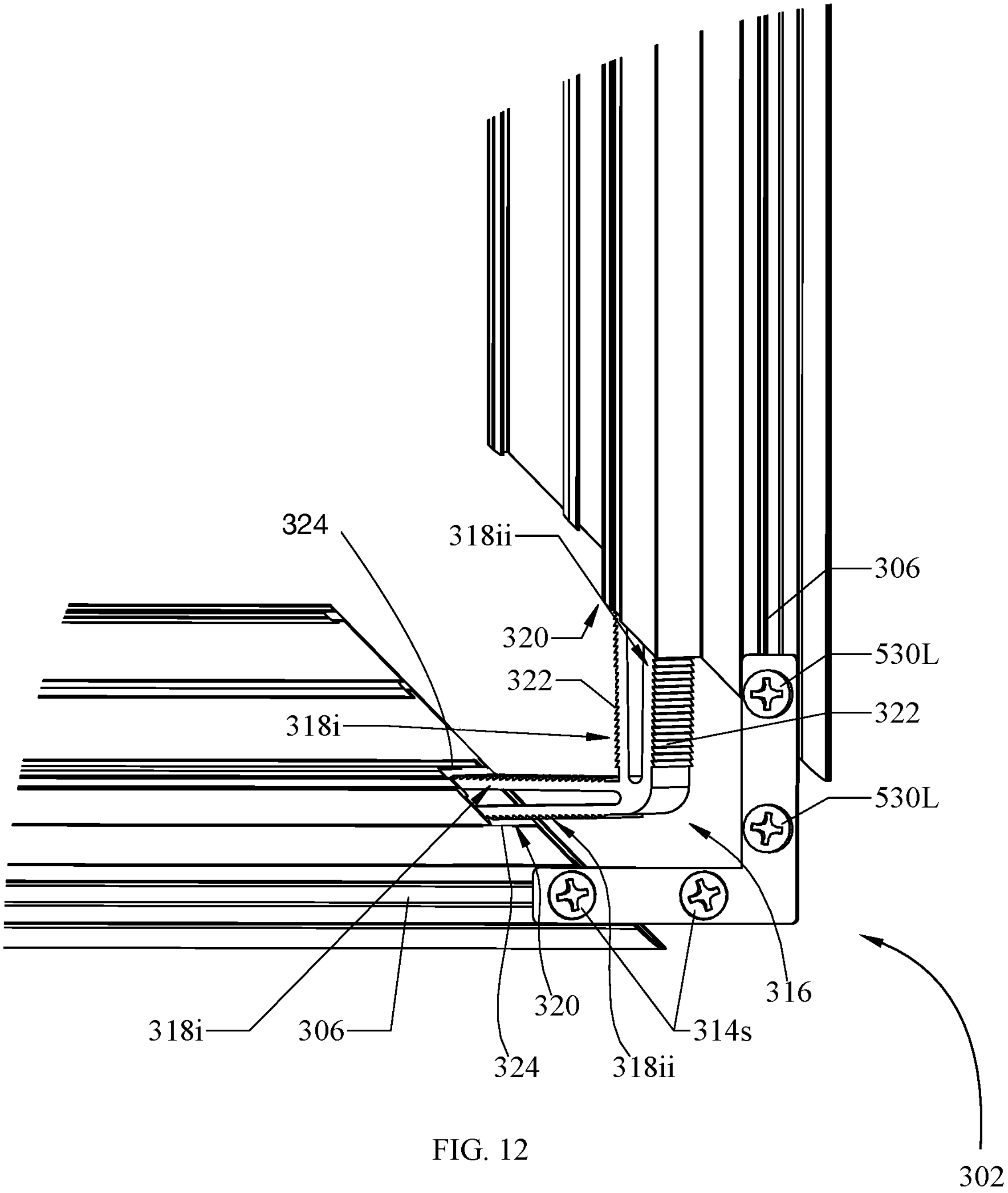
FIG. 12 is a front, perspective view of a corner portion (e.g., a lower, right corner portion) of the mounting frame during assembly.
Figure 13:
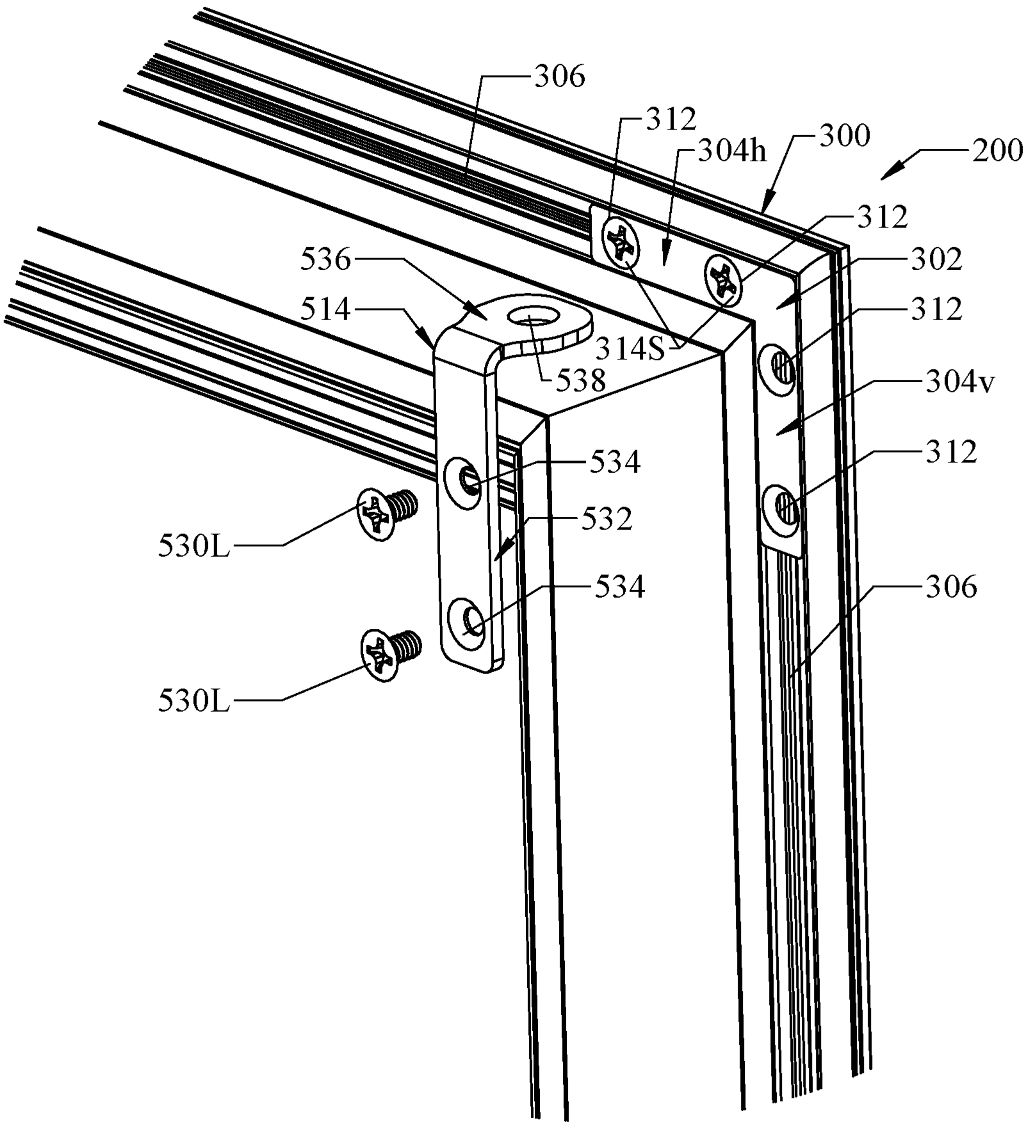
FIG. 13 is a front, perspective view of a corner portion of the panel during connection to the mounting frame.

With reference now to FIGS. 11-13 in particular, the outer frame 300 will be discussed. The outer frame 300 includes the aforementioned screw port(s) 306, which facilitate connection of the hinge bases 514 to the outer frame brackets 302. As seen in FIGS. 12, 13, for example, the screw port(s) 306 may be integrally formed with the outer frame 300 (e.g., via extrusion) to thereby obviate any need to drill holes in the outer frame 300 during assembly of the system 10. It is envisioned that the screw port(s) may be located only in corner sections 308*i*-308*iv* of the outer frame 300, or, alternatively, that that outer frame 300 may define a single, continuous screw port 306 upon assembly that extends about a periphery of the outer frame 300 in its entirety.

It is envisioned that the screw port(s) 306 may also serve to facilitate connection of the pivot assemblies P. More specifically, the fasteners used to connect the pivot assemblies P to the panel(s) 200 may be received in the screw port(s) 306, as elaborated upon below.

As seen in FIG. 11, the outer frame 300 is configured for connection to the inner frame 400 and includes a plurality of (first) segments 310 (e.g., sections, profiles, etc.), which are shown separated from each other in FIG. 11. More specifically, in the illustrated embodiment, the outer frame 300 includes four segments 310 (e.g., respective (horizontal) upper and lower segments 310*u*, 310*l* and opposite side (vertical) segments 310*i*, 310*ii* that extend between the segments 310*u*, 310*l* so as to define the aforementioned corner sections 308*i*-308*iv*). The segments 310*u*, 310*l*, 310*i*, 310*ii* define respective longitudinal axes Xi-Xiv (FIG. 11) and are connected to (engaged with) each other by the outer frame brackets 302, which may be symmetrical in configuration, as shown throughout the figures. The outer frame brackets 302 extend between and connect adjacent segments 310 to enhance stability of the outer frame 300. More specifically, each outer frame bracket 302 includes one or more through holes 312 that are configured to receive set screws such that the set screws extend through the outer frame brackets 302 into the screw port(s) 306 in the outer frame 300. In the illustrated embodiment, shorter screw(s) 314S are used to connect horizontal legs 304*h* of the outer frame brackets 302 to the outer frame 300, and the aforementioned longer screw(s) 530L are used to connect the vertical legs 304*v* of the outer frame brackets 302 to the outer frame 300. The longer screws 530L are also used to connect the hinges bases 514 to the outer frame 300, as described further detail below.

In the single panel configuration (FIG. 1), the system 10 includes two hinge bases 514, one associated with each of the (upper and lower) pivot assemblies P. In the single panel configuration, the shorter screw(s) 314S are used to connect the horizontal legs 304*h* of the outer frame brackets 302 to the outer frame 300, and the longer screw(s) 530L are used to connect the vertical legs 304*v* of the outer frame brackets 302 to the outer frame 300. On the opposite side of the panel 200 (adjacent to the segment 102*ii* of the mounting frame 100), the panel 200 is devoid of the hinge bases 514. As such, the longer screw(s) 530L are not necessary, and the respective horizontal and vertical legs 304*h*, 304*v* of the outer frame brackets 302 may be connected to (engaged with) the outer frame 300 via the shorter screw(s) 314S (exclusively).

In the bi-fold configuration (FIGS. 1B, 1C), the system 10 includes four hinge bases 514, one associated with each of the (upper and lower) pivot assemblies P on each of the panels 200*a*, 200*b*. With respect to the first panel 200*a*, adjacent to the segment 102*i* of the mounting frame 100, for example, the shorter screw(s) 314S are used to connect the horizontal legs 304*h* of the outer frame brackets 302 to the outer frame 300, and the longer screw(s) 530L are used to connect the vertical legs 304*v* of the outer frame brackets 302 to the outer frame 300. On the opposite side of the panel 200*a* (e.g., extending between the corner sections 202*iia*, 202*iva*), the panel 200*a* is devoid of the hinge bases 514. As such, the longer screw(s) 530L are not necessary, and the respective horizontal and vertical legs 304*h*, 304*v* of the outer frame brackets 302 may be connected to (engaged with) the outer frame 300 via the shorter screw(s) 314S (exclusively). With respect to the second panel 200*b*, adjacent to the first panel 200*a*, the shorter screw(s) 314S are used to connect the horizontal legs 304*h* of the outer frame brackets 302 to the outer frame 300, and the longer screw(s) 530L are used to connect the vertical legs 304*v* of the outer frame brackets 302 to the outer frame 300. On the opposite side of the second panel 200*b* (extending between the corner sections 202*iib*, 202*ivb*), the panel 200*b* is devoid of the hinge bases 514. As such, the longer screw(s) 530L are not necessary, and the respective horizontal and vertical legs 304*h*, 304*v* of the outer frame brackets 302 may be connected to (engaged with) the outer frame 300 via the shorter screw(s) 314S (exclusively).

The outer frame 300 also includes corner stakes 316 in each of the corner sections 308*i*-308*iv* so as to extend between and connect adjacent segments 310 to enhance the connection between the segments 310*i*-310*iv* and increase stability and stiffness of the outer frame 300. Each corner stake 316 is (generally) L-shaped in configuration and includes two pairs of legs 318*i*, 318*ii* (FIG. 12). The corner stakes 316 are formed from one or more resilient materials, which allows the corner stakes 316 to flex during assembly of the corner stakes 316 and the outer frame 300. The segments 310*i*-310*iv* of the outer frame 300 define internal cavities 320 that are configured to receive the corner stakes 316. To enhance the connection between the corner stakes 316 and the segments 310*i*-310*iv*, the corner stakes 316 may include outer ridges 322 (or the like) to create friction with internal surfaces 324 of the internal cavities 320.

With reference now to FIGS. 14-37, the inner frame 400 will be discussed. The inner frame 400 includes a plurality of (second) segments 402 that correspond to the segments 310 of the inner frame 300; a top (upper) rail 404; a bottom (lower) rail 406; and a plurality of louvers 408, and supports a drive train 700.

Figure 14:
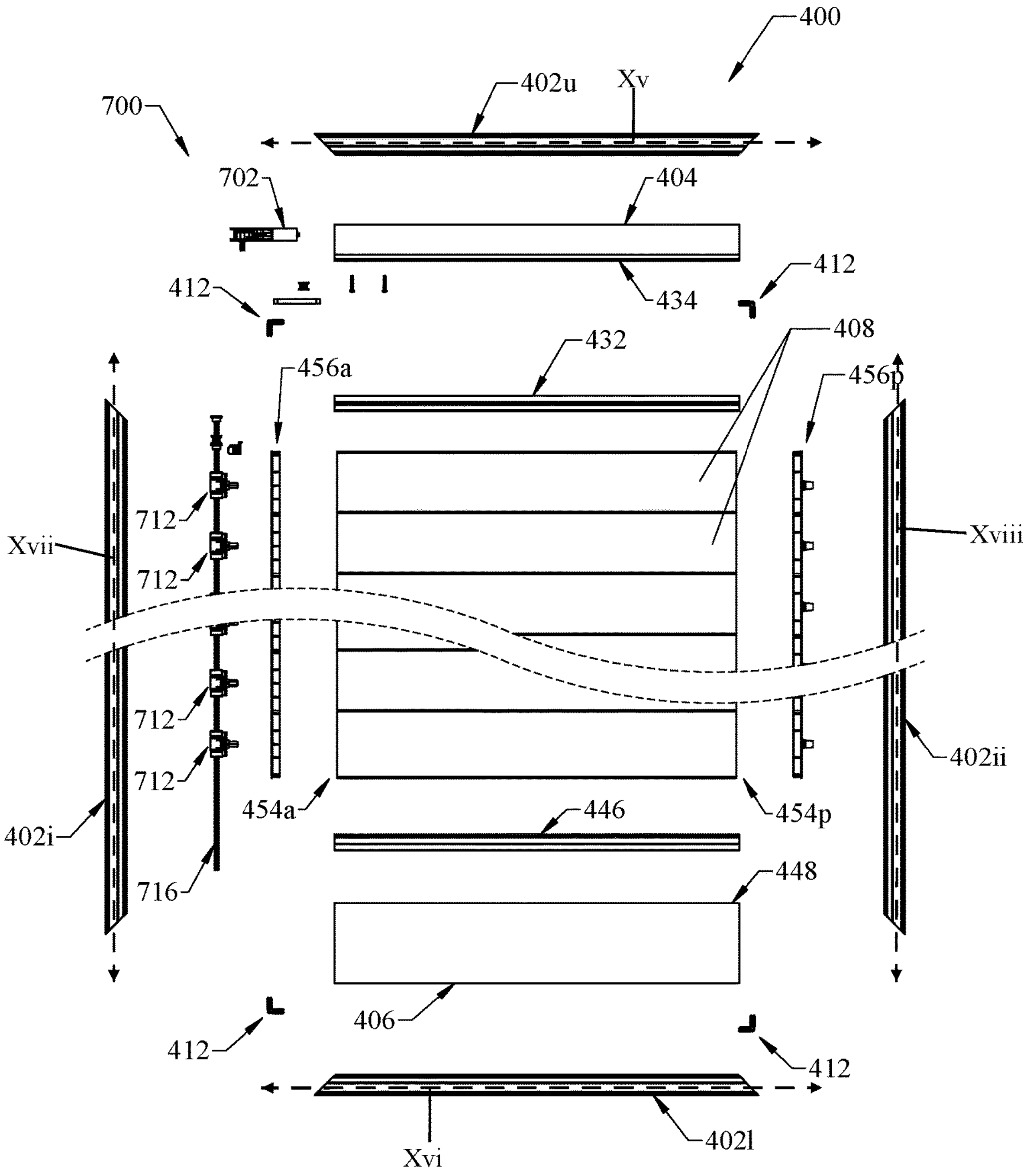
FIG. 14 is a front, plan view of the inner frame shown with parts separated.
Figure 15:
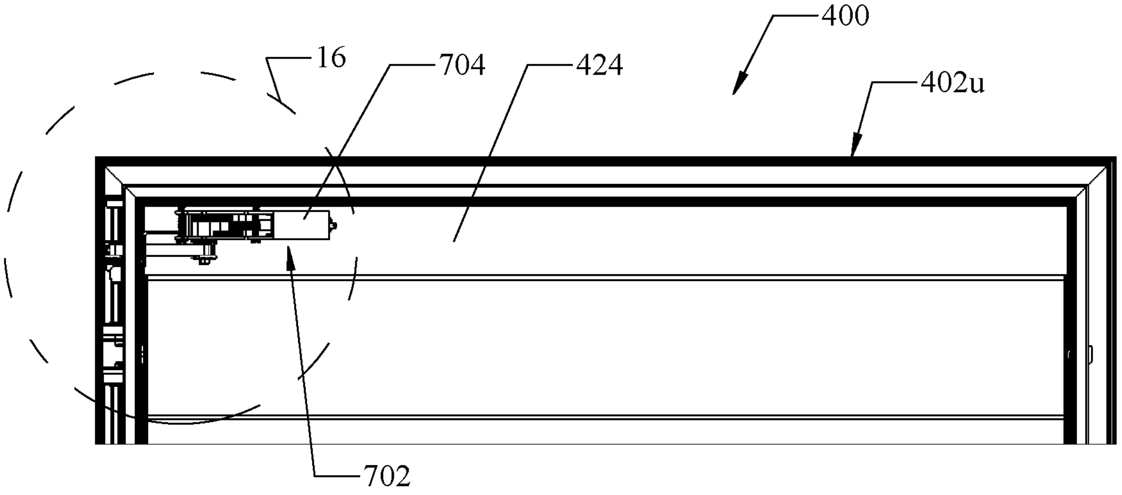
FIG. 15 is a partial, front, plan view of the inner frame.
Figure 16:
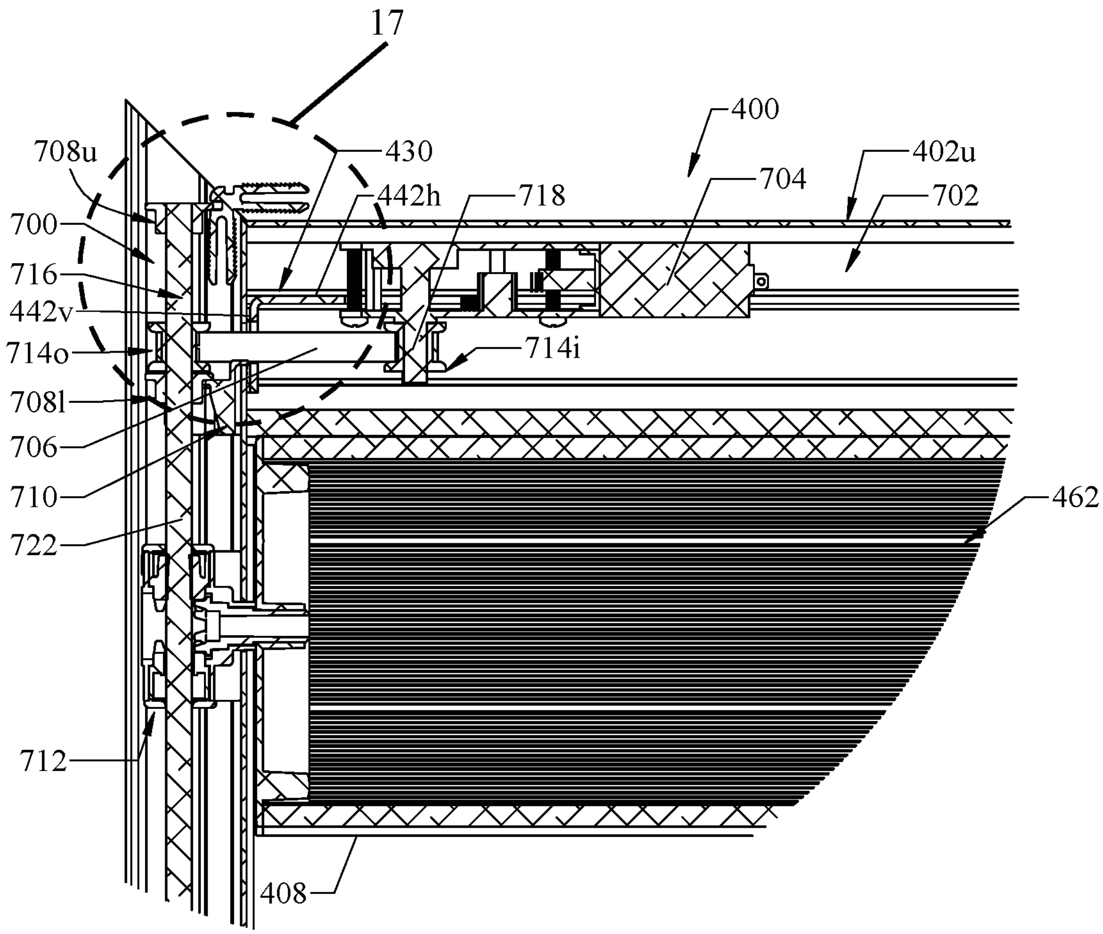
FIG. 16 is an enlargement of the area of detail identified in FIG. 15.
Figure 17:
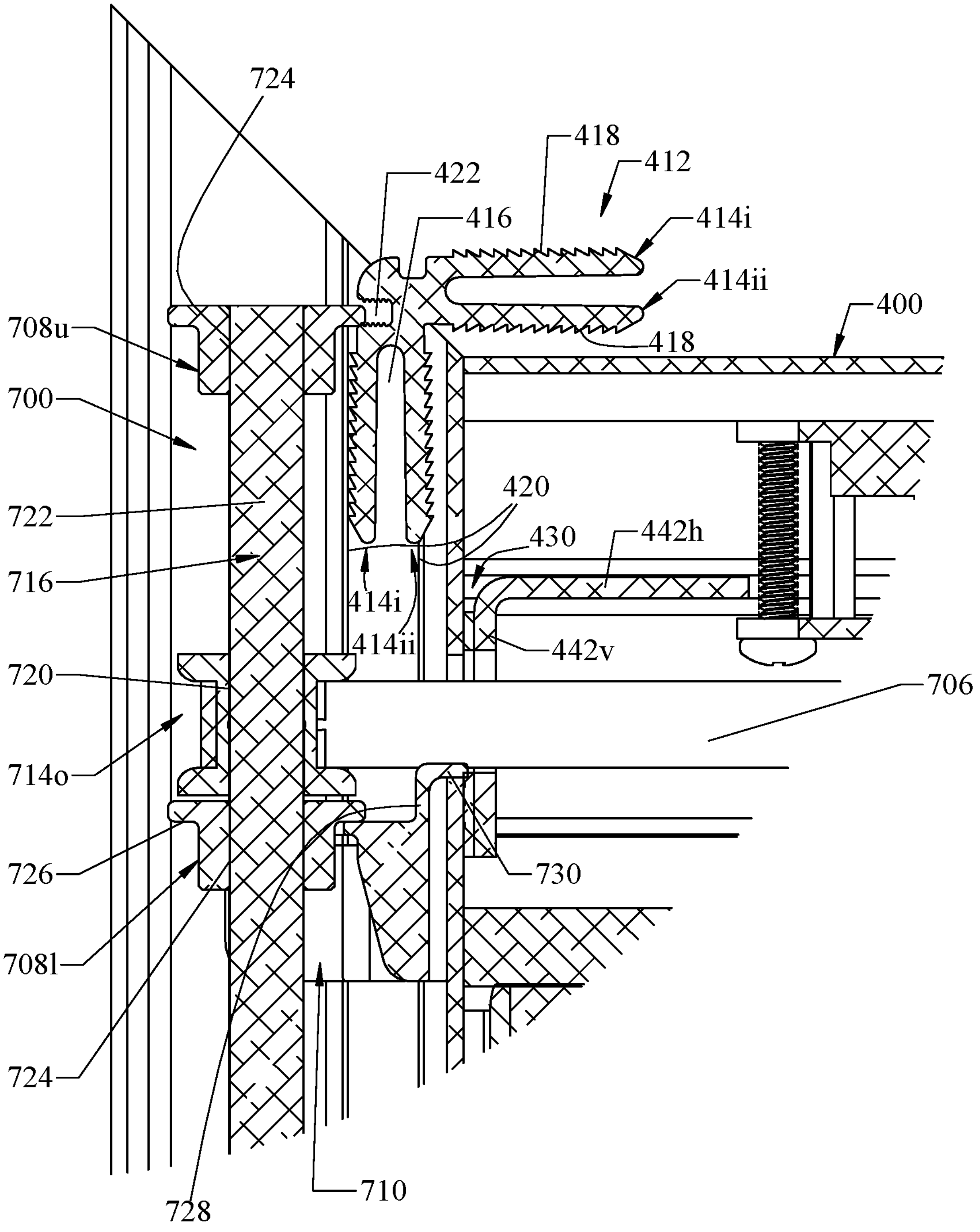
FIG. 17 is an enlargement of the area of detail identified in FIG. 16.
Figure 18:
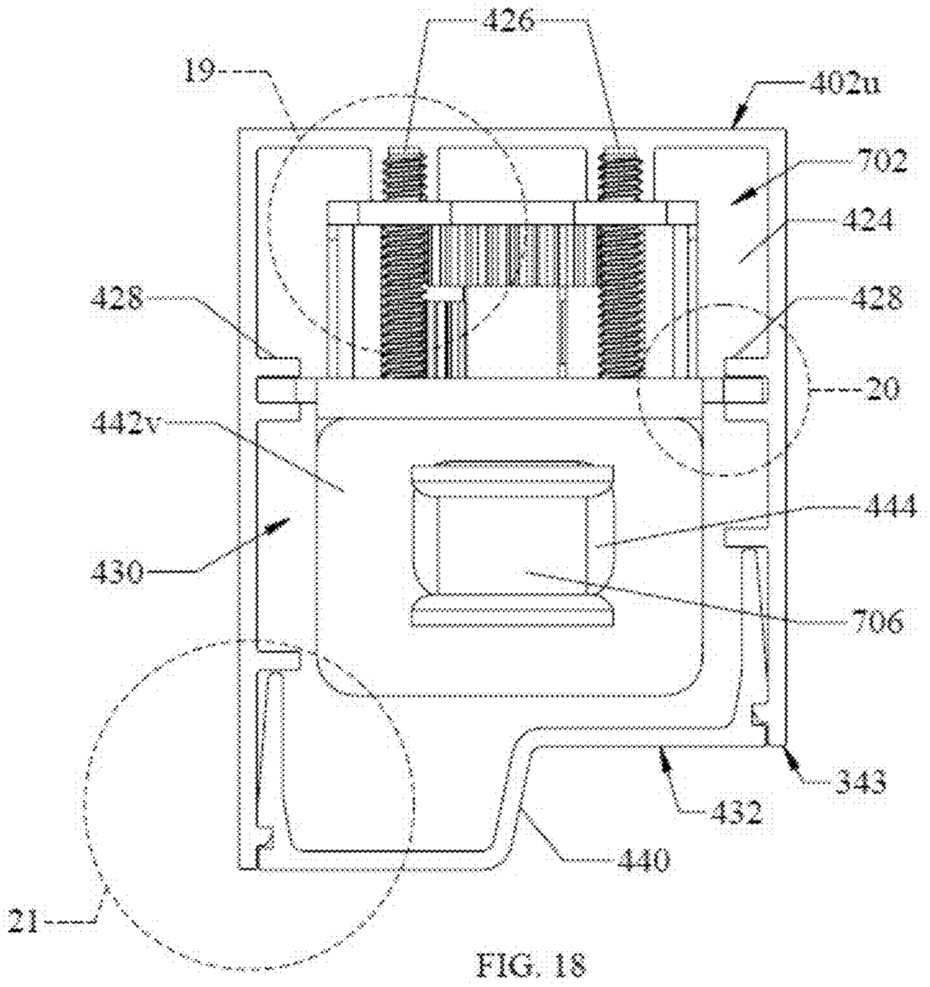
FIG. 18 is an end, plan view of a top rail infill of the inner frame.
Figure 19:
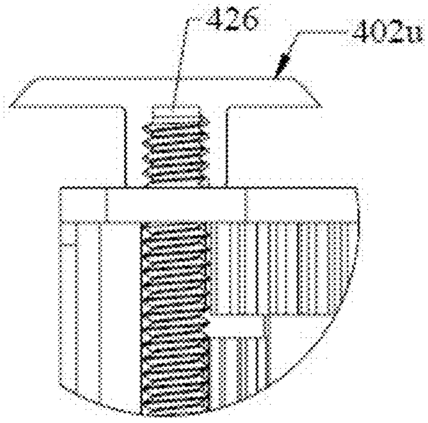
FIGS. 19-21 are enlargements of the areas of detail identified in FIG. 18.
Figure 20:
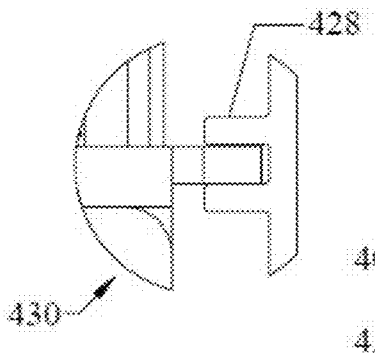
Figure 21:
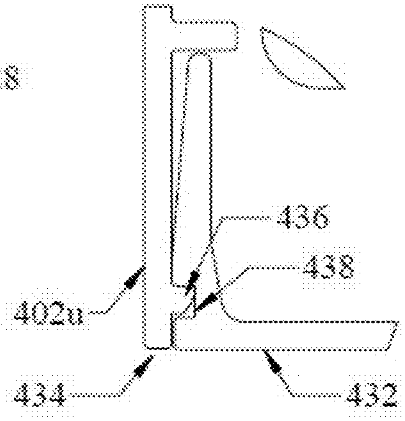

As seen in FIG. 14, which provides a front, plan view of the inner frame 400 with parts separated, the inner frame 400 includes four segments (e.g., sections, profiles, etc.) 402. More specifically, in the illustrated embodiment, the inner frame 400 includes respective (horizontal) upper and lower segments 402*u*, 402*l*, and opposite side (vertical) segments 402*i*, 402*ii* that extend between the segments 402*u*, 402*l* so as to define four corner sections 410*i*-410*iv* (FIG. 2). The segments 402*u*, 402*l*, 402*i*, 402*ii* define respective longitudinal axes Xv-Xvi (FIG. 14) and correspond to the segments 310 of the outer frame 300 to facilitate connection thereto in the manner described herein below. More specifically, the segment 402*u* is configured for connection to the segment 310*u*; the segment 402*l* is configured for connection to the segment 310*l*; the segment 402*i* is configured for connection to the segment 410*i*; and the segment 402*ii* is configured for connection to the segment 310*ii*. The segments 402 are connected to (engaged with) each other via corner stakes 412, which are positioned in the corner sections 410*i*-410*iv* so as to extend between and connect adjacent segments 402 to increase stability and stiffness of the inner frame 400. Each corner stake 412 is (generally) L-shaped in configuration and includes two pairs of legs 414*i*, 414*ii* (FIG. 17). The corner stakes 412 are formed from one or more resilient materials, which allows the corner stakes 412 to flex during assembly of the corner stakes 412 and the inner frame 400, as discussed above with respect to the corner stakes 316 used in assembly of the outer frame 300. The segments 402 of the outer frame 400 define internal cavities 416 (FIG. 17) that are configured to receive the corner stakes 412. To enhance the connection between the corner stakes 412 and the segments 402 of the inner frame 400, the corner stakes 412 may include outer ridges 418 (FIG. 17) (or the like) to create friction with internal surfaces 420 of the internal cavities 416. Although similar in configuration, the corner stakes 412 of the inner frame 400 may be smaller in size than the corner stakes 316 of the outer frame 300. Additionally, the corner stakes 412 of the inner frame 400 each define a channel 422, which may be absent from the corner stakes 316 of the outer frame 300.

The top rail 404 includes an internal space 424 that is configured to accommodate a portion of the drive train 700 (e.g., a motor assembly 702 (FIGS. 14-16) including a motor 704). The top rail 404 includes one or more threaded screw port(s) (flute(s)) 426 (FIGS. 18, 19) that facilitate attachment of the motor 704, as well as lateral supports 428 for a rail bracket 430 (FIGS. 18, 20), which inhibits (if not entirely prevents) the motor assembly 702 from moving relative to the inner frame 400.

In certain embodiments, the inner frame 400 may include a top rail infill 432 (FIGS. 18, 21), which closes a lower (bottom) end 434 of the top rail 404. It is envisioned that the top rail infill 432 may include (e.g., may be formed partially or entirely from) material(s) that allow for wireless communication with the motor assembly 702 so as not to block or interfere with communication signals. The top rail 404 and the top rail infill 432 include corresponding engagement structures 436, 438 (FIG. 21) that allow for connection and disconnection, such as, for example, in an interference fit (snap-fit) arrangement. The top rail infill 432 defines a stepped cross-sectional configuration that provides a seat (stop) 440 (FIG. 18) for an uppermost louver 408.

The rail bracket 430 includes a (horizontal) flange **442*h* (FIGS. 16-18) and a vertical flange 442*v*, and sits between the inner frame 400 and the drive train 700 (e.g., the motor assembly 702). The vertical flange 442*v* of the rail bracket 430 includes an opening 444 (FIG. 18) for a drive member belt 706 of the motor assembly 702**.

In the embodiment of the inner frame 400 illustrated throughout the figures, when used in connection with the drive train 700, the bottom rail 406 is configured to complete the overall aesthetic appearance of the panel 200. The configuration of the bottom rail 406 may be varied to accommodate any suitable number of louvers 408 of any desired size.

In certain embodiments, the inner frame 400 may include a bottom rail infill 446 (FIGS. 18, 21), which closes an upper (top) end 448 of the bottom rail 406. It is envisioned that the rails 404, 406 and the infills 434, 444 may be identical in configuration, and, thus, interchangeable. As such, it is envisioned that the bottom rail infill 446 may include (e.g., may be formed partially or entirely from) material(s) that allow for wireless communication with the motor assembly 702 so as not to block or interfere with communication signals. Additionally, it is envisioned that the bottom rail 406 and the bottom rail infill 446 may include corresponding engagement structures that allow for connection and disconnection, such as, for example, in an interference fit (snap-fit) arrangement, as discussed in connection with the top rail 404 and the top rail infill 434, and that the bottom rail infill 446 may define a stepped cross-sectional configuration that provides a seat (stop) for a lowermost louver 408.

Figure 22:
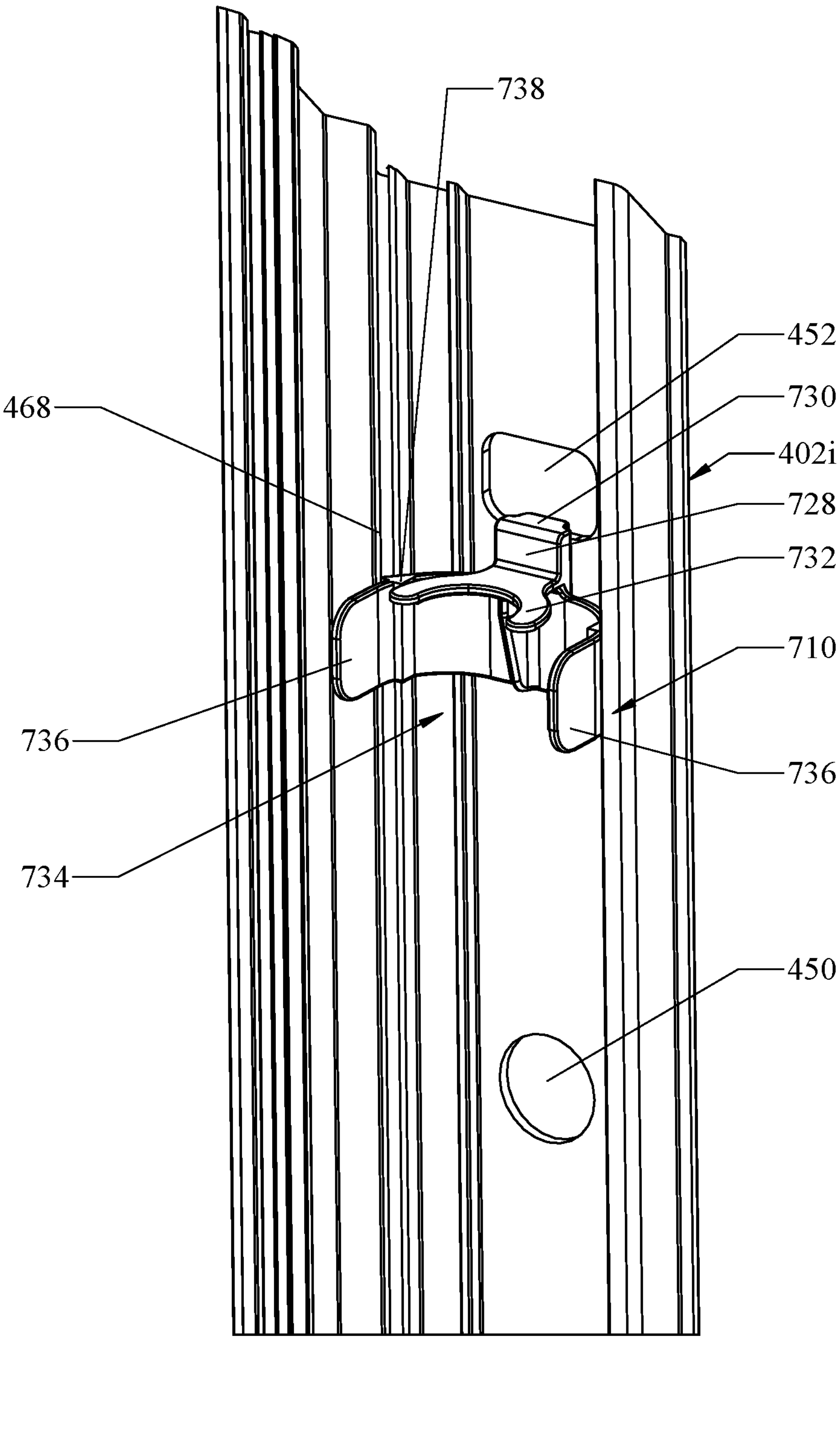
FIG. 22 is a side, perspective view of a retainer mount shown with a segment of the inner frame.
Figure 23:
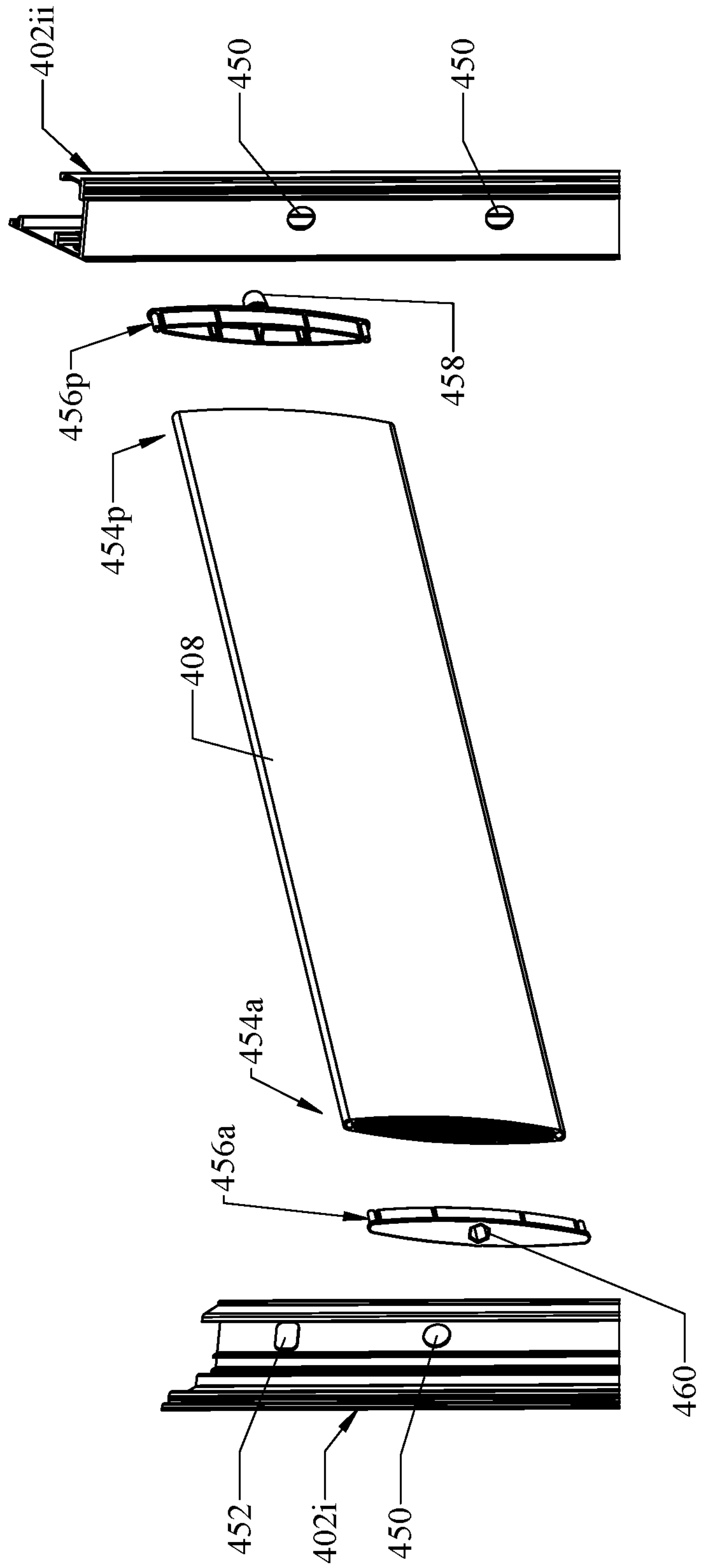
FIG. 23 is a front, perspective view of a louver shown separated from the inner frame.
Figure 24:
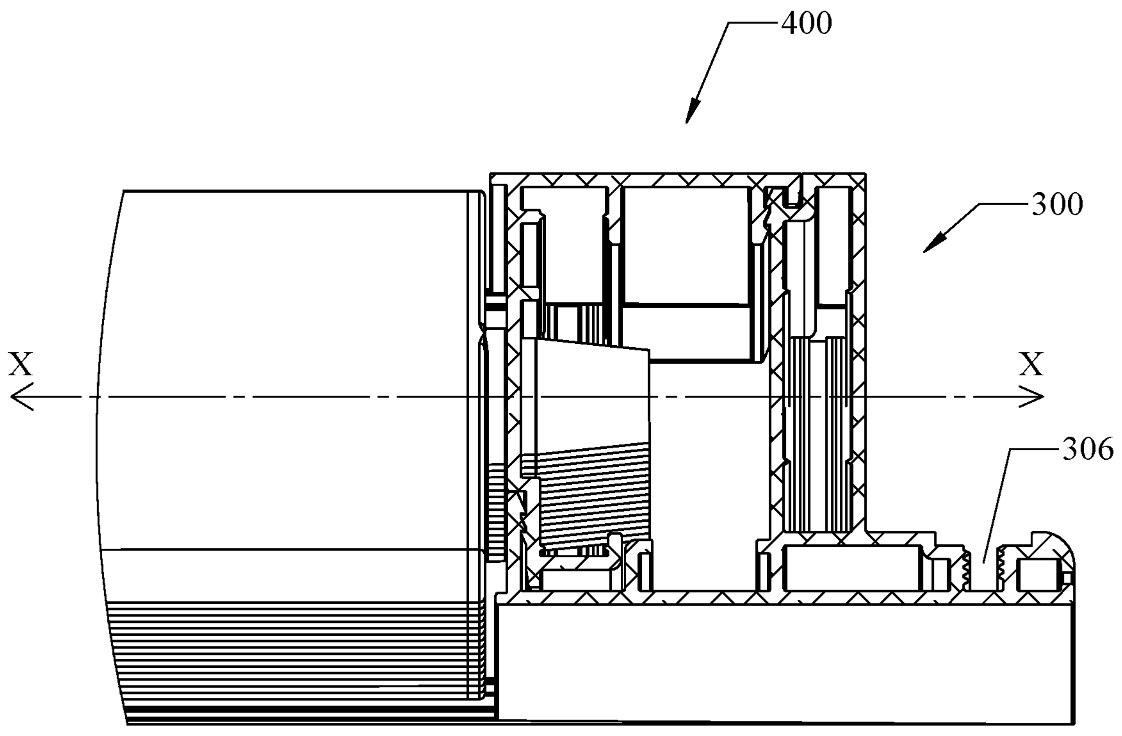
FIG. 24 is a top, perspective view of a segment of the outer frame shown connected to (engaged with) a segment of the inner frame.
Figure 25:
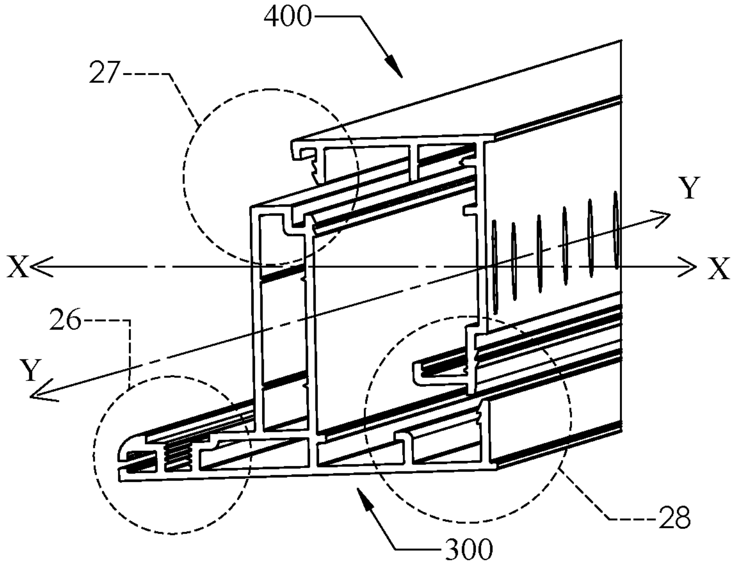
FIG. 25 is an end, perspective, view of the segment of the outer frame and the segment of the inner frame during connection.
Figure 26:
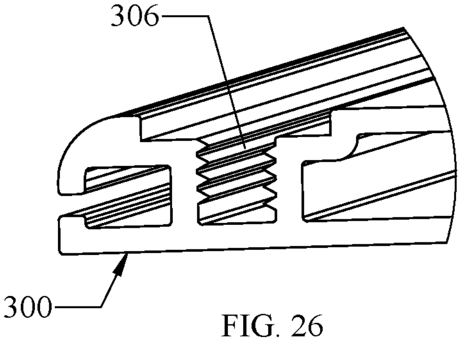
FIGS. 26-28 are enlargements of the areas of detail identified in FIG. 25.
Figure 27:
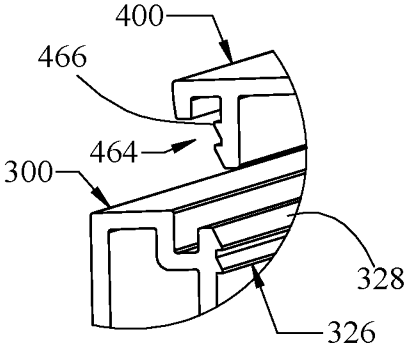
Figure 28:
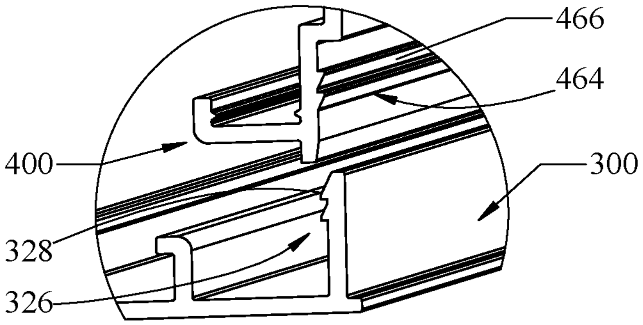
Figure 29:
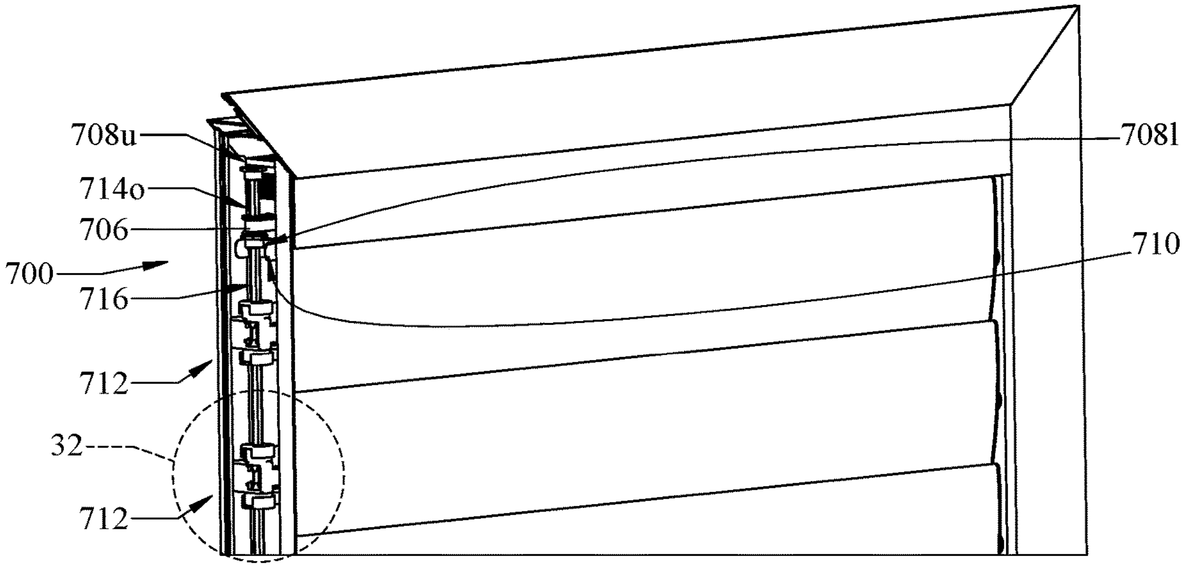
FIG. 29 is a front, perspective view illustrating a drive train of the (shutter) system according to one embodiment of the disclosure.

The side rails **402*i*, 402*ii*, extend between the respective top and bottom rails 404, 406, and are positioned on opposite sides of the panel 200. More specifically, the segment 402*i* is positioned adjacent to the drive train 700, and the segment 402*ii* is positioned opposite to the drive train 700. The side rails 402*i*, 402*ii* are substantially identical, and include a series of openings 450 (FIGS. 22, 23). The segment 402*i*, however, also includes a window 452**, which is described in further detail below.

The louvers 408 (FIG. 23) each include a passive end **454*p* with a passive end cap 456*p*, and an active end 454*a* with an active end cap 456*a*. The passive end cap 456*p* includes an extension 458 that fits within one of the openings 450 in the segment 402*ii*, and the active end cap 456*a* includes an opening 460 that is configured to interface with (connect to, engage with) the drive train 700 such that operation of the drive train 700 moves the plurality of louvers 408 between open and closed positions, as described in further detail below. To facilitate secured engagement of the end caps 456*p*, 456*a* and the louvers 408, the louvers 408 may include one or more internal retention structures 462 (FIG. 16) (e.g., ribs, teeth, etc.). In such embodiments, it is envisioned that the internal retention structure(s) 462 may frictionally engage the end caps 456*p*, 456*a*. For example, it is envisioned that the internal retention structure(s) 462 may bite into the material used to form the end caps 456*p*, 456*a***.

With reference to FIGS. 24-28, assembly of the outer frame 300 and the inner frame 400 will be discussed. The frames 300, 400 (e.g., the segments 310, 402) are configured for engagement in an interference fit (e.g., snap-fit) arrangement and are pressed together laterally. More specifically, the segments 402 are connected to (engaged with) the segments 310 via movement along a first axis X (FIGS. 24, 25), which is (generally) transverse (e.g., orthogonal) in relation to the respective longitudinal axes Xi-Xviii of the segments 310, 402. To enhance the connection between the frames 300, 400, and inhibit (if not entirely prevent) unintended separation, the outer frame 300 and the inner frame 400 may and including corresponding engagement structures 326, 464 (e.g., teeth 328, 466), respectively.

When disassembly of the frames 300, 400 is necessary or desired, the segments 402 of the inner frame 400 can be moved (e.g., slid) axially (longitudinally) in relation to the segments 310 of the outer frame 300. More specifically, each of the segments 402 is moved along a second axis Y (FIG. 25), which is (generally) transverse (e.g. orthogonal) in relation to the first axis X and (generally) parallel in relation to the respective longitudinal axes Xi-Xviii of the segments 310, 402), which causes the teeth 328 to traverse the teeth 466. The configurations of the frames 300, 400 thus allow for toolless assembly and disassembly of the panel(s) 200 and eliminate any need to drill holes or utilize mechanical fasteners (e.g., screws) during assembly. Once the frames 300, 400 are connected (engaged), the assembly of the frames 300, 400 can be connected to (engaged with) the mounting frame 100 by inserting the hinge pin 516 (FIG. 8A) into the hinge base 514 and the hinge receiver 510, which allows the panel(s) 200 to move (pivot) in relation to the mounting frame 100 between open (FIG. 1A) and closed (FIG. 1B) configurations (positions).

With reference now to FIGS. 16, 17, and 29-37, the drive train 700 will be discussed. The drive train 700 includes the aforementioned motor assembly 702 (FIG. 14); the aforementioned drive belt 706; (upper and lower) drive member retainers **708*u*, 708*l*; a retainer mount 710; and a plurality of individual gear boxes 712 corresponding to the louvers 408**.

The motor assembly 702 includes the aforementioned motor 704; the aforementioned drive belt 706, respective inner and outer pulleys 714*i*, 714*o*, which are connected by the drive belt 706; and a drive member 716 that extend through each of the gear boxes 712. The inner pulley 714*i* is connected to (engaged with) a drive shaft 718 (FIG. 16) of the motor 704 such that the motor 704 rotates the inner pulley 714*i*, which thereby rotates the outer pulley 714*o* via the drive member 706. The outer pulley 714*o* is connected to (engaged with) the drive member 716 such that rotation of the outer pulley 714*o* causes corresponding rotation of the drive member 716. For example, in the illustrated embodiment, the outer pulley 714*o* includes an opening 720 (FIG. 17) defining a (transverse) cross-sectional configuration corresponding to that of the drive member 716 such that the outer pulley 714*o* mates with the drive member 716. For example, as shown throughout the figures, it is envisioned that the opening 720 in the outer pulley 714*o* and the drive member 716 may each include (transverse) cross-sectional configurations that are (generally) hexagonal.

The motor assembly 702 is optional component of the system 10, in that the system 10 is configured for operation in the manner described herein, without the motor assembly 702, by virtue of the connection between the louvers 408; the gear boxes 712; and the drive member 716. For example, the louvers 408 may be moved simultaneously (opened and closed) by (manually) manipulating one of the louvers 408.

In the illustrated embodiment, the drive member 716 is configured as a drive rod 722. It should be appreciated, however, that the particular configuration of the drive member 716 may be varied in alternate embodiments of the present disclosure, and that the drive member 716 may be configured in any manner suitable for the intended purpose of connecting the louvers 408 and the gear boxes 712 in the manner described herein.

As seen in FIG. 17, the drive member retainers 708*u*, 708*l* each include an opening 724 that receives the drive member 716 (e.g., the drive rod 722). The drive member retainers 708*u*, 708*l* are secured to the drive member 716, such as, for example, via set screws such that rotation of the drive member 716 causes corresponding rotation of the drive member retainers 708*u*, 708*l*. It should be appreciated, however, that the drive member retainers 708*u*, 708*l* and the drive member 716 may be connected (engaged) in any suitable manner using any suitable structure(s) and/or mechanism(s).

In certain embodiments, such as that shown throughout the figures, the openings 724 in the drive member retainers 708 each include a cross-sectional configuration corresponding to that of the drive member 716. For example, it is envisioned that the openings 724 in the drive member retainers 708 and the drive member 716 may each include (transverse) cross-sectional configurations that are (generally) hexagonal.

The drive member retainers 708*u*, 708*l* are configured to not only resist bending of the drive member 716 that may otherwise be caused by the force applied to the drive member 716 by the drive belt 706, but to maintain the vertical position of the drive member 716. The drive member retainer 708*u* sits within the channel 422 (FIG. 17) defined by the corner stakes 412 of the inner frame 400, which allows for rotation of the drive member retainer 708*u*, and serves to maintain the vertical position of the drive member retainer 708*u*, and, thus, the drive member 716. The drive member retainer 708*l* sits below the outer pulley 714*o* and the drive belt 706, and supports the outer pulley 714*o*. As seen in FIG. 17, for example, the outer pulley 714*o* sits on an upper surface 726 of the drive member retainer 708*l*.

The retainer mount 710 (FIGS. 17, 22) includes a (vertical) neck 728 supporting a (horizontal) finger (hanger) 730 that is configured for positioning within the window 452 formed in the segment 402*i* of the inner frame 400; an arcuate platform 732 that is configured in correspondence with the drive member retainer 708*l*; and a body portion 734. In the illustrated embodiment, the body portion 734 of the retainer mount 710 is (generally) C-shaped, and defines a pair of arms 736 including teeth 738. The teeth 738 are configured to engage an inner shoulder 468 defined by the inner frame 400 (e.g., by the segment 402*i*). During connection of the retainer mount 710 to the inner frame 400, the arms 736 are deflected inwardly (towards each other) such that the teeth 738 are positionable adjacent to the shoulder 468 so as to establish a mechanical connection (e.g., an interference fit (snap-fit)) between the retainer mount 710 and the inner frame 400. In certain embodiments, it is envisioned that the retainer mount 710 may snap into place to create an audible indication that the retainer mount 710 has been properly connected to (engaged with) the inner frame 400.

With reference now to FIGS. 30-37, the gear boxes 712 will be discussed. The system 10 includes one gear box 712 that is connected to (engaged with) each louver 408, and it is envisioned that the gear boxes 712 may be identical configuration. Each gear box 712 includes a (first) drive gear 740; a (second) passive gear 742 that is configured for operative engagement with the drive gear 740; a (third) louver gear 744 that is configured for engagement with the drive gear 740; and a housing 746 with end caps 748*u*, 748*l* that supports the drive gear 740; the passive gear 742; and the louver gear 744.

The drive gear 740 is configured to receive the drive member 716 (e.g., the drive rod 722), and includes an opening 750 (FIG. 31) defining a (transverse) cross-sectional configuration corresponding to that of the drive member 716 (e.g., such that the drive gear 740 mates with the drive member 716), whereby rotation of the drive member 716 (via the motor assembly 702) causes corresponding rotation of the drive gear 740. To facilitate concomitant rotation of the drive member 716 and the drive gear 740, the opening 750 in the drive gear 740 and the drive member 716 include corresponding non-circular (transverse, horizontal) cross-sectional configurations. For example, in the illustrated embodiment, the (transverse) cross-sectional configurations of the drive member 716 and the drive gear 740 are (generally) hexagonal. It should be appreciated, however, that other configurations (e.g., triangular, square-shaped, rectagonal, octagonal, etc.) would not be beyond the scope of the present disclosure and that any interface between the drive member 716 and the drive gear 740 suitable for the intended purpose of facilitating concomitant rotation may be utilized.

Figure 31:
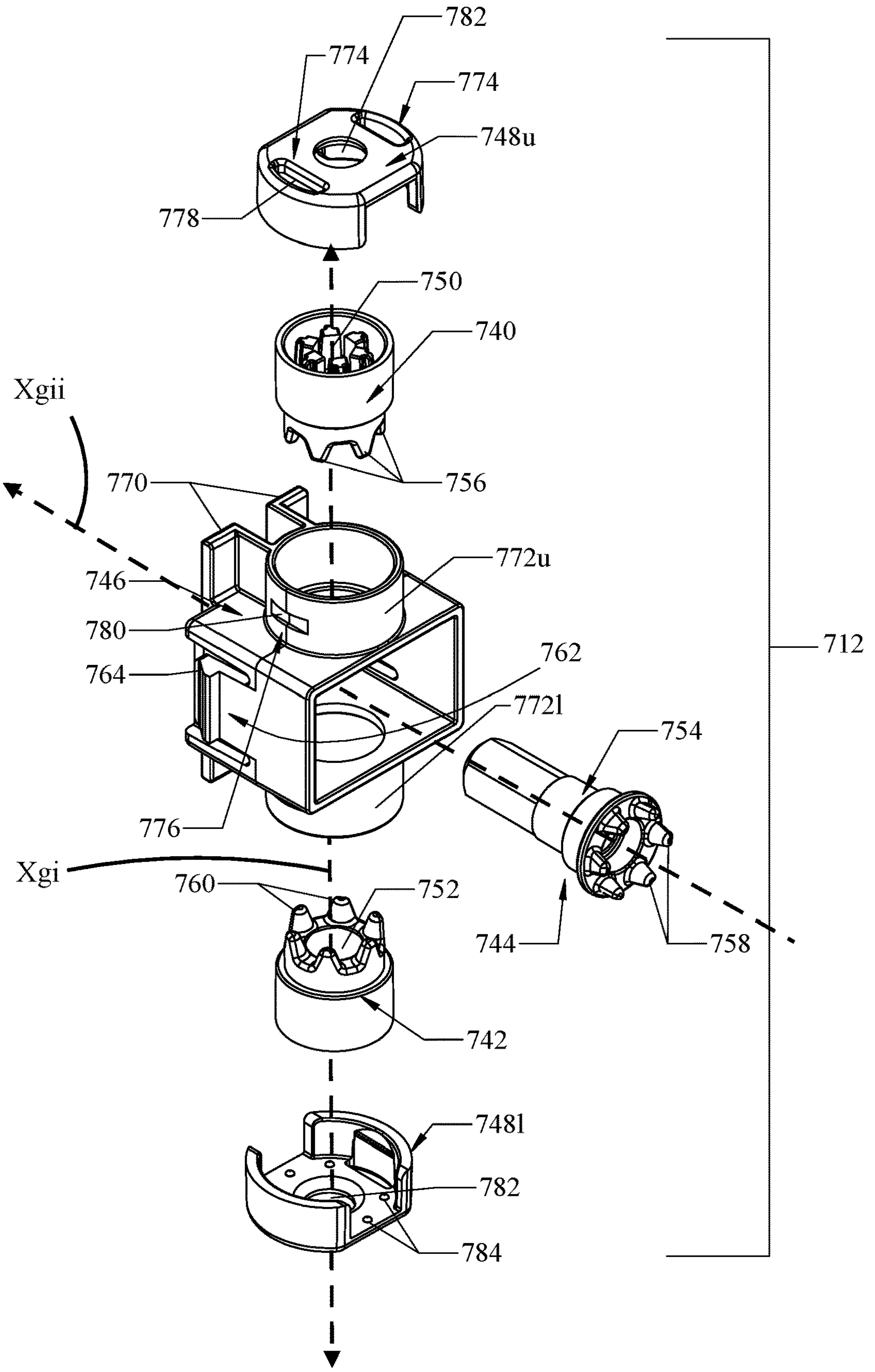
FIG. 31 is a top, perspective view of the gear box seen in FIG. 31 shown with parts separated.
Figure 32:
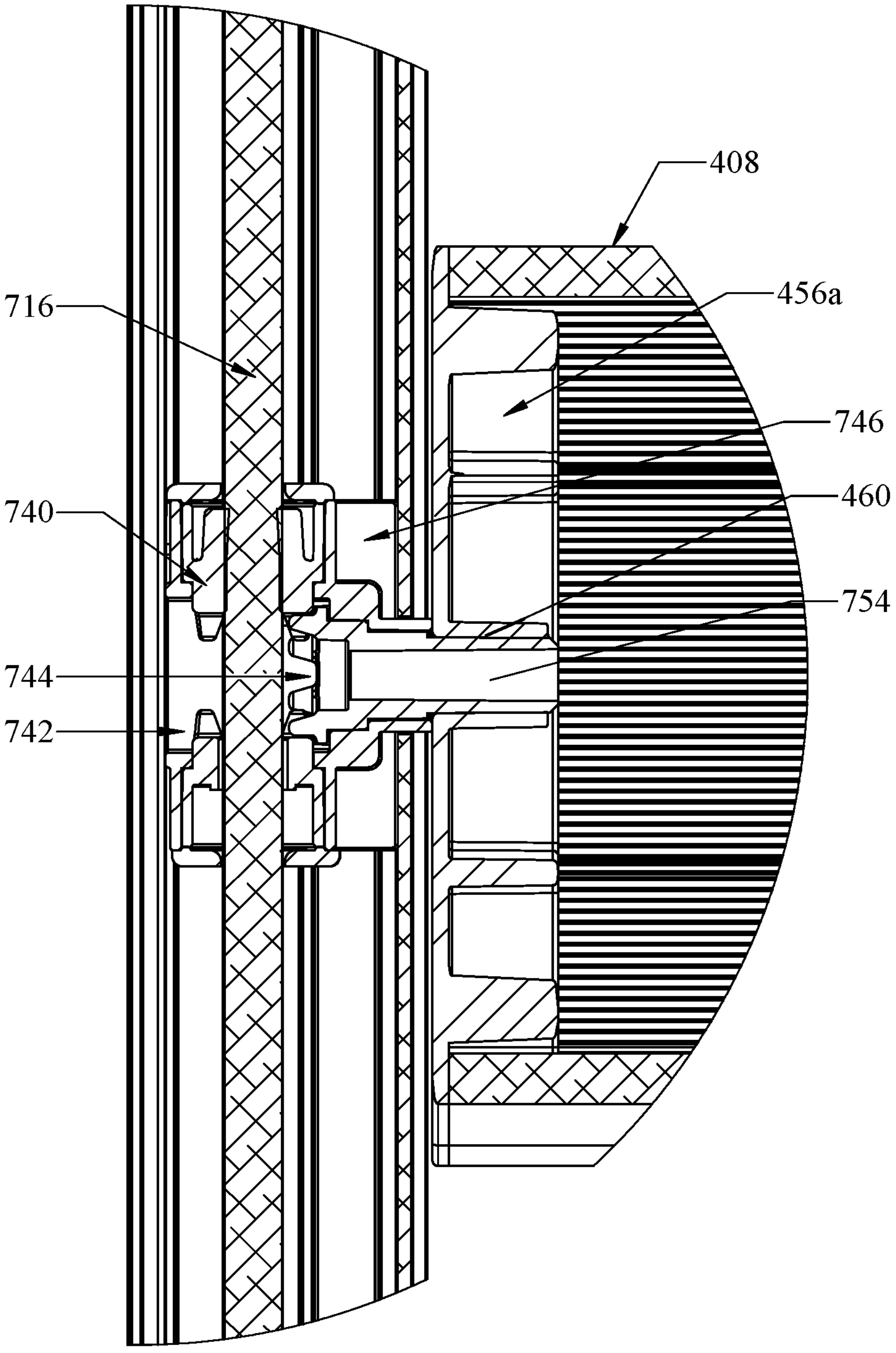
FIG. 32 is an enlargement of the area of detail identified in FIG. 29.

The passive gear 742 is positioned opposite to the drive gear 740 such that the drive gear 740 and the passive gear 742 are oriented along and share a common (vertical) axis Xgi (FIG. 31). The passive gear 742 is configured to receive the drive member 716 and includes an opening 752 devoid of any structure that positively engages the drive member 716. As such, the drive member 716 is rotatable within the passive gear 742, and the passive gear 742 is rotatable about the drive gear 740.

The louver gear 744 is positioned (vertically) between the drive gear 740 and the passive gear 742 and extends along a (horizontal) axis Xgii that is (generally) transverse (e.g., orthogonal) in relation to the drive gear 740, the passive gear 742, and the axis Xgi. The louver gear 744 is configured for concomitant connection to (engagement with) the drive gear 740 and the passive gear 742, as described in further detail below, and includes a shaft 754 that extends through the housing 746 of the gear box 712 and into the opening 460 (FIG. 23) in the active end cap 456*a*. The shaft 754 of the louver gear 744 and the opening 460 in the active end cap 456*a* include corresponding cross-sectional configurations (e.g., such that the shaft 754 of the louver gear 744 mates with the opening 460 in the active end cap 456*a*), whereby rotation of the louver gear 744 causes corresponding rotation of the louver 408 such that the louver 408 is moved between open and closed positions. For example, in the illustrated embodiment, it is envisioned that the shaft 754 of the louver gear 744 and the opening 460 in the active end cap 456*a* may each include cross-sectional configurations that are (generally) hexagonal.

In certain embodiments, it is envisioned that the opening 460 in the active end cap 456*a* and the shaft 754 of the louver gear 744 may include dissimilar cross-sectional configurations. In such embodiments, to facilitate connection of the louver gear 744 and the louvers 408 in the manner described herein, it is envisioned that the opening 460 in the active end cap 456*a* may include an insert defining a cross-sectional configuration corresponding to that defined by the shaft 754 of the louver gear 744.

The gear box 712 is configured such that rotation of the drive member 716 causes corresponding rotation of the drive gear 740 in a first direction (e.g., clockwise), as mentioned above. The drive gear 740 includes teeth 756 that are configured for engagement with teeth 758 on the louver gear 744 such that rotation of the drive gear 740 causes corresponding rotation of the louver gear 744. In turn, the teeth 758 on the louver gear 744 are configured for engagement with teeth 760 on the passive gear 742, whereby the passive gear 742 is operatively (e.g., indirectly) connected to (engaged with) the drive gear 740 by the louver gear 744. Rotation of the drive gear 740 thus causes corresponding rotation of the louver gear 744, which causes corresponding rotation of the passive gear 742. More specifically, due to the arrangement of the drive gear 740 and the passive gear 742, rotation of the drive gear 740 in the first direction causes corresponding rotation of the passive gear 742 in a second direction that is opposite to the first direction (e.g., counterclockwise). While the passive gear 742 may be considered optional, the passive gear 742 is configured to maintain engagement of the drive gear 740 and the louver gear 744 and, absent the passive gear 742, it is envisioned that the drive gear 740 and the louver gear 744 may become disengaged and/or misaligned (e.g., due to lateral movement of the louver 408 with which the gear box 712 is associated).

Figure 30:
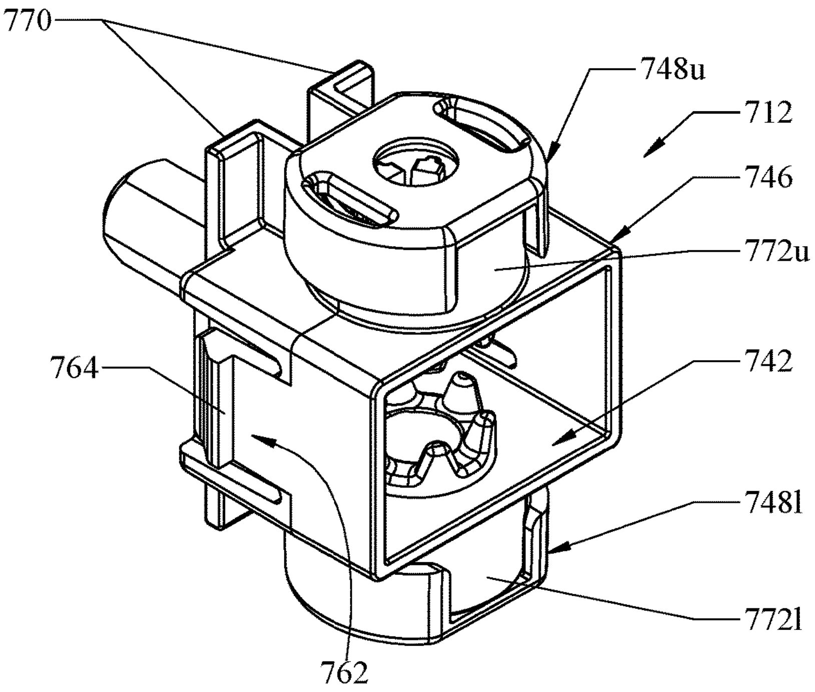
FIG. 30 is a top, perspective view of a gear box of the drive train.
Figure 33:
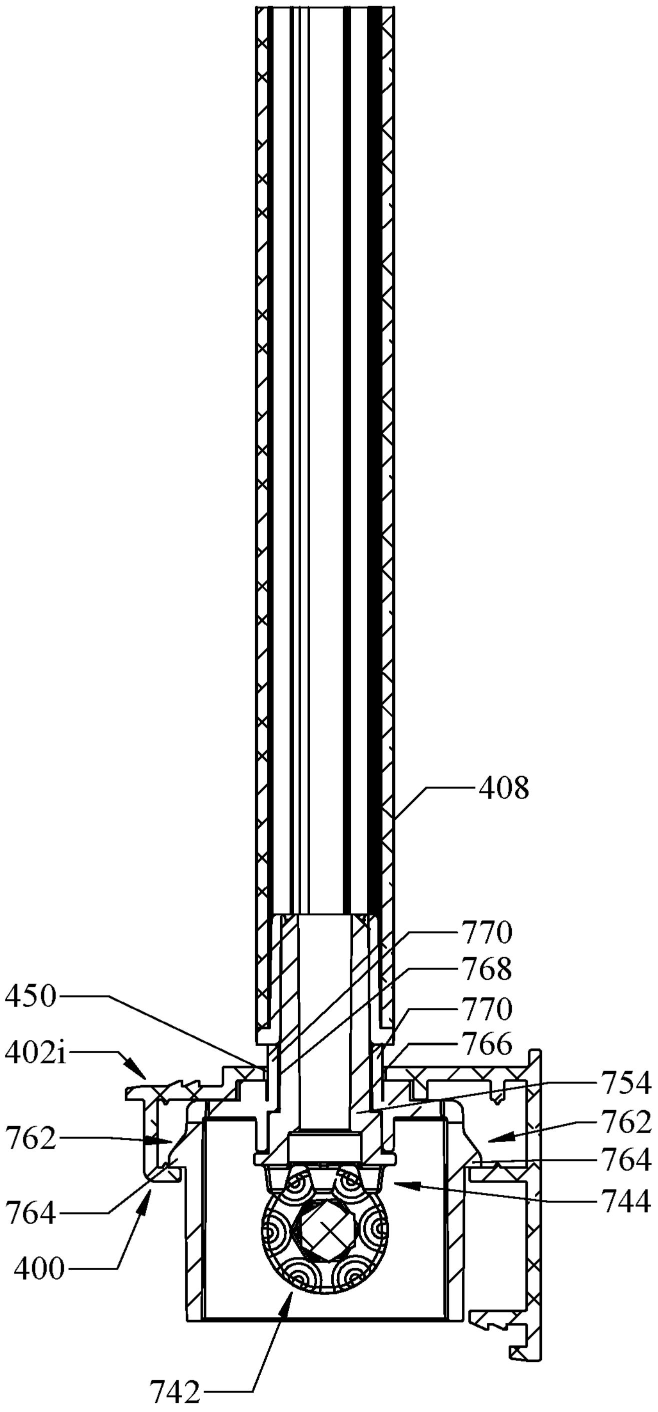
FIG. 33 is a horizontal (top), cross-sectional view illustrating connection of a gear box to a corresponding louver.
Figure 34:
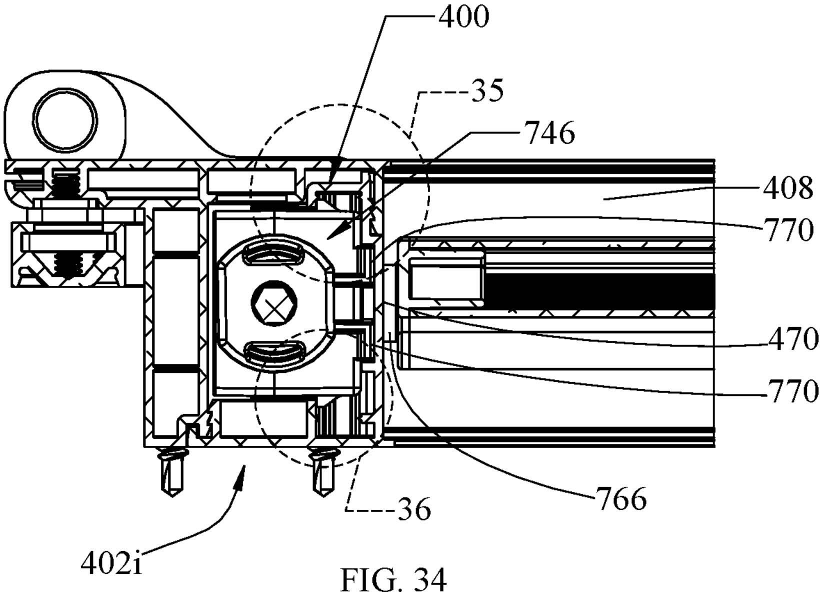
FIG. 34 is a horizontal (top), cross-sectional view of the inner frame and illustrating connection of a gear box to a corresponding louver.
Figure 35:
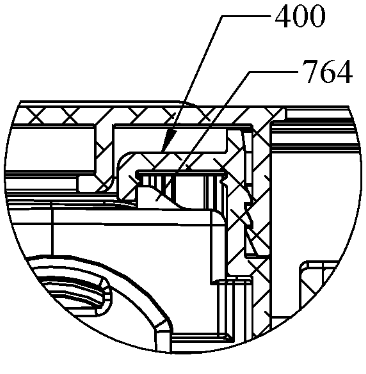
FIGS. 35 and 36 are enlargements of the areas of detail identified in FIG. 34.
Figure 36:
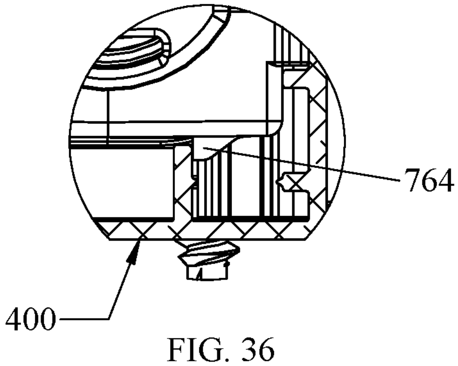
Figure 37:
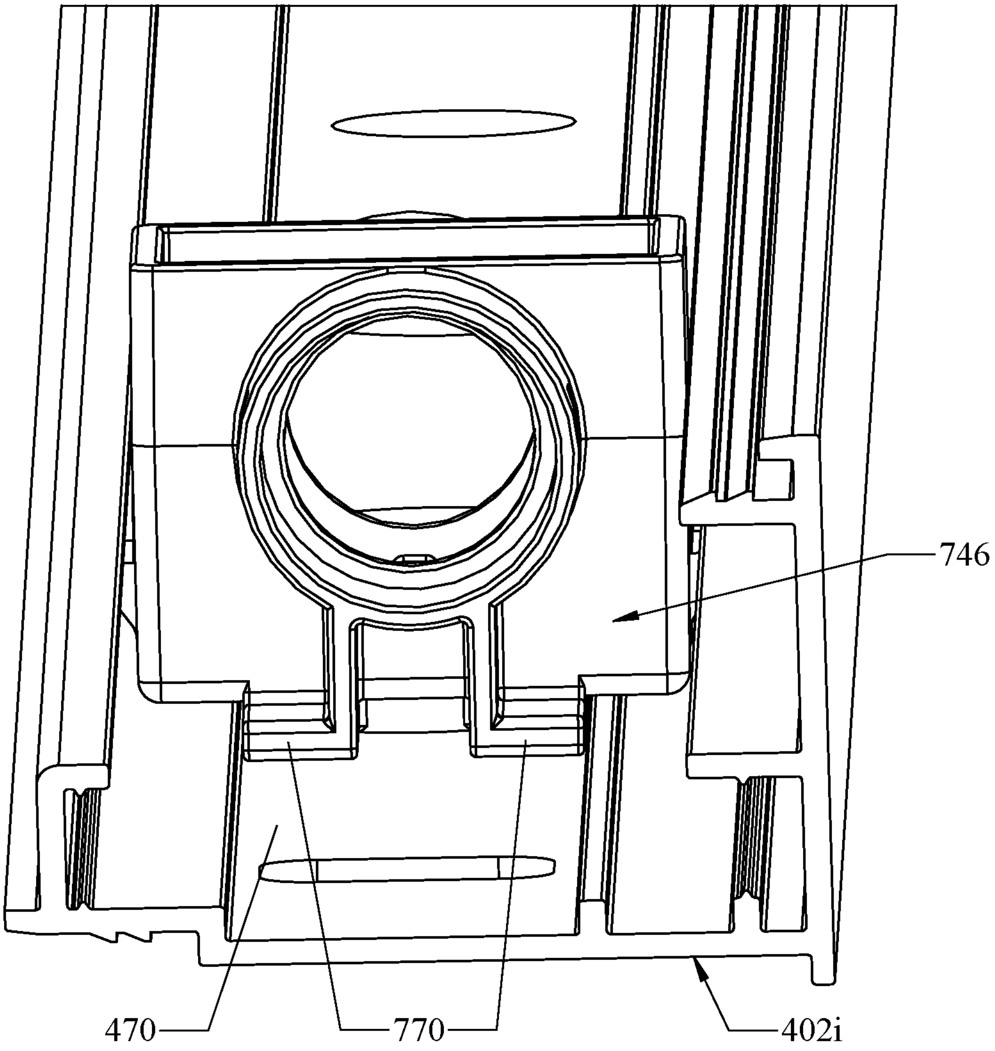
FIG. 37 is a side, perspective view illustrating connection of a housing of a gear box to the inner frame.
Figure 38:
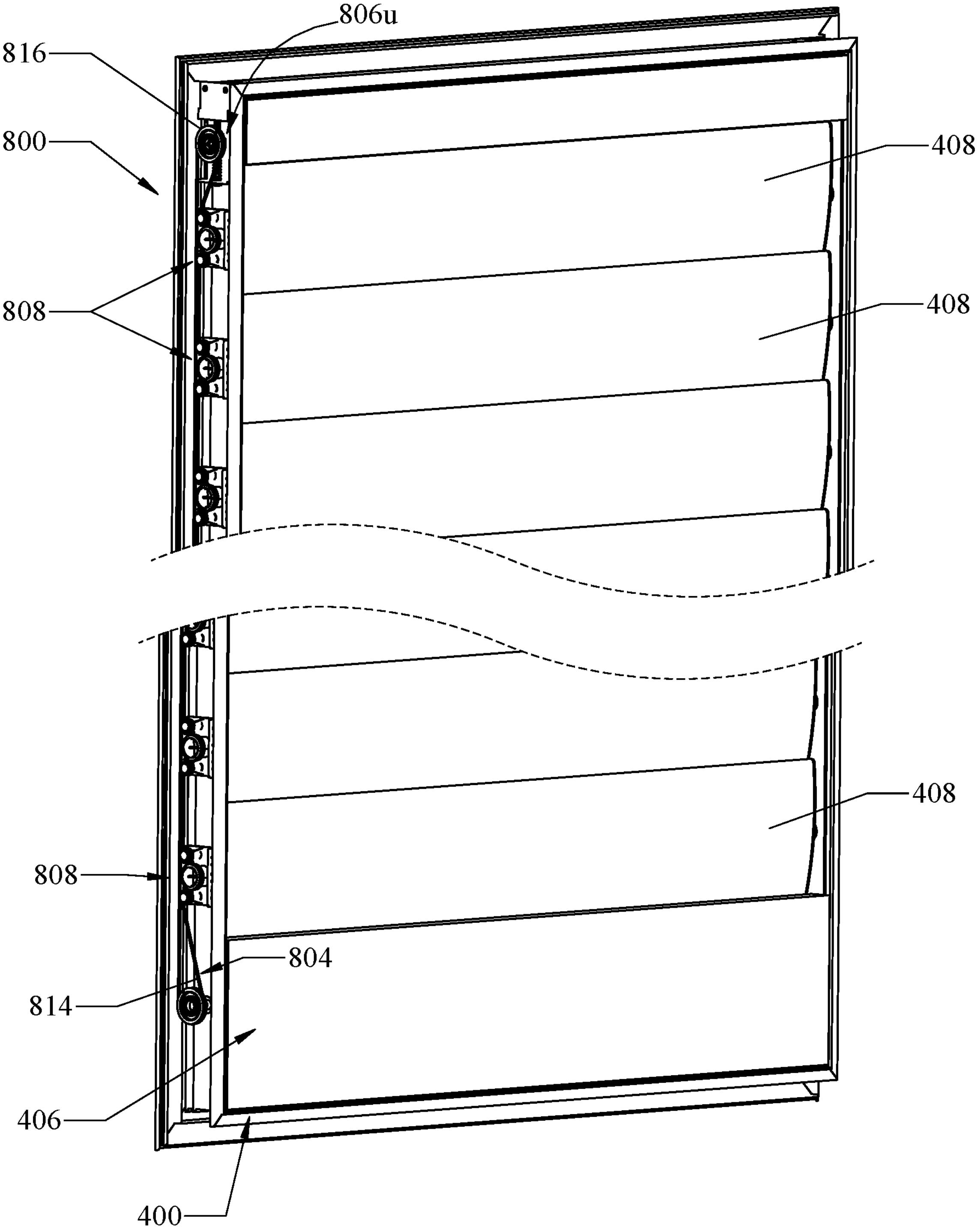
FIG. 38 is a front, perspective view illustrating a drive train of the (shutter) system according to another embodiment of the disclosure.

The housing 746 of the gear box 712 is configured to receive and support the drive gear 740; the louver gear 744; and the passive gear 742. The housing 746 includes exterior engagement members 762 (e.g., tabs 764, clips, feet, etc.) that are configured for engagement with the inner frame 400, as seen in FIGS. 33-36. The housing 746 also includes a (tubular) extension 766 (FIGS. 33, 35) that extends towards the corresponding louver 408. The extension 766 defines an internal passage 768, through which the shaft 754 of the louver gear 744 extends, and is configured for receipt by one of the openings 450 in the segment 402*i*. The housing 746 also defines a pair of vertical ribs 770 that fit within a corresponding channel 470 (FIGS. 34, 37) defined within the segment 402*i*, and includes upper and lower collars 772*u*, 772*l* that facilitate connection of the end caps 748*u*, 748*l*, respectively, as seen in FIGS. 30, 31. The end caps 748*u*, 748*l* and the collars 772*u*, 772*l* include corresponding engagement structures 774, 776, respectively, to establish a secured connection there between. For example, the end caps 748*u*, 748*l* may include one or more projections (protrusions) 778 that are configured for receipt by one or more corresponding depressions (recesses) 780 on the collars 772*u*, 772*l*. To connect the gear boxes 712 to the inner frame 400, a lateral (horizontal) force is applied to the housing 746, which deflects the exterior engagement members 762 on the housing 746 such that the exterior engagement members 762 are engageable with the inner frame 400, as seen in FIG. 33.

The end caps 748*u*, 748*l* are identical in configuration, and are configured to close corresponding (upper and lower) ends of the housing 746, respectively. Each of the end caps 748*u*, 748*l* includes an opening 782 that is configured to receive the drive member 716 such that the drive member 716 extends through the end caps 748*u*, 748*l*, as well as the aforementioned projections (protrusions) 778 that engage the corresponding depressions (recesses) 780 on the collars 772*u*, 772*l*, respectively.

In certain embodiments, it is envisioned that the end caps 748*u*, 748*l* may be configured to restrict (if not entirely prevent) vertical movement of the drive gear 740 and the passive gear 742 within the housing 746, thus maintaining and promoting proper engagement of the drive gear 740; the louver gear 744; and the passive gear 742. For example, as seen in FIG. 31, the end caps 748*u*, 748*l* may include detents 784 (or other such features) that urge the drive gear 740 and the passive gear 742 toward each other to reduce backlash (i.e., separation between the teeth 756, 758, 760 respectively included on the drive gear 740, the louver gear, and the passive gear 742, thus further promoting proper engagement of the drive gear 740, the louver gear, and the passive gear 742.

Figure 39:
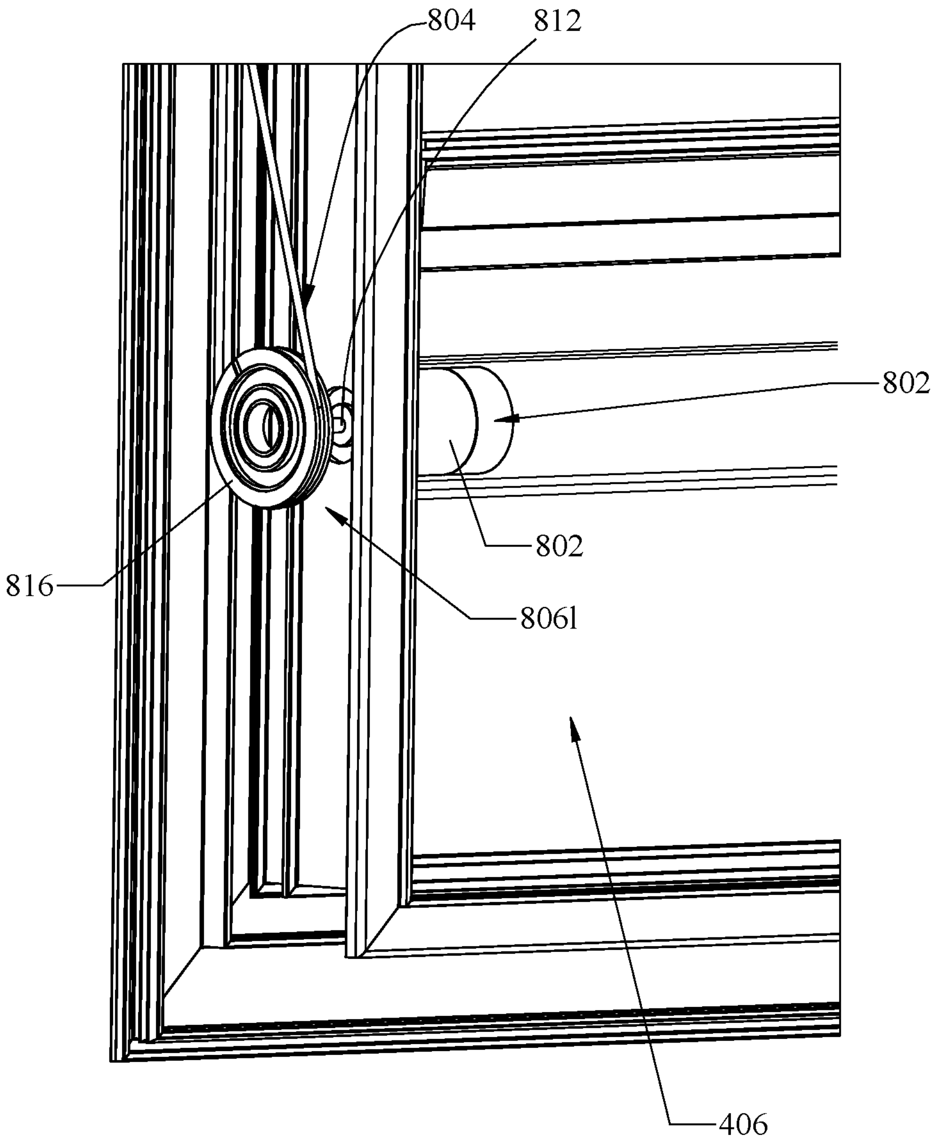
FIG. 39 is a front, perspective view illustrating a lower idler pulley of the drive train seen in FIG. 38.
Figure 40:
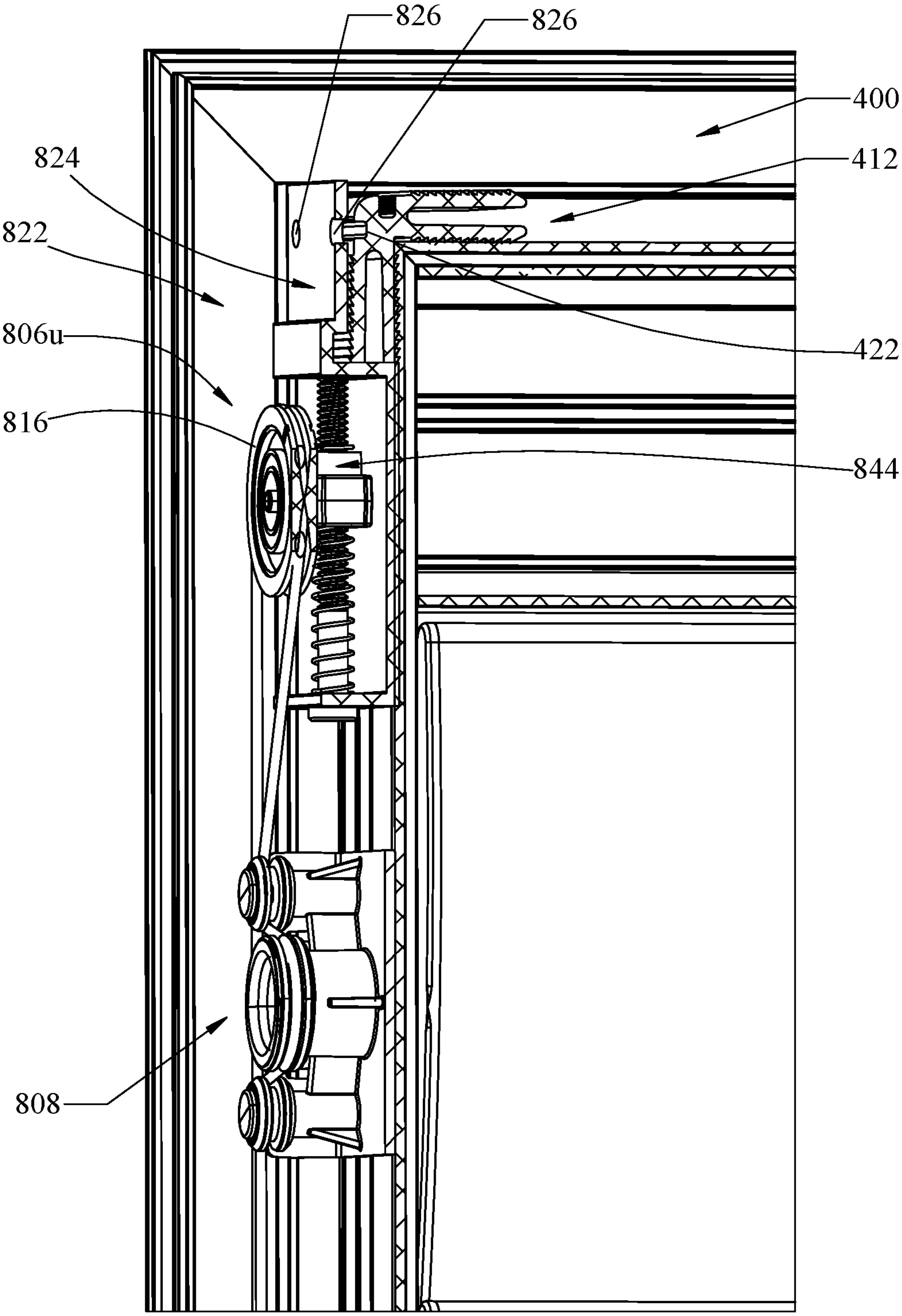
FIG. 40 is a front, perspective view illustrating an upper idler pulley and a pulley assembly of the drive train seen in FIG. 38.

With reference now to FIGS. 38-50, the drive train 800 will be discussed, which is provides an alternative to the drive train 700 described above. The drive train 800 is pulley driven (as opposed to gear driven), and includes a motor assembly 802 (FIG. 39); a drive member 804; respective lower and upper idler pulleys 806*l*, 806*u* that are connected to the inner frame 400; and a plurality of individual pulley assemblies 808 corresponding to the plurality of louvers 408.

The motor assembly 802 includes a motor 810, and a motor shaft 812 (FIG. 39) that extends from the motor 810. The motor assembly 802 is supported by the bottom rail 406 of the inner frame 400, and, as discussed in connection with the drive train 700, is an optional component of the system 10 in that the system 10 is configured for operation in the manner described herein, without the motor assembly 802, by virtue of the connection between the louvers 408; the pulley assemblies 808; and the drive member 804. For example, the louvers 408 are simultaneously openable and closeable by (manually) manipulating one of the louvers 408.

The drive member 804 is configured for connection to (engagement with) the motor assembly 802, the idler pulleys 806*l*, 806*u*, and the individual pulley assemblies 808 to mechanically connect the motor assembly 802 to the louvers 408 via the idler pulleys 806*l*, 806*u* and the pulley assemblies 808 and transfer force there between such that movement of the drive member 804 causes corresponding rotation of the idler pulleys 806*l*, 806*u* and the pulley assemblies 808 to thereby move the louvers 408 between the open and closed positions. In the illustrated embodiment, the drive member 804 is configured as a cord 814, which allows for frictional engagement (connection) of the drive member 804 to the idler pulleys **806*l*, 806*u* and the individual pulley assemblies 808. It should be appreciated, however, that alternate configurations for the drive member 804 would not be beyond the scope of the present disclosure. More specifically, in the embodiment of the disclosure seen in FIGS. 38-50, the drive member 804 includes (e.g., is formed partially or entirely from) threaded fibers, which may be synthetic, that are resistant to stretching (elongation), as well as rupture, fissure, breakage, etc. For example, it is envisioned that the drive member 804** may include (e.g., is formed partially or entirely from) Kevlar®.

The respective lower and upper idler pulleys **806*l*, 806*u* each include a wheel 816, which, in certain embodiments, may be identical in configuration (e.g., to reduce manufacturing complexity and time, costs, etc.). The upper idler pulley 806*u* further includes a shaft 818 supporting the wheel 816, and a pulley body 820 that is connected to (engaged with) the shaft 818. In certain embodiments, such as that seen in FIGS. 38-50, for example, it is envisioned that the shaft 818 and the pulley body 820 may be integrally (e.g., monolithically) formed. To facilitate rotation of the wheel 816 of the upper idler pulley 806*u* relative to the shaft 818, it is envisioned that the wheel 816** may further include an internal bearing assembly.

The upper idler pulley **806*u* is supported by a housing 822 including a bracket 824 that is secured to one of the corner stakes 412 of the inner frame 400. More specifically, the bracket 824 includes openings 826 that are configured to receive fasteners (e.g., screws) such that the fasteners extend into engagement with integral threading in the channel 422 formed in the corner stake 412 to secure the bracket 824 to the corner stake 412, and, thus, to the inner frame 400**.

Figure 41:
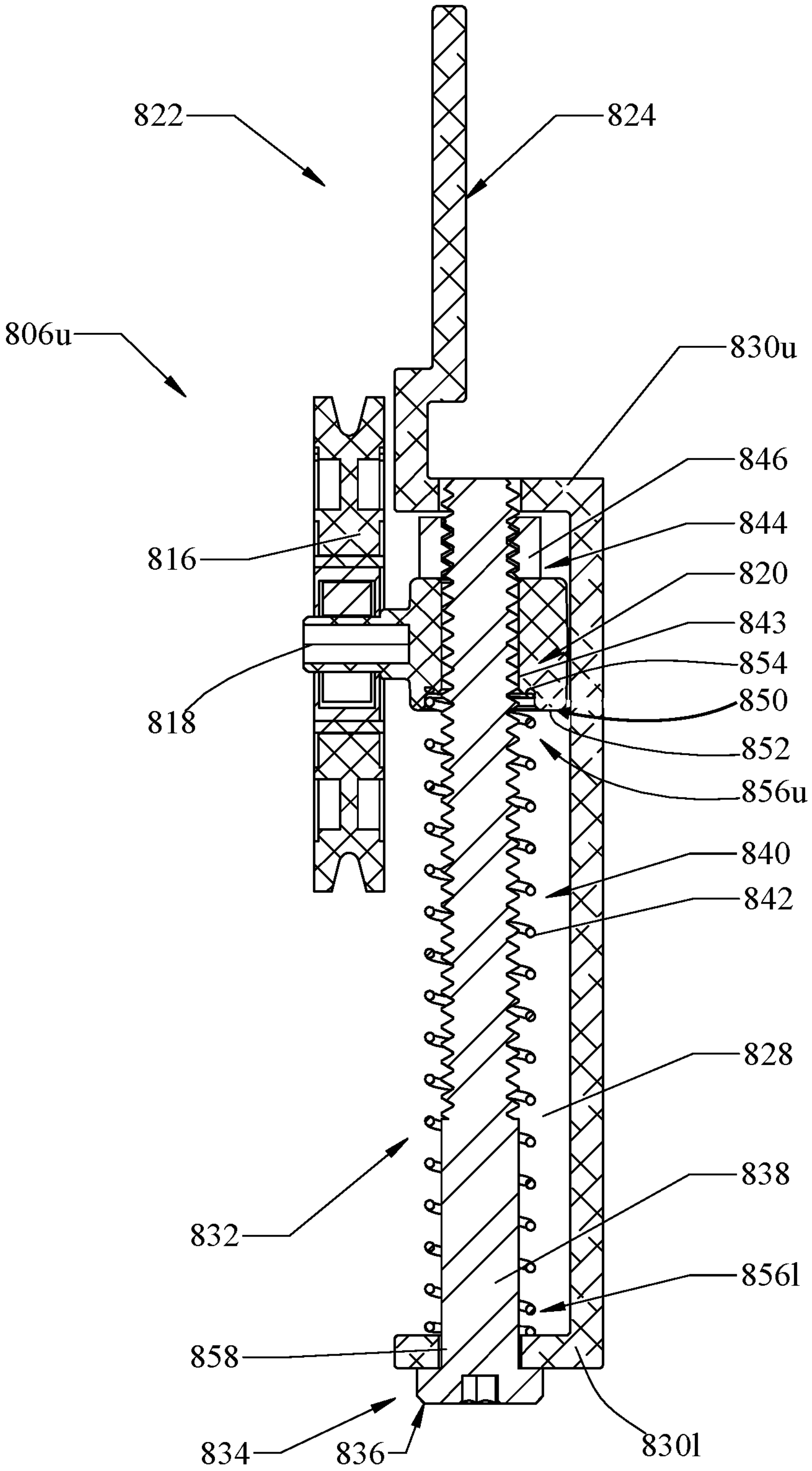
FIG. 41 is a partial, vertical, front, cross-sectional view of the driven train seen in FIG. 38 showing an adjustment mechanism for the upper idler pulley.
Figure 42:
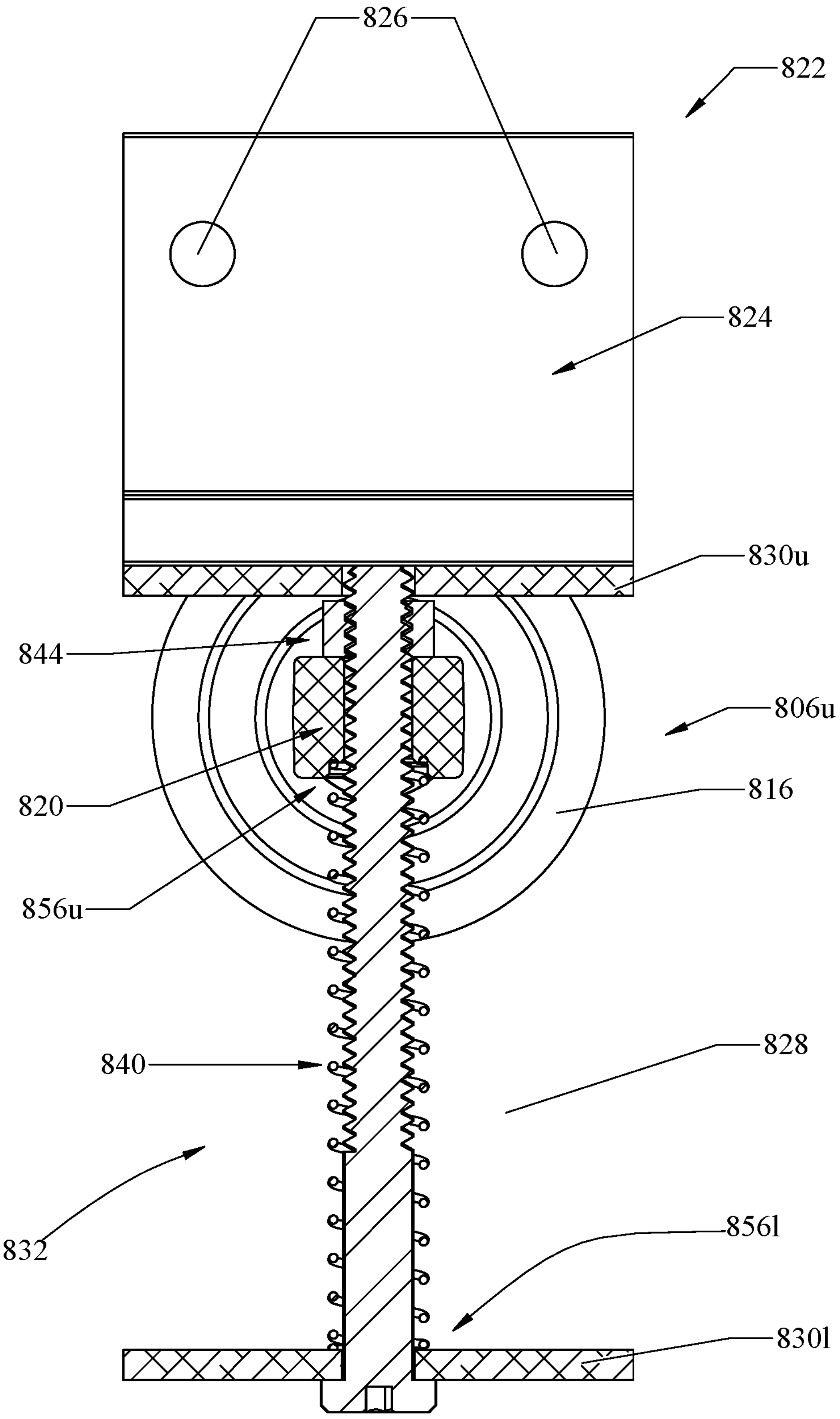
FIG. 42 is a partial, vertical, side, cross-sectional view of the driven train seen in FIG. 38 showing the adjustment mechanism for the upper idler pulley.
Figure 43:
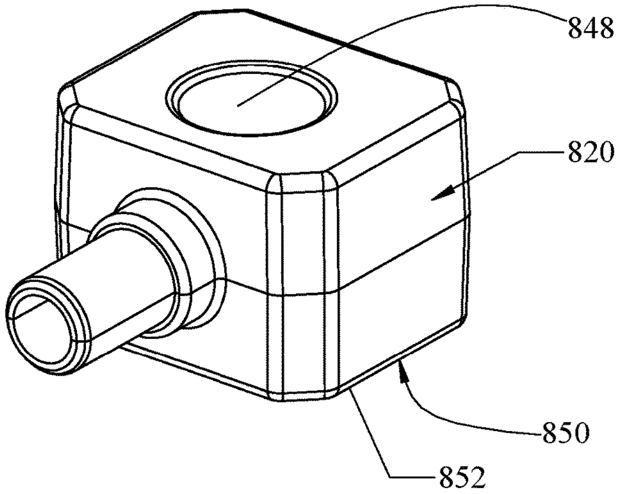
FIG. 43 is a top, perspective view of a pulley body of the upper idler pulley.
Figure 44:
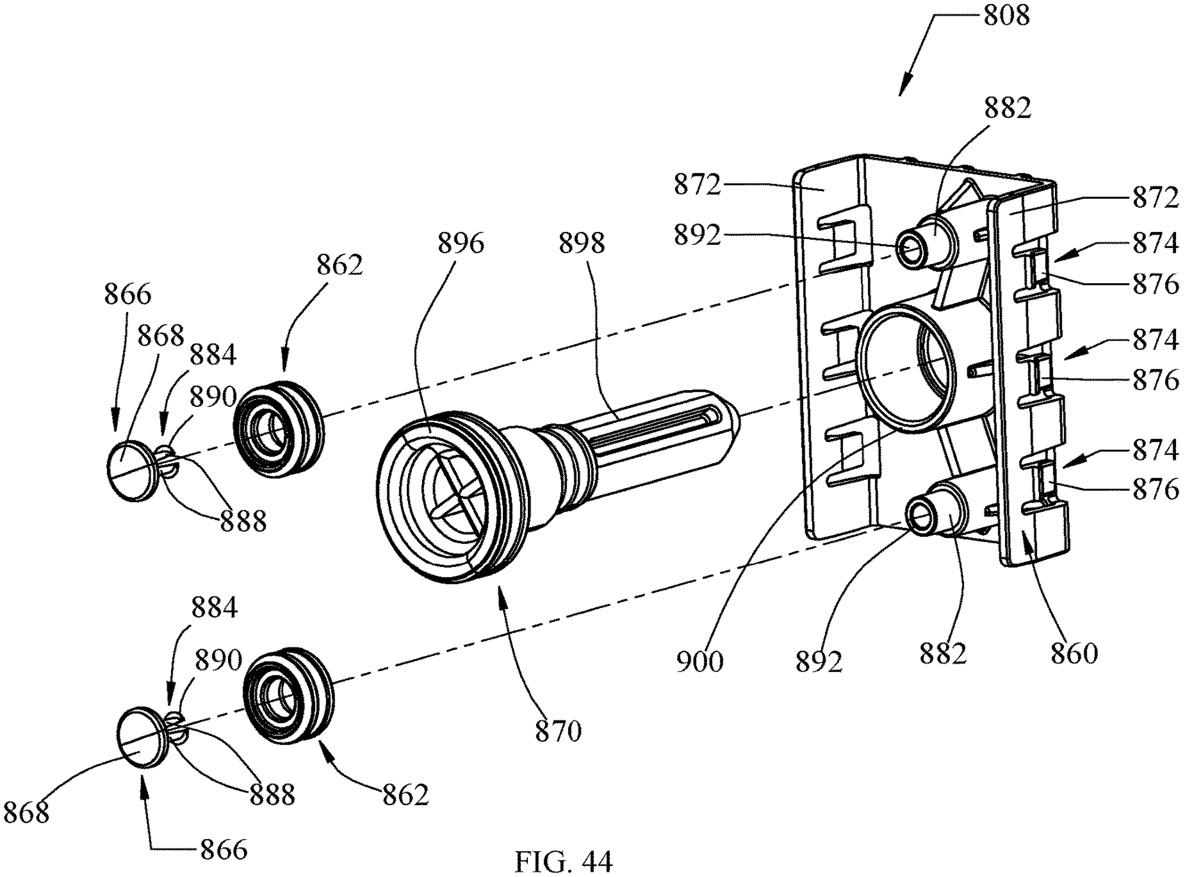
FIG. 44 is a side, perspective view of a pulley assembly of the drive train seen in FIG. 38 shown with parts separated.

The bracket 824 includes a recess (cavity) 828 (FIG. 41) defined by respective upper and lower walls **830*u*, 830*l* that is configured to accommodate an adjustment mechanism 832 for the upper idler pulley 806*u*. The adjustment mechanism 832 is configured to vary the vertical position of the upper idler pulley 806*u*, and, thus, the tension applied to the drive member 804, via displacement of the upper idler pulley 806*u* relative to the inner frame 400, as described in further detail below. The adjustment mechanism 832 includes an adjustment member 834, such as a fastener 836 (e.g., a screw 838,) that extends vertically through the recess 828; a biasing member 840 (e.g., a spring 842) that is positioned about the adjustment member 834; and a retention member 844 (e.g., a nut 846). The adjustment member 834 extends through an opening 848 (FIG. 43) in the pulley body 820, and a lower surface 850 of the pulley body 820 defines a contact surface 852 for the biasing member 840. For example, the lower surface 850 of the pulley body 820 may include an arcuate recess (depression) 854 that is configured to receive an upper end 856*u* of the biasing member 840. As seen in FIG. 41, the biasing member 840 includes a lower end 856*l* that defines a transverse (e.g., horizontal) cross-sectional dimension larger than that defined by an opening 858 in the lower wall 830*l* of the bracket 824, through which the adjustment member 834 extends, such that the adjustment mechanism 832 is retained within the recess 854 via contact between the biasing member 840 and the lower wall 856*l* of the bracket 824**.

As seen in FIG. 41, the retention member 844 is positioned between the pulley body 820 and the upper wall **836*u* of the bracket 824. The retention member 844 is threaded to the adjustment member 834 such that rotation of the adjustment member 834 causes vertical translation of the retention member 844, which causes corresponding vertical translation of the pulley body 820, and, thus, the wheel 816 of the upper idler pulley 806*u*. As the wheel 816 of the upper idler pulley 806*u* translates vertically, tension applied to the drive member 804 is either increased or decreased, depending upon the direction of translation of the idler pulley 806*u***.

Figure 48:
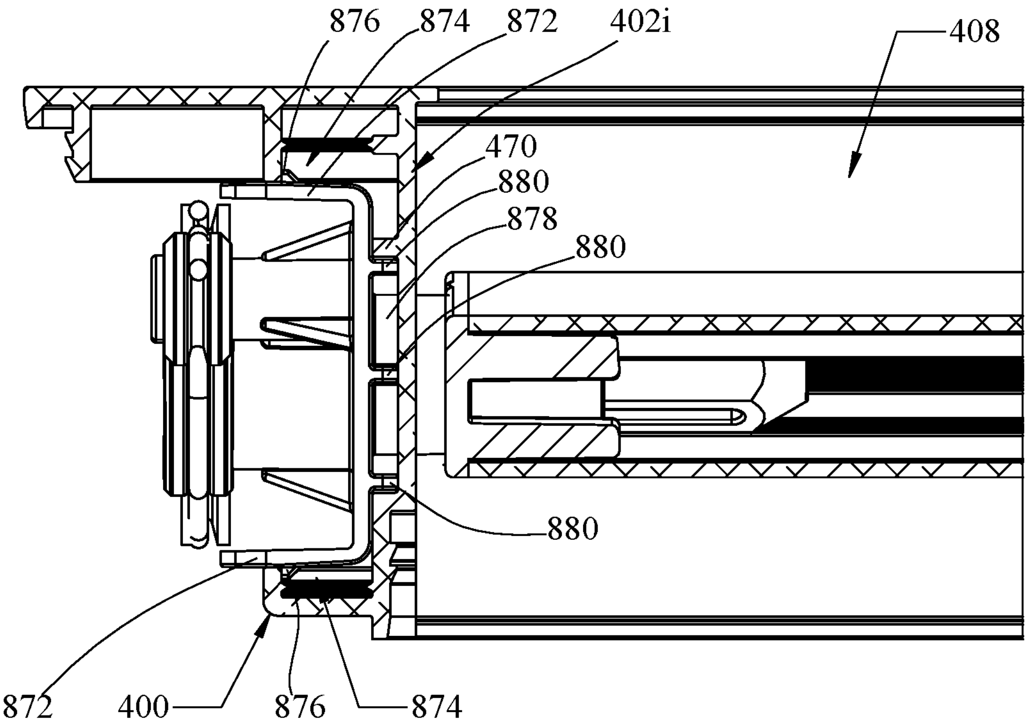
FIG. 48 is a front, plan view illustrating connection of the pulley assembly seen in FIG. 44 to a corresponding louver.
Figure 49:
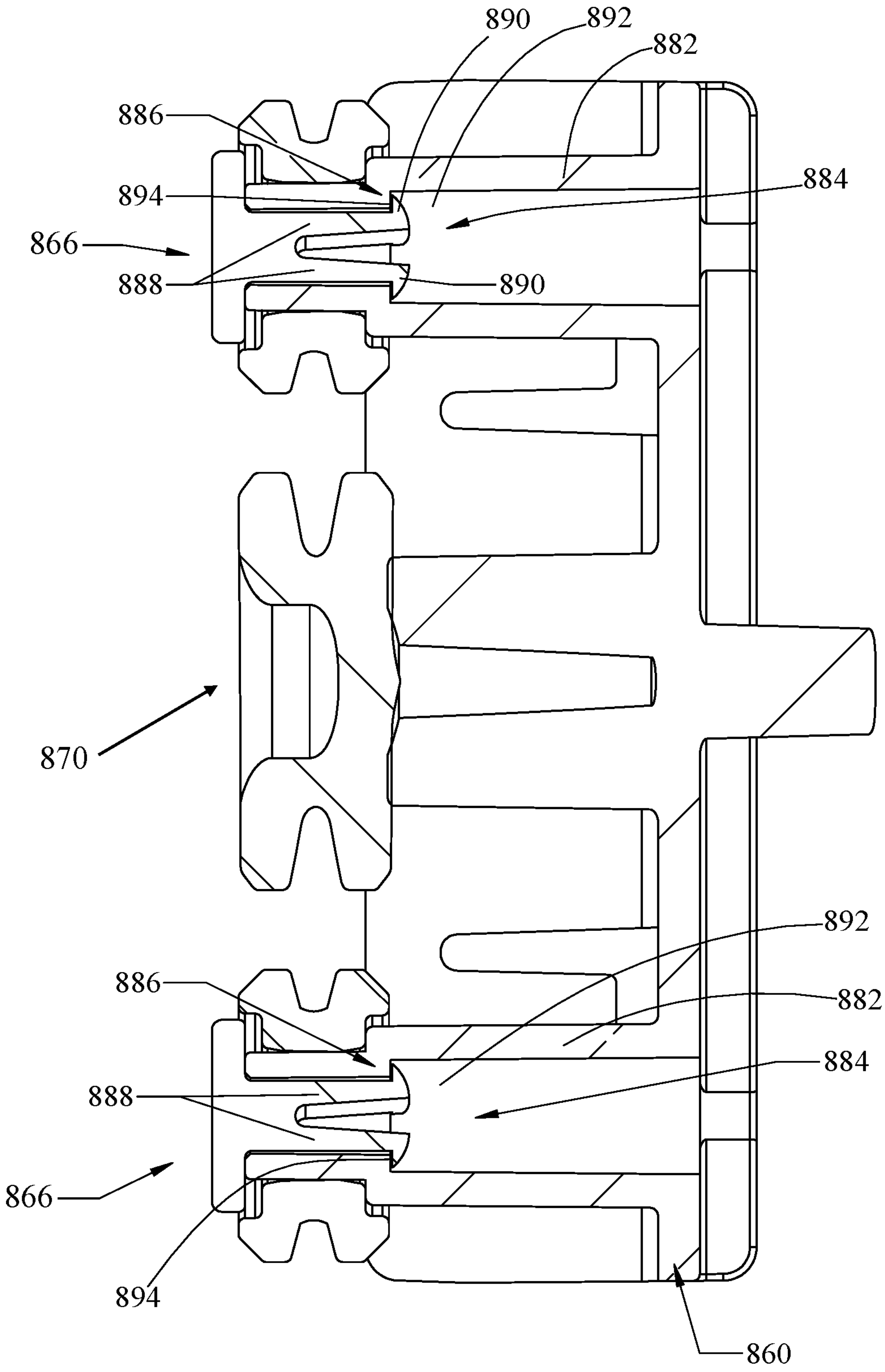
FIG. 49 is a vertical, cross-sectional view of the pulley assembly seen in FIG. 44.
Figure 50:
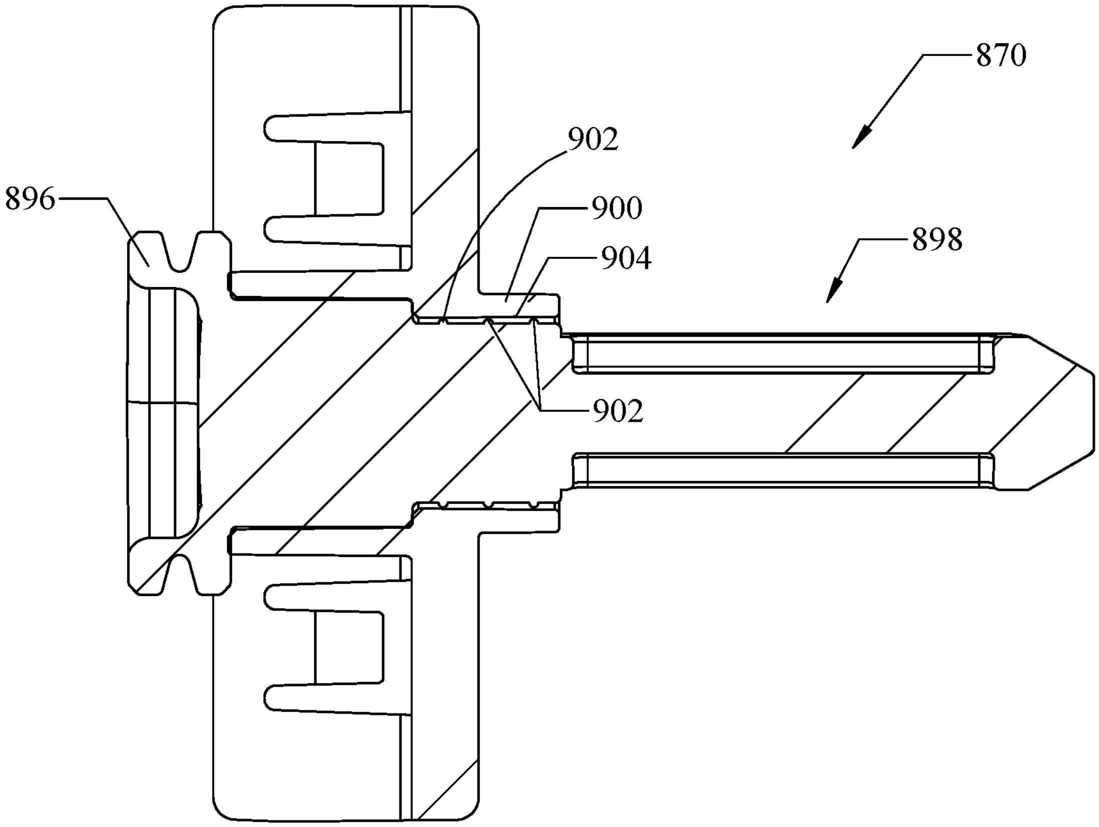
FIG. 50 is a vertical, cross-sectional view of the main pulley seen in FIG. 46.

The pulley assemblies 808 are identical in configuration and are each connected to (engaged with) a corresponding louver 408. Each pulley assembly 808 includes a pulley housing 860; a pair of support pulleys 862 that are configured for connection to (engagement with) the drive member 804; a pair of retainers 866 (e.g., rivets 868); and a main pulley 870 that is configured for connection to (engagement with) the drive member 804. The pulley housing 860 supports the components of the corresponding pulley assembly 808 (e.g., the support pulleys 862; the retainers 866; and the main pulley 870), and includes external (vertical) sidewalls 872 with exterior engagement members 874 (e.g., tabs 876, clips, feet, etc.) that are configured for engagement with the inner frame 400, as seen in FIG. 48. The pulley housing 860 also includes an extension 878 (FIG. 48) that extends towards the louver 408 with which the pulley assembly 808 is associated for receipt within one of the openings 450 (FIGS. 22, 23) in the segment **402*i*. The pulley housing 860 also defines a series of vertical ribs 880 that fit within the corresponding channel 470 (FIG. 48) defined within the segment 402*i*. To connect the pulley housing 860 to the inner frame 400, a lateral (horizontal) force is applied to the pulley housing 860, which deflects the exterior engagement members 874 on the pulley housing 860 such that the exterior engagement members 874 are engageable with the inner frame 400, as seen in FIG. 48**.

The retainers 866 secure the support pulleys 862 to corresponding posts 882 that extend outwardly from the pulley housing 860. It is envisioned that the retainers 866 and the posts 882 may include corresponding engagement structures 884, 886, respectively, that allow for connection in an interference fit (snap-fit) arrangement. For example, the retainers 866 may include flexible legs 888 defining shoulders 890 that are configured for receipt within an internal passageway 892 defined by each post 882. More specifically, the shoulders 890 are configured for engagement with a corresponding shelf 894 defined within each internal passageway 892. During connection of the retainers 866 and the posts 882, the legs 888 are compressed inwardly (towards each other) until the shoulders 890 pass the shelf 894, at which time, the legs 888 return to their normal (unbiased) configuration to secure the retainers 866 to the posts 882 via contact between the shoulders 890 and the shelf 894.

The main pulley 870 includes a wheel 896 that is configured for (frictional) connection to (engagement with) the drive member 804, and a shaft 898 that extends from the wheel 896 for engagement with the corresponding louver 408 (FIG. 48). More specifically, the shaft 898 of the main pulley 870 is configured for insertion into the opening 460 (FIG. 23) in the active end cap **456*a*. To facilitate engagement between the shaft 898 and the active end cap 456*a*, it is envisioned that the shaft 898 and the opening 460 in the active end cap 456*a* may include corresponding cross-sectional configurations (e.g., such that the shaft 898 mates with the opening 460 in the active end cap 456*a*), whereby rotation of the main pulley 870 causes corresponding rotation of the louver 408. For example, in the illustrated embodiment, it is envisioned that the shaft 898 of the main pulley 870 and the opening 460 in the active end cap 456***a* may each include cross-sectional configurations that are (generally) hexagonal.

It is envisioned that the wheel 896 of the main pulley 870 and the shaft 898 may be integrally (e.g., monolithically) formed. The wheel 896 and the shaft 898 of the main pulley 870 are configured for positioning within a collar 900 that extends from the pulley housing 860 in (generally) parallel relation to the posts 882. More specifically, the wheel 896, the shaft 898, and the collar 900 are configured such that the wheel 896 and the shaft 898 are freely movable in relation to the collar 900, which may facilitate assembly and disassembly of the main pulley 870 and the pulley housing 860 (e.g., during repair, maintenance, etc.). To inhibit (if not entirely prevent) vertical movement of the shaft 898 relative to the collar 900, it is envisioned that the shaft 898 may include a series of detents 902, teeth, or other such projections, that are configured for contact with an inner surface 904 of the collar 900.

In alternate embodiments, it is envisioned that the main pulley 870 may include an intervening structure (or mechanism) that is configured for positioning between the collar 900 and the shaft 898 of the main pulley 870 to create a mechanical connection there between. For example, the main pulley 870 may include a (compliant) bushing with an internal bearing assembly to facilitate rotation of the shaft 898 relative to the collar 900.

Figure 45:
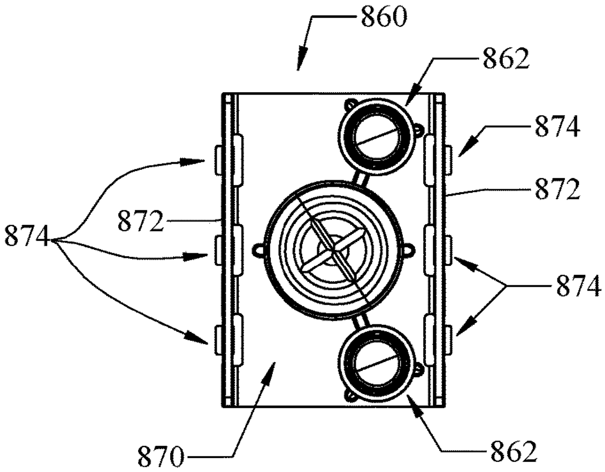
FIG. 45 is a side, plan view of the pulley assembly seen in FIG. 44.
Figure 46:
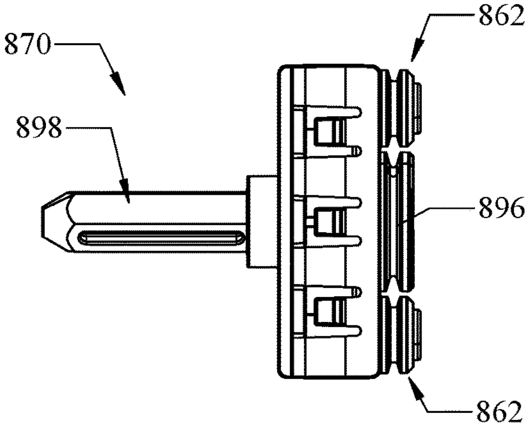
FIG. 46 is a front, plan view illustrating a main pulley of the pulley assembly seen in FIG. 44.
Figure 47:
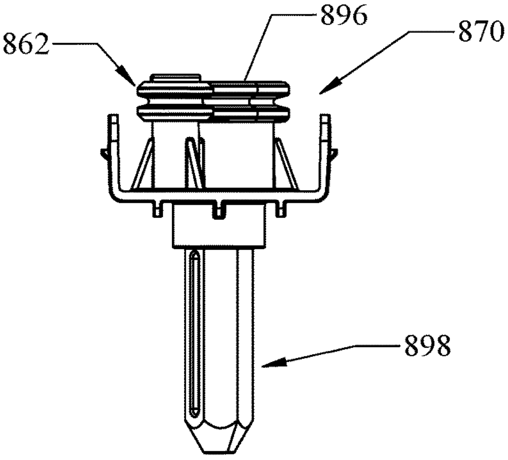
FIG. 47 is a top, plan view of the pulley assembly seen in FIG. 44.

The support pulleys 862 and the posts 882 on the pulley housing 860 are arranged on opposite sides of the main pulley 870 in (generally) adjacent relation such that one of the support pulleys 862 is positioned (vertically) above the main pulley 870 and one of the support pulleys 862 is positioned (vertically) below the main pulley 870. As seen in FIG. 45, for example, the support pulleys 862 are vertically aligned, but are laterally offset from the main pulley 870 such that the main pulley 870 is spaced further inward (i.e., the main pulley 870 is spaced further from the window W than the support pulleys 862) such that the main pulley 870 is aligned with the respective upper and lower idler pulleys 806*u*, 806*l*. The orientation and relative positioning of the support pulleys 862 and the main pulley 870 creates a tortuous (e.g., serpentine) path for the drive member 804 that increases friction, and, thus, facilitates rotation of the main pulley 870 during operation of the drive train 800.

Figure 51:
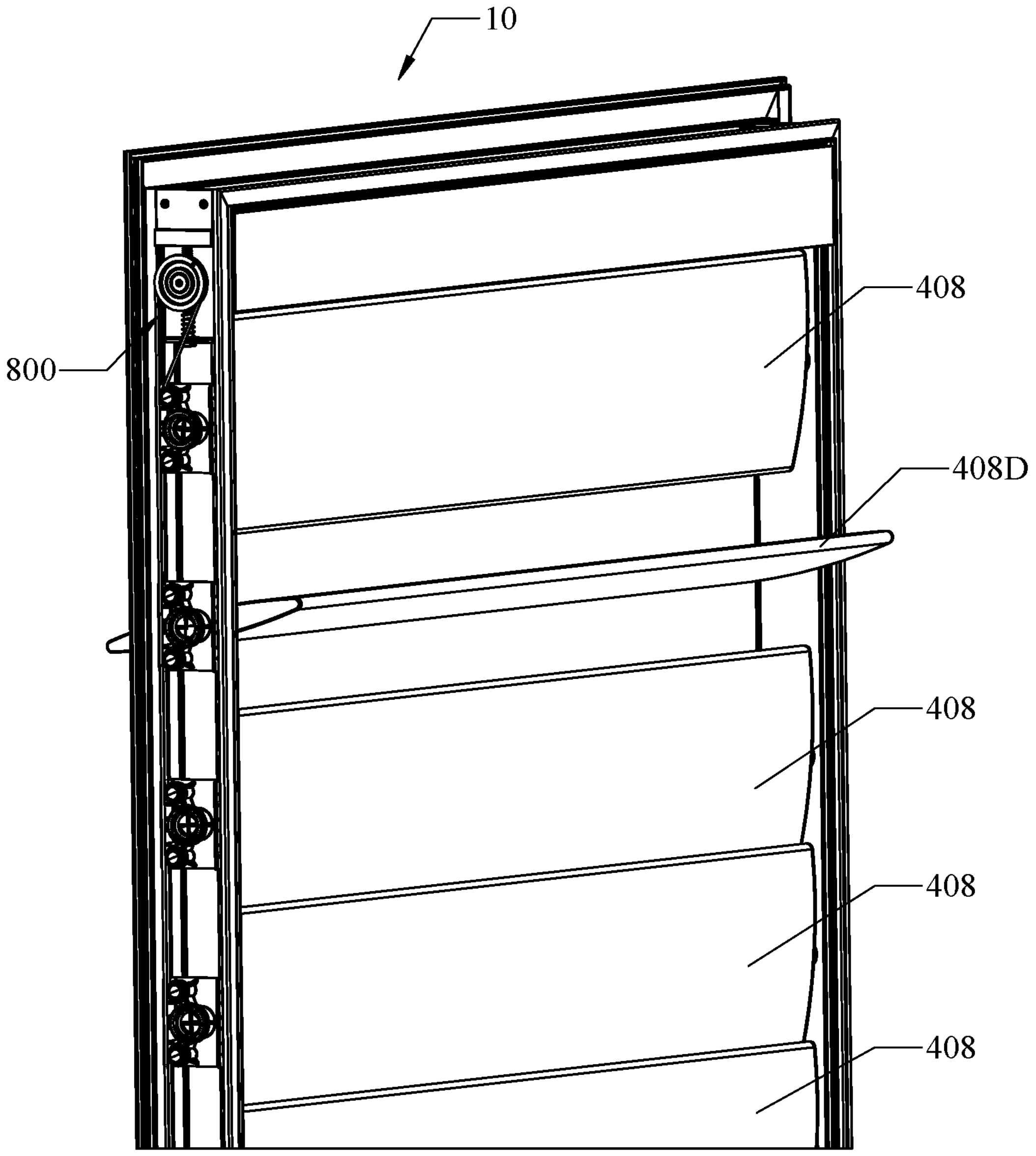
FIG. 51 is a side, perspective view illustrating the drive train seen in FIG. 38 and movement of a single louver.

To further facilitate operation of the drive train 800 in the manner descried herein above, and rotation (opening and closing) of the louvers 408, it is envisioned that the wheel 816 of each idler pulley 806*u*, 806*l*, the wheel 896 of each main pulley 870, and the drive member 804 may include (e.g., may be formed from) materials that create friction sufficient to transfer force from the motor assembly 802 to the idler 806*u*, 806*l* and each main pulley 870. However, with reference to FIG. 51 as well, should an external force be applied to one or more of the louvers 408 (e.g., to the louver 408D) above a threshold value, the individual pulley assembly (or assemblies) 808 (e.g., the wheel 898 of the corresponding main pulley 870) associated with the applied force is allowed to move (e.g., slip) relative to the drive member 804, allowing for displacement of the louver 408D, and avoiding damage the drive train 800. During such slippage, the remainder of the individual pulley assemblies 808 and louvers 408 are allowed to remain static, as seen in FIG. 51. In certain embodiments, it is envisioned that the drive train 800 may include an automatic self-correcting feature (function) to reset the system 10 upon such an occurrence, and resynchronize the displaced louver 408D with the remainder of the louvers 408. During self-correction, each of the louvers 408 moves normally, including the displaced louver 408D. Due to the relative orientation of the displaced louver 408D, however, the displaced louver 408D would reach a position of maximum opening (or closure) before the remaining louvers 408, at which time, the remaining louvers 408 would continue to open (or close), and the pulley assembly 808 associated with the displaced louver 408D would be allowed to slip relative to the drive member 804 until all of the louvers 408 were fully opened (or closed), at which time, normal functionality would be restored.

It is envisioned that the entire self-correcting operation may be automated. For example, the system 10 may include a button, switch, or the like on the panel 200, the motor assembly 802, or in any other suitable location that can be used to actuate the self-correcting operation.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of" Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A shutter system for a window or door, the shutter system comprising:

a mounting frame configured for connection to a mounting surface on or about the window or door, wherein the mounting frame defines a track;

a pivot assembly configured for connection to the mounting frame, the pivot assembly including:

a hinge receiver configured for connection to the mounting frame;

a hinge slide connected to the hinge receiver and supported within the track such that the hinge slide is movable along the track;

a hinge base configured for connection to the hinge receiver; and a hinge pin configured for insertion through the hinge base and the hinge receiver such that the hinge base is pivotably connected to the hinge receiver; and at least one panel configured for connection to the hinge base such that the at least one panel is pivotably connectable to the mounting frame via the pivot assembly, the at least one panel including:

an inner frame including:

first segments; and first corner stakes extending between and connecting the first segments;

an outer frame configured for connection to the inner frame, the outer frame including:

configured for connection to the first segments in an interference fit to thereby allow for toolless assembly and disassembly of the at least one panel; and brackets extending between and connecting the second segments;

a drive train supported by the inner frame; and louvers connected to the drive train such that operation of the drive train moves the louvers between open and closed positions.

2. The shutter system of claim 1, wherein the outer frame further includes second corner stakes extending between and connecting the second segments.

3. The shutter system of claim 2, wherein the first segments and the second segments define internal cavities configured to receive second corner stakes, wherein each of the second corner stakes includes a generally L-shaped configuration.

4. The shutter system of claim 1, wherein the drive train includes gear boxes connected to the louvers.

5. The shutter system of claim 1, wherein the drive train includes pulley assemblies connected to the louvers.

6. A shutter system for a window or door, the shutter system comprising:

at least one panel including:

an inner frame including:

first segments each defining a longitudinal axis; and first corner stakes extending between and connecting the first segments;

an outer frame configured for connection to the inner frame, the outer frame including:

second segments each defining a longitudinal axis;

second corner stakes extending between and connecting the second segments; and brackets extending between and connecting the second segments, wherein each of the brackets includes through holes configured to receive mechanical fasteners such that the mechanical fasteners extend through the brackets and into the second segments;

a drive train supported by the inner frame; and louvers connected to the drive train such that operation of the drive train moves the louvers between open and closed positions.

7. The shutter system of claim 6, wherein the first segments and the second segments are configured such that the second segments are connectable to the first segments via movement along a first axis that is transverse in relation to the longitudinal axes thereof and such that the second segments are disconnectable from the first segments via movement along a second axis that is generally parallel in relation to the longitudinal axes thereof.

8. The shutter system of claim 6, wherein the drive train includes gear boxes connected to the louvers.

9. The shutter system of claim 8, wherein the drive train further includes a drive member extending through the gear boxes.

10. The shutter system of claim 9, wherein each of the gear boxes includes a first gear configured to receive the drive member, the first gear and the drive member including corresponding non-circular cross-sectional configurations such that the first gear receives the drive member in mating engagement, whereby rotation of the drive member causes corresponding rotation of the first gear.

11. The shutter system of claim 10, wherein each of the gear boxes further includes a second gear configured for operative engagement with the first gear such that rotation of the first gear causes corresponding rotation of the second gear.

12. The shutter system of claim 11, wherein each of the gear boxes further includes a third gear positioned between and configured for engagement with the first gear and the second gear such that rotation of the first gear causes corresponding rotation of the second gear and the third gear, the third gear being configured for engagement with the louver connected to the gear box such that rotation of the third gear causes corresponding rotation of the louver to move the louver between the open and closed positions.

13. The shutter system of claim 12, wherein the first gear and the second gear are oriented along a first axis extending in generally parallel relation to the drive member and the third gear is oriented along a second axis extending in generally orthogonal relation to the first axis.

14. The shutter system of claim 6, wherein the drive train includes pulley assemblies connected to louvers.

15. The shutter system of claim 14, wherein the drive train further includes:

an upper pulley connected to the inner frame;

a lower pulley connected to the inner frame; and a drive member configured for engagement with the upper pulley, the lower pulley, and the pulley assemblies such that movement of the drive member causes corresponding rotation of the upper pulley, the lower pulley, and the pulley assemblies to thereby move the louvers between the open and closed positions.

16. The shutter system of claim 15, wherein the drive member, the upper pulley, the lower pulley, and the pulley assemblies are each configured such that the drive member is frictionally engageable with the upper pulley, the lower pulley, and the pulley assemblies.

17. The shutter system of claim 16, wherein each pulley assembly includes:

a main pulley configured for engagement with the drive member; and first and second support pulleys configured for engagement with the drive member, wherein the first and second support pulleys are positioned adjacent to the main pulley so as to define a tortuous path for the drive member to increase friction between the drive member and the main pulley.

18. A method of installing a shutter system for a window or door, the method comprising:

securing a mounting frame to a mounting surface on or about the window or door via fasteners;

connecting hinge receivers to hinge slides supported within tracks defined by the mounting frame such that the hinge slides are movable along the tracks; and mounting a panel to the hinge receiver by inserting a hinge pin through a hinge base connected to the panel such that the panel is movable in relation to the mounting frame between an open position and a closed position.

19. The method of claim 18, further including slidably inserting the hinge slides into the tracks defined by the mounting frame.

20. The method of claim 19, wherein securing the mounting frame to the mounting surface includes inserting the fasteners into the mounting surface through the hinge slides.

* * * * *